United States Patent
Hagadorn et al.

(10) Patent No.: US 10,618,988 B2
(45) Date of Patent: *Apr. 14, 2020

(54) BRANCHED PROPYLENE POLYMERS PRODUCED VIA USE OF VINYL TRANSFER AGENTS AND PROCESSES FOR PRODUCTION THEREOF

(71) Applicant: ExxonMobil Chemical Patents Inc., Baytown, TX (US)

(72) Inventors: John R. Hagadorn, Houston, TX (US); Jo Ann M. Canich, Houston, TX (US); Peijun Jiang, League City, TX (US); Rhutesh K. Shah, Katy, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/869,906

(22) Filed: Jan. 12, 2018

(65) Prior Publication Data

US 2018/0134827 A1    May 17, 2018

Related U.S. Application Data

(63) Continuation-in-part of application No. PCT/US2016/046402, filed on Aug. 10, 2016.
(Continued)

(51) Int. Cl.
*C08F 210/06* (2006.01)
*C08F 210/16* (2006.01)
*C08F 4/659* (2006.01)

(52) U.S. Cl.
CPC .......... *C08F 210/06* (2013.01); *C08F 210/16* (2013.01); *C08F 4/659* (2013.01); *C08F 4/65908* (2013.01); *C08F 2800/20* (2013.01)

(58) Field of Classification Search
CPC ...... C08F 210/06; C08F 210/16; C08F 4/659; C08F 4/65908; C08F 4/65912; C08F 2800/20
(Continued)

(56) References Cited

U.S. PATENT DOCUMENTS 4,874,734 A   10/1989  Kioka et al.
5,122,491 A   6/1992   Kioka et al.
(Continued)

FOREIGN PATENT DOCUMENTS

CN   101503487   8/2009
EP   0511665     11/1992
(Continued)

OTHER PUBLICATIONS

Zhang, et al., "Synthesis and Computation of Diastereomeric Phenanthroline-quinine Ligands and Their Application in Asymmetric Henry Reaction," Tetrahedron, 2013, vol. 69, No. 49, pp. 10644-10652.*
(Continued)

*Primary Examiner* — William K Cheung
(74) *Attorney, Agent, or Firm* — Catherine L. Bell

(57) ABSTRACT

This invention relates to the use of pyridyldiamido and/or quinolinyldiamido transition metal complexes and catalyst systems with an activator and a metal hydrocarbenyl chain transfer agent, such as an aluminum vinyl-transfer agent (AVTA), to produce branched propylene polymers, preferably propylene-ethylene copolymers or propylene-ethylene-diene monomer copolymers.

22 Claims, 1 Drawing Sheet

Related U.S. Application Data

(60) Provisional application No. 62/464,939, filed on Feb. 28, 2017, provisional application No. 62/212,405, filed on Aug. 31, 2015.

(58) Field of Classification Search
USPC .......................................................... 526/133
See application file for complete search history.

(56) References Cited

U.S. PATENT DOCUMENTS

| | | |
|---|---|---|
| 5,155,078 A | 10/1992 | Kioka et al. |
| 5,234,878 A | 8/1993 | Tsutsui et al. |
| 5,308,811 A | 5/1994 | Suga et al. |
| 5,654,248 A | 8/1997 | Kioka et al. |
| 5,830,820 A | 11/1998 | Yano et al. |
| 5,928,982 A | 7/1999 | Suga et al. |
| 5,973,084 A | 10/1999 | Suga et al. |
| 6,040,261 A | 3/2000 | Hlatky |
| 6,048,817 A | 4/2000 | Sagae et al. |
| 6,103,657 A | 8/2000 | Murray |
| 6,147,173 A | 11/2000 | Holtcamp |
| 6,175,409 B1 | 1/2001 | Nielsen et al. ............... 356/337 |
| 6,211,105 B1 | 4/2001 | Holtcamp |
| 6,239,062 B1 | 5/2001 | Cribbs |
| 6,260,407 B1 | 7/2001 | Petro et al. .................. 73/61.52 |
| 6,274,684 B1 | 8/2001 | Loveday et al. |
| 6,294,388 B1 | 9/2001 | Petro ................................ 436/8 |
| 6,306,658 B1 | 10/2001 | Turner et al. .................. 436/37 |
| 6,333,423 B1 | 12/2001 | Kol et al. |
| 6,353,063 B1 | 3/2002 | Shimizu et al. |
| 6,368,999 B1 | 4/2002 | Speca |
| 6,376,416 B1 | 4/2002 | Hirakawa et al. |
| 6,376,629 B2 | 4/2002 | Nagy et al. |
| 6,399,535 B1 | 6/2002 | Shih et al. |
| 6,406,632 B1 | 6/2002 | Safir et al. .................... 210/656 |
| 6,414,162 B1 | 7/2002 | Nagy |
| 6,436,292 B1 | 8/2002 | Petro ........................... 210/656 |
| 6,451,724 B1 | 9/2002 | Nifant'ev et al. |
| 6,454,947 B1 | 9/2002 | Safir et al. .................... 210/656 |
| 6,455,316 B1 | 9/2002 | Turner et al. .................. 436/37 |
| 6,461,515 B1 | 10/2002 | Safir et al. .................... 210/656 |
| 6,475,391 B2 | 11/2002 | Safir et al. .................... 210/656 |
| 6,489,168 B1 | 12/2002 | Wang et al. .................... 436/37 |
| 6,489,480 B2 | 12/2002 | Rodriguez |
| 6,491,816 B2 | 12/2002 | Petro ........................... 210/198.2 |
| 6,491,823 B1 | 12/2002 | Safir et al. .................... 210/656 |
| 6,531,552 B2 | 3/2003 | Nakano et al. |
| 6,559,090 B1 | 5/2003 | Shih et al. |
| 6,596,827 B2 | 7/2003 | Kol et al. |
| 6,664,348 B2 | 12/2003 | Speca |
| 6,734,131 B2 | 5/2004 | Shih et al. |
| 6,844,389 B2 | 1/2005 | Mehta et al. |
| 6,900,321 B2 | 5/2005 | Boussie et al. |
| 6,943,224 B2 | 9/2005 | Shih |
| 6,953,764 B2 | 10/2005 | Frazier et al. ................. 502/103 |
| 7,183,348 B2 | 2/2007 | Reinking et al. |
| 7,220,695 B2 | 5/2007 | Casty et al. |
| 7,273,914 B2 | 9/2007 | Wang et al. |
| 7,288,229 B2 | 10/2007 | Turner et al. .................. 422/130 |
| 7,317,057 B2 | 1/2008 | Solan et al. ................... 526/172 |
| 7,355,058 B2 | 4/2008 | Luo et al. |
| 7,385,015 B2 | 6/2008 | Holtcamp |
| 7,754,840 B2 | 7/2010 | Loveday et al. |
| 7,858,707 B2 | 12/2010 | Arriola et al. ................ 525/245 |
| 7,858,718 B1 | 12/2010 | Nagy et al. |
| 7,973,116 B2 | 7/2011 | Hagadorn et al. |
| 8,071,701 B2 | 12/2011 | Klosin et al. |
| 8,080,613 B2 | 12/2011 | Moad et al. |
| 8,110,518 B2 | 2/2012 | Marin et al. |
| 8,158,733 B2 | 4/2012 | Nagy et al. |
| 8,394,902 B2 | 3/2013 | Hagadorn et al. |
| 8,575,284 B2 | 11/2013 | Luo et al. |
| 8,674,040 B2 | 3/2014 | Hagadorn et al. |
| 8,710,163 B2 | 4/2014 | Hagadorn et al. |
| 8,791,217 B2 | 7/2014 | Hlavinka et al. |
| 8,907,032 B2 | 12/2014 | Kol et al. |
| 8,937,137 B2 | 1/2015 | Holtcamp et al. |
| 8,952,114 B2 | 2/2015 | Giesbrecht et al. |
| 8,957,171 B2 | 2/2015 | Giesbrecht et al. |
| 8,957,172 B2 | 2/2015 | Giesbrecht et al. |
| 9,079,991 B2 | 7/2015 | Ker et al. |
| 9,120,879 B2 | 9/2015 | Giesbrecht et al. |
| 9,150,676 B2 | 10/2015 | Kol et al. |
| 9,193,813 B2 | 11/2015 | Kol et al. |
| 9,200,099 B2 | 12/2015 | Kol et al. |
| 9,200,100 B2 | 12/2015 | Kol et al. |
| 9,249,238 B2 | 2/2016 | Hagadorn et al. |
| 9,260,552 B2 | 2/2016 | Hagadorn et al. |
| 9,290,589 B2 | 3/2016 | Evans et al. |
| 9,315,593 B2 | 4/2016 | Hagadorn |
| 9,315,602 B2 | 4/2016 | Yamashita et al. ... C08F 110/06 |
| 9,321,858 B2 | 4/2016 | Hagadorn et al. |
| 10,208,140 B2 * | 2/2019 | Hagadorn ............... C07F 7/003 |
| 2002/0019503 A1 | 2/2002 | Kol et al. |
| 2002/0038036 A1 | 3/2002 | Resconi et al. |
| 2002/0123582 A1 | 9/2002 | Speca |
| 2002/0142912 A1 | 10/2002 | Boussie et al. |
| 2003/0027950 A1 | 2/2003 | Uchino et al. |
| 2003/0096698 A1 | 5/2003 | Shih et al. |
| 2003/0104928 A1 | 6/2003 | Holtcamp |
| 2003/0213938 A1 | 11/2003 | Farley et al. ................. 252/500 |
| 2005/0148743 A1 | 7/2005 | Casty et al. |
| 2005/0245701 A1 | 11/2005 | Oshima et al. |
| 2005/0267273 A1 | 12/2005 | Kashiwa et al. |
| 2006/0155083 A1 | 7/2006 | Nakayama et al. |
| 2006/0293470 A1 | 12/2006 | Cao et al. |
| 2007/0185343 A1 | 8/2007 | Verpoort et al. |
| 2010/0022726 A1 | 1/2010 | Hagadorn et al. |
| 2010/0227990 A1 | 9/2010 | Kuhlman et al. |
| 2011/0077369 A1 | 3/2011 | Yukita |
| 2011/0082323 A1 | 4/2011 | Small et al. |
| 2011/0092651 A1 | 4/2011 | Arriola et al. |
| 2012/0016092 A1 | 1/2012 | Nagy et al. |
| 2012/0083575 A1 | 4/2012 | Hustad et al. |
| 2013/0035463 A1 | 2/2013 | Cann et al. |
| 2013/0131294 A1 | 5/2013 | Hagadorn et al. |
| 2013/0172498 A1 | 7/2013 | Hlavinka et al. |
| 2013/0289227 A1 | 10/2013 | Jensen et al. |
| 2014/0031504 A1 | 1/2014 | Jacobsen et al. |
| 2014/0039137 A1 | 2/2014 | Giesbrecht et al. |
| 2014/0039138 A1 | 2/2014 | Giesbrecht et al. |
| 2014/0039139 A1 | 2/2014 | Giesbrecht et al. |
| 2014/0121341 A1 | 5/2014 | Holtcamp et al. |
| 2014/0128557 A1 | 5/2014 | Giesbrecht et al. |
| 2014/0221587 A1 | 8/2014 | Hagadorn et al. |
| 2014/0275454 A1 | 9/2014 | Holtcamp et al. |
| 2014/0378720 A1 | 12/2014 | Wu et al. |
| 2015/0025205 A1 | 1/2015 | Yang et al. |
| 2015/0119540 A1 | 4/2015 | Holtcamp et al. |
| 2015/0141601 A1 | 5/2015 | Hagadorn et al. |
| 2015/0329652 A1 | 11/2015 | Hlavinka |
| 2016/0013431 A1 | 1/2016 | Choi et al. .......... H01L 51/0087 |
| 2017/0088641 A1 | 3/2017 | Holtcamp et al. |
| 2017/0096506 A1 | 4/2017 | Ye et al. |
| 2017/0096507 A1 | 4/2017 | Atienza et al. |
| 2017/0096508 A1 | 4/2017 | Ye et al. |
| 2017/0096509 A1 | 4/2017 | Atienza et al. |
| 2017/0096510 A1 | 4/2017 | Ye et al. |
| 2017/0096511 A1 | 4/2017 | Atienza et al. |
| 2017/0355787 A1 | 12/2017 | Duchateau et al. ...... C08F 2/38 |
| 2018/0134816 A1 | 5/2018 | Canich et al. ......... C08F 4/6495 |
| 2018/0251586 A1 | 9/2018 | Canich et al. ........ C08F 210/16 |
| 2018/0319907 A1 | 11/2018 | Hagadorn et al. .... C08F 4/6495 |

FOREIGN PATENT DOCUMENTS

| | | |
|---|---|---|
| EP | 1160261 | 12/2001 |
| EP | 0 849 292 | 8/2002 |
| EP | 2436703 | 4/2012 |
| GB | 1002430 | 8/1965 |
| GB | 1278516 | 6/1972 |
| JP | H05025214 | 2/1993 |
| JP | 1995033814 | 2/1995 |
| JP | H11166011 | 6/1999 |

(56) References Cited

FOREIGN PATENT DOCUMENTS

| | | | |
|---|---|---|---|
| JP | H11166012 | 6/1999 | |
| JP | H11255816 | 9/1999 | |
| JP | 2000072813 | 3/2000 | |
| JP | 2000198812 | 7/2000 | |
| JP | 2001026613 | 1/2001 | |
| JP | 2001031720 | 2/2001 | |
| JP | 2001163908 | 6/2001 | |
| JP | 2001163909 | 6/2001 | |
| JP | 2001200010 | 7/2001 | |
| JP | 2001316414 | 11/2001 | |
| JP | 2001316415 | 11/2001 | |
| JP | 2002020415 | 1/2002 | |
| JP | 2002037812 | 2/2002 | |
| JP | 2002060411 | 2/2002 | |
| JP | 2002060412 | 2/2002 | |
| JP | 2002069116 | 3/2002 | |
| JP | 2004083773 | 3/2004 | |
| JP | 3891905 | 3/2007 | |
| JP | 3943959 | 7/2007 | |
| JP | 2007254575 | 10/2007 | |
| JP | 2007261211 | 10/2007 | |
| JP | 2007262330 | 10/2007 | |
| JP | 2007262335 | 10/2007 | |
| JP | 2007262336 | 10/2007 | |
| JP | 2007262338 | 10/2007 | |
| JP | 2007262631 | 10/2007 | |
| JP | 4615248 | 1/2011 | |
| JP | 2011089019 | 5/2011 | |
| JP | 2013124302 | 6/2013 | |
| KR | 101381879 | 11/2012 | |
| KR | 2009-017896 | 1/2013 | ............ C08F 4/654 |
| WO | 97/48743 | 12/1997 | |
| WO | 2000-09255 | 2/2000 | ............ B01J 19/00 |
| WO | 00/011044 | 3/2000 | |
| WO | 00/22010 | 4/2000 | |
| WO | 01/23442 | 4/2001 | |
| WO | 01/30864 | 5/2001 | |
| WO | 01/42320 | 6/2001 | |
| WO | 2002/038628 | 5/2002 | |
| WO | 02/088198 | 11/2002 | |
| WO | 02/102811 | 12/2002 | |
| WO | 03/064433 | 8/2003 | |
| WO | 03/064435 | 8/2003 | |
| WO | 2004/106390 | 12/2004 | |
| WO | 2005/075525 | 8/2005 | |
| WO | 2005/095469 | 10/2005 | |
| WO | 2006/036748 | 4/2006 | |
| WO | 2007/018804 | 2/2007 | |
| WO | 2007/035492 | 3/2007 | |
| WO | 2007/067965 | 6/2007 | |
| WO | 2010/037059 | 4/2010 | |
| WO | 2011/014533 | 2/2011 | |
| WO | 2012/009369 | 1/2012 | |
| WO | 2012/033670 | 3/2012 | |
| WO | 2012/098521 | 7/2012 | |
| WO | 2012/134614 | 10/2012 | |
| WO | 2012/134615 | 10/2012 | |
| WO | 2012/158260 | 11/2012 | |
| WO | 2013/028283 | 2/2013 | |
| WO | 2013/040276 | 3/2013 | |
| WO | 2014/123683 | 8/2014 | |
| WO | 2014/137927 | 9/2014 | |
| WO | 2014/143202 | 9/2014 | |
| WO | 2014/149361 | 9/2014 | |
| WO | 2015/088819 | 6/2015 | |
| WO | 2016/102690 | 6/2016 | |
| WO | 2017/039993 | 3/2017 | |
| WO | 2017/039994 | 3/2017 | |
| WO | 2017/039995 | 3/2017 | |
| WO | 2018/005201 | 1/2018 | |

OTHER PUBLICATIONS

Weng et al., "Long Chain Branched Isotactic Polypropylene," Macromolecules, 2002, vol. 35, No. 10, pp. 3838-3843.

Dekmezian et al., "Characterization and Modeling of Metallocene-Based Branch-Block Copolymers," Macromolecules, 2002, vol. 35, No. 25, pp. 9586-9594.

Vaughan et al., "Industrial Catalysts for Alkene Polymerization," Polymer Science: A Comprehensive Reference, vol. 3, 3.20, pp. 657-672.

Britovsek et al., "The Search for New-Generation Olefin Polymerization Catalysts: Life beyond Metallocenes," Angew. Chem. Int. Ed., 1999, vol. 38, vol. 4, pp. 428-447.

Froese et al., "Mechanism of Activation of a Hafnium Pyridyl-Amide Olefin Polymerization Catalyst: Ligand Modification by Monomer," Journal of the American Chemical Society, 2007, vol. 129, No. 25, pp. 7831-7840.

Guerin et al., "Conformationally Rigid Diamide Complexes of Zirconium: Electron Deficient Analogues of Cp2Zr," Organometallics, 1996, vol. 15, No. 26, pp. 5586-5590.

U.S. Appl. No. 61/815,065, filed Apr. 23, 2013 Hagadorn et al.

Hu et al., "Syntheses, Characterization, and Ethylene Polymerization of Titanium Complexes with Double-Duty Tridentate [ONN] Ligands," Organometallics, 2012, vol. 31, No. 8, pp. 3241-3247.

Nifant'ev et al, "Reaction of 2,8-Bis(o-hydroxyaryl)quinolines with Group 4 Metal Alkyls Resulting in Three Distinct Coordination Modes of the Tridentate Ligand. X-ray Structure of Complexes and Performance as Precursors in Ethylene Polymerization Catalysis," Organometallics, 2013, vol. 32, No. 9, pp. 2685-2692.

Nifant'ev et al., "Zirconium and hafnium complexes based on 2-aryl-8-arylaminoquinoline ligands: synthesis, molecular structure, and catalytic performance in ethylene copolymerization," Dalton Transactions, 2013, vol. 42, pp. 1501-1511.

LaPointe et al., "New Family of Weakly Coordinating Anions," Journal of the American Chemical Society, 2000, vol. 122, No. 39, pp. 9560-9561.

Kehr et al., "(N-Pyrrolyl)B(C6F5)2—A New Organometallic Lewis Acid for the Generation of Group 4 Metallocene Cation Complexes," Chemical European Journal, 2000, vol. 6, No. 2, pp. 258-266.

Nam et al., "Propene Polymerization with Stereospecific Metallocene Dichloride—[Ph3C][B(C6F5)4] Using [omega]-Alkenylalurninum as an Alkylation Reagent and as a Functional Comonomer," Macromolecules, 2002, vol. 35, No. 18, pp. 6760-6762.

Tanaka et al., "Pseudo-living copolymerization of norbornene and ω-alkenylborane—Synthesis of monodisperse functionalized cycloolefin copolymer," Polymer, 2015, vol. 56, pp. 218-222.

U.S. Appl. No. 61/779,435, filed Mar. 13, 2013 Holtcamp et al.
U.S. Appl. No. 62/149,799, filed Apr. 20, 2015 Ye et al.
U.S. Appl. No. 62/149,814, filed Apr. 20, 2015 Ye et al.
U.S. Appl. No. 62/168,302, filed May 29, 2015 Holtcamp et al.
U.S. Appl. No. 62/236,691, filed Oct. 2, 2015 Ye et al.
U.S. Appl. No. 62/236,697, filed Oct. 2, 2015 Ye et al.
U.S. Appl. No. 62/236,701, filed Oct. 2, 2015 Atienza et al.
U.S. Appl. No. 62/236,712, filed Oct. 2, 2015 Atienza et al.
U.S. Appl. No. 62/236,720, filed Oct. 2, 2015 Atienza et al.
U.S. Appl. No. 62/236,727, filed Oct. 2, 2015 Ye et al.
U.S. Appl. No. 15/051,421, filed Feb. 23, 2016 Atienza et al.

Barroso et al., "Chiral Diamine Bis(phenolate) TiIV and ZrIV Complexes—Synthesis, Structures and Reactivity," Eur. J. Inorg. Chem., 2011, pp. 4277-4290.

Bucheli et al., "Spherical Clay Conglomerates: A Novel Stationary Phase for Solid-Phase Extraction and 'Reversed-Phase' Liquid Chromatography," Analytical Chemistry, vol. 71(11), Jun. 1, 1999, pp. 2171-2178.

Busico et al., "Block Copolymers of Highly Isotactic Polypropylene via Controlled Ziegler-Natta Polymerization," Macromolecules, 2004, vol. 37, pp. 8201-8203.

Cipullo et al., "Improving the Behavior of Bis(phenoxyamine) Group 4 Metal Catalysts for Controlled Alkene Polymerization," Macromolecules, 2009, vol. 42, pp. 3869-3872.

Gibson et al., "Advances in Non-Metallocene Olefin Polymerization Catalysis," Chem. Rev. 2003, vol. 103, pp. 283-315.

Groysman et al., "From THF to Furan: Activity Tuning and Mechanistic Insight via Sidearm Donor Replacement in Group IV Amine

(56) References Cited

OTHER PUBLICATIONS

Bis(phenoiate) Polymerization Catalysts," Organometallics, 2003, vol. 22, pp. 3013-3015.

Groysman et al., "Diverse Structure-Activity Trends in Amine Bis(phenolate) Titanium Polymerization Catalysts," Organometallics, 2004, vol. 23, pp. 5291-5299.

van Meurs et al., "Polyethylene Chain Growth on Zinc Catalyzed by Olefin Polymerization Catalysts: A Comparative Investigation of Highly Active Catalyst Systems across the Transition Series," J. Am. Chem. Soc., 2005, vol. 127, pp. 9913-9923.

Reybuck et al., "Amine Bis(phenoate) Zirconium Complexes: Influence of Ligand Structure and Cocatalyst on Copolymerization Behaivor," Macromolecules, 2005, vol. 38, pp. 2552-2558.

Su et al., "Oxo-Bridged Bimetallic Group 4 Complexes Bearing Amine-Bis(benzotriazole phenolate) Derivatives as Bifunctional Catalysts for Ring-Opening Polymerization of Lactide and Copolymerization of Carbon Dioxide with Cyclohexene Oxide," Organometallics, 2014, vol. 33, pp. 7091-7100.

Tshuva et al., "[ONXO]-Type Amine Bis(phenolate) Zirconium and Hafnium Complexes as Extremely Active 1-Hexene Polymerization Catalysts," Organometallics, 2002, vol. 21, pp. 662-670.

Valente et al., "Coordinative Chain Transfer Polymerization," Chemical Reviews, 2013, vol. 113, pp. 3836-3857.

Dolzine et al., "Intramolecular metal—double bond interactions : VII. intramolecular cyclization of alkenyl derivatives of lithium, aluminum, gallium and indium", Journal of Organometallic Chemistry, 1974, vol. 78, No. 2, pp. 165-176.

U.S. Appl. No. 62/332,940, filed May 6, 2016 Holtcamp et al.

PCT/US2017/055131 filed Oct. 4, 2017 Hule et al.

U.S. Appl. No. 62/410,173, filed Oct. 19, 2016 Hule et al.

Warwel et al., "Thermische Strukturisomerisierung der Additionsprodukte von HAl(iso-C4H9)2 an 1,4-Pentadiene," Justus Liebigs Annalen der Chemie, vol. 1975, Issue 4; pp. 642-649.

Hata, "Aluminium-Olefinic Double Bond Interaction in Alkeynlaluminium Compounds ," Chemical Communications, 1968, vol. 1, pp. 7-9.

Shiono et al., "Isospecific Polymerization of Propene over TiCl3 Combined with Bis(.omega.-alkenyl)zinc Compounds," Macromolecules, 1995, vol. 28, No. 2, pp. 437-443.

Boussie, T. et al. (2003) "A Fully Integrated High-Throughput Screening Methodology for the Discovery of New Polyolefin Catalysts: Discovery of a New Class of High Temperature Single-Site Group (IV) Copolymerization Catalysts," *Jrnl. Amer. Chem. Soc.*, v.125, pp. 4306-4317.

\* cited by examiner

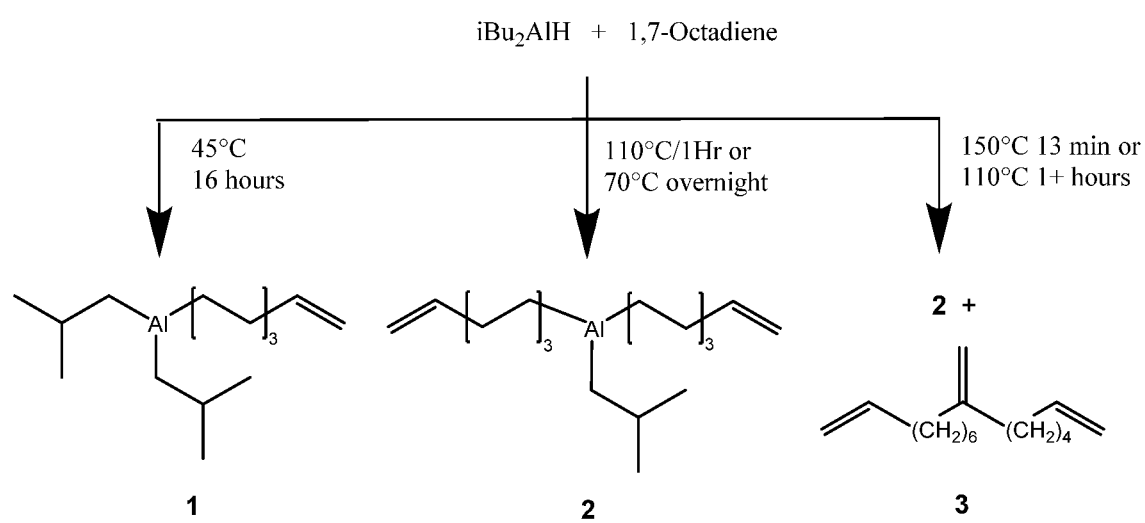

BRANCHED PROPYLENE POLYMERS PRODUCED VIA USE OF VINYL TRANSFER AGENTS AND PROCESSES FOR PRODUCTION THEREOF

CROSS REFERENCE TO RELATED APPLICATIONS

This application claims priority to and the benefit of U.S. Ser. No. 62/464,939, filed Feb. 28, 2017 and is incorporated by reference in its entirety.

This invention is also a Continuation-in-Part of PCT/US2016/046402, filed Aug. 10, 2016 which claims priority to and the benefit of U.S. Ser. No. 62/212,405, filed Aug. 31, 2015.

This application also relates to U.S. Ser. No. 62/332,940, filed May 6, 2016; U.S. Ser. No. 62/332,921, filed May 6, 2016; and U.S. Ser. No. 15/629,586, filed Jun. 21, 2017.

FIELD OF THE INVENTION

This invention relates to the use of pyridyldiamido and/or quinolinyldiamido transition metal complexes and catalyst systems with an activator and a metal hydrocarbenyl chain transfer agent, such as an aluminum vinyl-transfer agent (AVTA), to produce branched propylene polymers.

BACKGROUND OF THE INVENTION

Pyridyldiamido transition metal complexes are disclosed in US 2015/0141601; US 2014/0316089; US 2012/0071616; US 2011/0301310; US 2011/0224391; and US 2010/0022726, where such complexes are useful as catalyst components for the polymerization of olefins.

US 2015/0141596; US 2015/0141590; and US 2014/0256893 describe the production of polyolefins using pyridyldiamido catalysts in the presence of chain-transfer agents that do not feature transferrable vinyl groups.

Macromolecules 2002, 35, 6760-6762 discloses propene polymerization with tetrakis(pentafluorophenyl)borate, 7-octenyldiisobutylaluminum, and racMe$_2$Si(2-Me-indenyl)$_2$ ZrCl$_2$ or Ph$_2$C(cyclopentadienyl)(fluorenyl)ZrCl$_2$ to produce polypropylene with octenyldiisobutylaluminum incorporated as a comonomer.

Japanese. Kokai Tokkyo Koho (2004), JP 2004-83773-A describes the preparation of polypropylene in the presence of trialkenylaluminum using metallocene and Ziegler-Natta catalysts.

Macromolecules 1995, 28, 437-443 describes the formation of isotactic polypropylene containing vinyl end groups by the Ziegler-Natta catalyzed polymerization of propylene in the presence of dialkenylzincs.

Macromolecules 2002, 35, 3838-3843 describes the formation of long-chain branched polypropylene via the insertion of in situ formed vinyl-terminated polypropylene into growing polymer chains.

Macromolecules 2002, 35, 9586-9594 describes the formation of long-chain branched copolymers of ethylene and alpha olefins via the insertion of in situ formed vinyl-terminated polymer into growing polymer chains.

Eur. Pat. Appl. (2012), EP 2436703 A1 describes the production of comb architecture branch block copolymers in a process that uses dual catalysts and a zinc-based polymerizable chain shuttling agent.

WO 2007/035492 describes the production of long-chain branched and branch block copolymers by polymerization of alkene monomers in the presence of a zinc-based polymerizable shuttling agent.

WO 2016/102690 discloses a process for preparation of a branched polyolefin using a metal hydrocarbyl transfer agent.

References of interest also include: 1) Vaughan, A; Davis, D. S.; Hagadorn, J. R. in Comprehensive Polymer Science, Vol. 3, Chapter 20, "Industrial catalysts for alkene polymerization"; 2) Gibson, V. C.; Spitzmesser, S. K. Chem. Rev. 2003, 103, 283; and 3) Britovsek, G. J. P.; Gibson, V. C.; Wass, D. F. Angew. Chem. Int. Ed. 1999, 38, 428; 4) US 2002/0142912; 5) U.S. Pat. No. 6,900,321; 6) U.S. Pat. No. 6,103,657; 7) WO 2005/095469; 8) US 2004/0220050A1; 9) WO 2007/067965; 10) Froese, R. D. J. et al., J. Am. Chem. Soc. 2007, 129, pp. 7831-7840; 11) WO 2010/037059; 12) US 2010/0227990 A1; 13) WO 2002/38628 A2; 14) US 2014/0256893; 15) Guerin, F.; McConville, D. H.; Vittal, J. J., Organometallics, 1996, 15, p. 5586.

There is still a need in the art for new and improved catalyst systems for the polymerization of olefins, in order to achieve specific polymer properties, such as long chain branching, high vinyl content, to increase conversion or comonomer incorporation, or to alter comonomer distribution.

SUMMARY OF THE INVENTION

This invention relates to processes to produce branched propylene copolymers comprising:

1) contacting monomer comprising propylene, ethylene and optional diene with a catalyst system comprising an activator, a metal hydrocarbenyl chain transfer agent (such as an aluminum vinyl transfer agent), and one or more single site catalyst complexes, such as pyridyldiamido or quinolinyldiamido complexes represented by the Formula I or II;

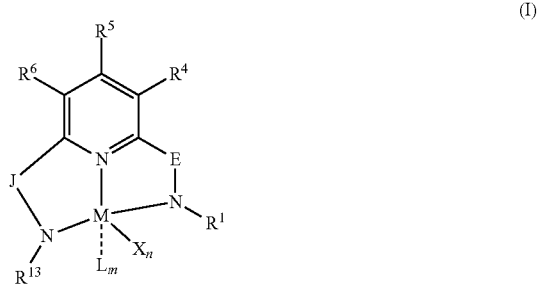

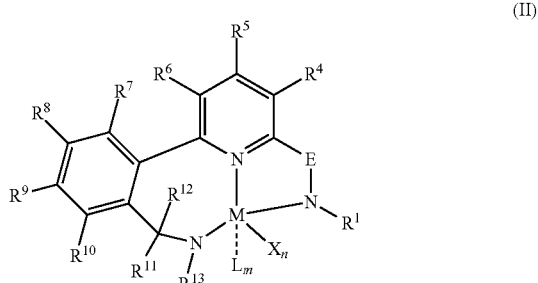

wherein:
M is a Group 3, 4, 5, 6, 7, 8, 9, or 10 metal;
E is chosen from C(R$^2$) or C(R$^3$)(R$^3$');
X is an anionic leaving group;
L is a neutral Lewis base;
R$^1$ and R$^{13}$ are independently selected from the group consisting of hydrocarbyls, substituted hydrocarbyls, and silyl groups;

$R^2$ is a group containing 1-10 carbon atoms that is optionally joined with $R^4$ to form an aromatic ring;
$R^3$, $R^{3'}$, $R^4$, $R^5$, $R^6$, $R^7$, $R^8$, $R^9$, $R^{10}$, $R^{11}$, and $R^{12}$ are each independently selected from the group consisting of hydrogen, hydrocarbyls, alkoxy, silyl, amino, aryloxy, substituted hydrocarbyls, halogen, and phosphino;
J is a divalent group that forms a three-atom-length bridge between the pyridine ring and the amido nitrogen;
n is 1 or 2;
m is 0, 1, or 2;
two X groups may be joined together to form a dianionic group;
two L groups may be joined together to form a bidentate Lewis base;
an X group may be joined to an L group to form a monoanionic bidentate group;
adjacent groups from the following $R^3$, $R^{3'}$, $R^4$, $R^5$, $R^6$, $R^7$, $R^8$, $R^9$, $R^{10}$, $R^{11}$, and $R^{12}$ may be joined to form a ring; and
2) obtaining branched propylene copolymers comprising from about 99 to 30 wt % propylene, from 1 to 70 wt % ethylene, from 0 to 20 wt % diene monomer, and a remnant of the metal hydrocarbenyl chain transfer agent, wherein said branched propylene copolymer: a) has a $g'_{vis}$ of less than 0.97; b) is essentially gel free (such as 5 wt % or less of xylene insoluble material); c) has an Mw of 50,000 g/mol or more; and d) has a Mw/Mn of less than 4.0.

This invention also relates to processes where the metal hydrocarbenyl chain transfer agent in the above catalyst systems is one or more aluminum vinyl transfer agents (AVTA) represented by formula:

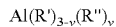

$$Al(R')_{3-v}(R'')_v$$

wherein each R', independently, is a $C_1$-$C_{30}$ hydrocarbyl group; each R", independently, is a $C_4$-$C_{20}$ hydrocarbyl group having an end-vinyl group; and v is from 0.1 to 3.

This invention further relates to novel branched propylene copolymers comprising from about 99 to 30 wt % propylene, from 1 to 70 wt % ethylene, from 0 to 20 wt % diene monomer, and a remnant of the metal hydrocarbenyl chain transfer agent, wherein said branched propylene copolymer: a) has a $g'_{vis}$ of less than 0.97; b) is essentially gel free (such as 5 wt % or less of xylene insoluble material); c) has an Mw of 50,000 g/mol or more; and d) has a Mw/Mn of less than 4.0.

BRIEF DESCRIPTION OF THE FIGURE

The FIGURE is a drawing of the reaction of iBu$_2$AlH and 1,7 octadiene at various conditions. Compounds 1 and 2 represent average compositions as hydrocarbyl and hydrocarbenyl groups may exchange between Al centers. Triene product 3 may be a mixture of similar molecules containing a vinylidene group.

DETAILED DESCRIPTION OF THE INVENTION

Definitions

This invention relates processes to produce propylene copolymers using transition metal complexes and catalyst systems that include the transition metal complexes. The term complex is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization or oligomerization function using an activator which is believed to create a cation as a result of the removal of an anionic group, often referred to as a leaving group, from the transition metal.

As used herein, the numbering scheme for the Periodic Table groups is the new notation as set out in Chemical and Engineering News, 63(5), 27 (1985).

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$ hr$^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kgP/molcat).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An oligomer is typically a polymer having a low molecular weight, such as an Mn of less than 25,000 g/mol, or in an embodiment less than 2,500 g/mol, or a low number of mer units, such as 75 mer units or less or 50 mer units or less. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on, except that, for the purposes of this invention and the claims thereto, the branched propylene copolymers described herein are defined as propylene copolymers even though they have 30 mol % or more propylene for ease of reference.

For the purposes of this invention, ethylene shall be considered an α-olefin.

For purposes of this invention and the claims thereto, when a polymer is referred to as comprising a metal hydrocarbenyl chain transfer agent, the metal hydrocarbenyl chain transfer agent present in such polymer or copolymer is the polymerized portion of the metal hydrocarbenyl chain transfer agent, also referred to as the remnant of the metal hydrocarbenyl chain transfer agent. The remnant of a metal hydrocarbenyl chain transfer agent is defined to be the portion of the metal hydrocarbenyl chain transfer agent containing an allyl chain end that becomes incorporated into the polymer backbone. For example if the allyl chain end of the metal hydrocarbenyl chain transfer agent is CH$_2$=CH—(CH$_2$)$_6$, the sp$^2$ carbons of the metal hydrocarbenyl chain transfer agent become a part of the polymer backbone and the —(CH$_2$)$_6$, becomes a part of a side chain.

For purposes of this invention and claims thereto, the term "substituted" means that a hydrogen group has been replaced with a heteroatom, or a heteroatom-containing group. For example, a "substituted hydrocarbyl" is a radical made of carbon and hydrogen where at least one hydrogen is replaced by a heteroatom or heteroatom-containing group.

A metallocene catalyst is defined as an organometallic compound with at least one π-bound cyclopentadienyl moiety (or substituted cyclopentadienyl moiety) and more frequently two π-bound cyclopentadienyl moieties or substituted cyclopentadienyl moieties.

As used herein, M$_n$ is number average molecular weight, M$_w$ is weight average molecular weight, and M$_z$ is z average molecular weight, wt % is weight percent, and mol % is mole percent. Molecular weight distribution (MWD), also referred to as polydispersity index (PDI), is defined to be M$_w$ divided by M$_n$. Unless otherwise noted, all molecular weight units (e.g., M$_w$, M$_n$, M$_z$) are g/mol.

Unless otherwise noted all melting points (Tm) are DSC second melt.

The following abbreviations may be used herein: dme is 1,2-dimethoxyethane, Me is methyl, Ph is phenyl, Et is ethyl, Pr is propyl, iPr is isopropyl, n-Pr is normal propyl, Bu is butyl, cPR is cyclopropyl, iBu is isobutyl, tBu is tertiary butyl, p-tBu is para-tertiary butyl, nBu is normal butyl, sBu is sec-butyl, TMS is trimethylsilyl, TIBAL is triisobutylaluminum, TNOAL is tri(n-octyl)aluminum, MAO is methylalumoxane, p-Me is para-methyl, Ph is phenyl, Bn is benzyl (i.e., CH$_2$Ph), THF (also referred to as thf) is tetrahydrofuran, RT is room temperature (and is 23° C. unless otherwise indicated), tol is toluene, EtOAc is ethyl acetate, Cy is cyclohexyl and AVTA is an aluminum-based vinyl transfer agent.

A "catalyst system" comprises at least one catalyst compound and at least one activator. When "catalyst system" is used to describe such the catalyst compound/activator combination before activation, it means the unactivated catalyst complex (pre-catalyst) together with an activator and, optionally, a co-activator. When it is used to describe the combination after activation, it means the activated complex and the activator or other charge-balancing moiety. The transition metal compound may be neutral as in a pre-catalyst, or a charged species with a counter ion as in an activated catalyst system. For the purposes of this invention and the claims thereto, when catalyst systems are described as comprising neutral stable forms of the components, it is well understood by one of ordinary skill in the art, that the ionic form of the component is the form that reacts with the monomers to produce polymers.

In the description herein, the catalyst may be described as a catalyst precursor, pre-catalyst compound, catalyst compound, transition metal complex, or transition metal compound, and these terms are used interchangeably. A polymerization catalyst system is a catalyst system that can polymerize monomers to polymer. An "anionic ligand" is a negatively charged ligand which donates one or more pairs of electrons to a metal ion. A "neutral donor ligand" is a neutrally charged ligand which donates one or more pairs of electrons to a metal ion. Activator and cocatalyst are also used interchangeably.

A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments a co-activator can be pre-mixed with the transition metal compound to form an alkylated transition metal compound.

Non-coordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the noncoordinating anion. Suitable metals include, but are not limited to, aluminum, gold, and platinum. Suitable metalloids include, but are not limited to, boron, aluminum, phosphorus, and silicon. Activators containing non-coordinating anions can also be referred to as stoichiometric activators. A stoichiometric activator can be either neutral or ionic. The terms ionic activator and stoichiometric ionic activator can be used interchangeably. Likewise, the terms neutral stoichiometric activator and Lewis acid activator can be used interchangeably. The term non-coordinating anion activator includes neutral stoichiometric activators, ionic stoichiometric activators, ionic activators, and Lewis acid activators.

For purposes of this invention and claims thereto in relation to catalyst compounds, the term "substituted" means that a hydrogen group has been replaced with a hydrocarbyl group, a heteroatom, or a heteroatom-containing group. For example, methyl cyclopentadiene (Cp) is a Cp group substituted with a methyl group.

For purposes of this invention and claims thereto, "alkoxides" include those where the alkyl group is a C$_1$ to C$_{10}$ hydrocarbyl. The alkyl group may be straight chain, branched, or cyclic. The alkyl group may be saturated or unsaturated. In some embodiments, the alkyl group may comprise at least one aromatic group.

The terms "hydrocarbyl radical," "hydrocarbyl," "hydrocarbyl group," "alkyl radical," and "alkyl" are used interchangeably throughout this document. Likewise, the terms "group," "radical," and "substituent" are also used interchangeably in this document. For purposes of this disclosure, "hydrocarbyl radical" is defined to be C1-C100 radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least one halogen (such as Br, Cl, F or I) or at least one functional group such as NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$, and the like, or where at least one heteroatom has been inserted within a hydrocarbyl ring.

The term "alkenyl" or "hydrocarbenyl" means a straight-chain, branched-chain, or cyclic hydrocarbon radical having one or more double bonds that are not part of an aromatic ring. These alkenyl radicals may, optionally, be substituted. Examples of alkenyl radicals include, but are not limited to, ethenyl, propenyl, allyl, 1,4-butadienyl cyclopropenyl, cyclobutenyl, cyclopentenyl, cyclohexenyl, cyclooctenyl, and the like, including their substituted analogues.

The term "alkoxy" or "alkoxide" means an alkyl ether or aryl ether radical wherein the term alkyl is as defined above. Examples of suitable alkyl ether radicals include, but are not limited to, methoxy, ethoxy, n-propoxy, iso-propoxy, n-butoxy, iso-butoxy, sec-butoxy, tert-butoxy, phenoxyl, and the like.

The term "aryl" or "aryl group" means a six carbon aromatic ring and the substituted variants thereof, including but not limited to, phenyl, 2-methyl-phenyl, xylyl, 4-bromo-xylyl. Likewise, heteroaryl means an aryl group where a ring carbon atom (or two or three ring carbon atoms) has been replaced with a heteroatom, preferably N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

The term "continuous" means a system that operates without interruption or cessation. For example, a continuous process to produce a polymer would be one where the reactants are continually introduced into one or more reactors and polymer product is continually withdrawn.

A solution polymerization means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, Ind. Eng. Chem. Res., 29, 2000, 4627.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, preferably less than 10 wt %, preferably less than 1 wt %, preferably 0 wt %.

Process

This invention relates to processes to produce branched propylene copolymers comprising:

1) contacting monomer comprising propylene, ethylene and optional diene with a catalyst system comprising an activator (such as an alumoxane or non-coordinating anion activator), a metal hydrocarbenyl chain transfer agent (preferably an aluminum vinyl transfer agent), and one or more single site catalyst complexes, such as a pyridyldiamido or quinolinyldiamido complex represented by the Formula I or II:

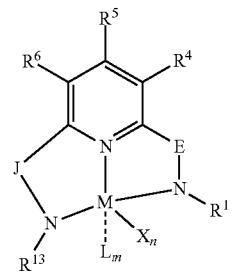

(I)

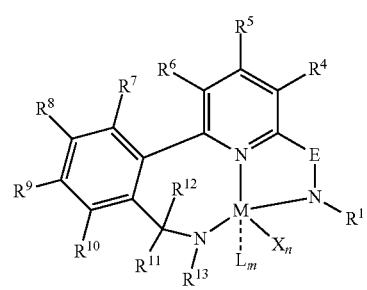

(II)

wherein:

M is a Group 3, 4, 5, 6, 7, 8, 9, or 10 metal (preferably M is Zr or Hf);

E is chosen from $C(R^2)$ or $C(R^3)(R^{3'})$;

X is an anionic leaving group (preferably X is methyl, chloride, or dialkylamido);

L is a neutral Lewis base (preferably L is ether, amine, phosphine, or thioether);

$R^1$ and $R^{13}$ are independently selected from the group consisting of hydrocarbyls, substituted hydrocarbyls, and silyl groups (preferably $R^1$ & $R^{13}$ are aryl groups, preferably $R^1$ is 2,6-disubstituted aryl, preferably $R^1$ is 2,6-diisopropylphenyl, preferably $R^{13}$ is 2-substituted aryl, preferably $R^{13}$ is phenyl, preferably $R^1$ is 2,6-disubstituted aryl group and $R^{13}$ is an aryl group lacking substitution in the 2 and 6 positions);

$R^2$ is a group containing 1-10 carbon atoms that is optionally joined with $R^4$ to form an aromatic ring (preferably $R^2$ & $R^4$ are joined with the joined $R^2R^4$ group being CHCHCH);

$R^3$, $R^{3'}$, $R^4$, $R^5$, $R^6$, $R^7$, $R^8$, $R^9$, $R^{10}$, $R^{11}$, and $R^{12}$ are each independently selected from the group consisting of hydrogen, hydrocarbyls, alkoxy, silyl, amino, aryloxy, substituted hydrocarbyls, halogen, and phosphino (preferably $R^3$ & $R^{3'}$ are hydrogen);

J is a divalent group that forms a three-atom-length bridge between the pyridine ring and the amido nitrogen (preferably J is selected from the following structures);

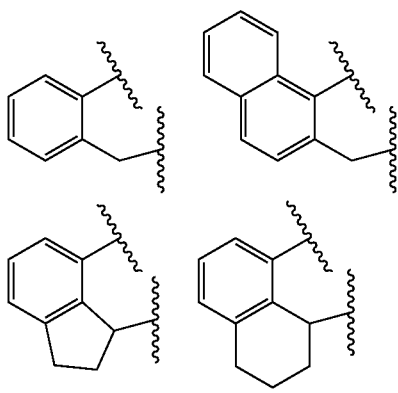

n is 1 or 2;
m is 0, 1, or 2; and
two X groups may be joined together to form a dianionic group;
two L groups may be joined together to form a bidentate Lewis base;
an X group may be joined to an L group to form a monoanionic bidentate group; adjacent groups from the following $R^3$, $R^{3'}$, $R^4$, $R^5$, $R^6$, $R^7$, $R^8$, $R^9$, $R^{10}$, $R^{11}$, and $R^{12}$ may be joined to form a ring (preferably $R^7$ & $R^8$ are joined to form an aromatic ring, preferably $R^7$ & $R^8$ are joined with the joined $R^7R^8$ group being CHCHCHCH, preferably $R^{10}$ & $R^{11}$ are joined to form a five- or six-membered ring, preferably $R^{10}$ & $R^{11}$ are joined, with the joined $R^{10}R^{11}$ group being $CH_2CH_2$ or $CH_2CH_2CH_2$);
where the metal hydrocarbenyl chain transfer agent is represented by the formula: $Al(R')_{3-v}(R'')_v$ or $E[Al(R')_{2-y}(R'')_y]_2$, wherein each R', independently, is a $C_1$ to $C_{30}$ hydrocarbyl group; each R'', independently, is a $C_4$ to $C_{20}$ hydrocarbenyl group having an allyl chain end; E is a group 16 element (such as O or S); v is from 0.01 to 3 (such as 1 or 2), and y is from 0.01 to 2, such as 1 or 2 (preferably the metal hydrocarbenyl chain transfer agent is an aluminum vinyl-transfer agent (AVTA) represented by the formula: $Al(R')_{3-v}(R)_v$ with R defined as a hydrocarbenyl group containing 4 to 20 carbon atoms and featuring an allyl chain end, R' defined as a hydrocarbyl group containing 1 to 30 carbon atoms, and v is 0.1 to 3 (such as 1 or 2)); and
2) obtaining branched propylene copolymers comprising from about 99 to 30 wt % propylene, from 1 to 70 wt % ethylene, from 0 to 20 wt % diene monomer, and a remnant of the metal hydrocarbenyl chain transfer agent, wherein said branched propylene copolymer: a) has a $g'_{vis}$ of less than 0.97; b) is essentially gel free (such as 5 wt % or less of xylene insoluble material); c) has an Mw of 50,000 g/mol or more; and d) has a Mw/Mn of less than 4.0.

The catalyst/activator combinations are formed by combining the transition metal complex with activators in any manner known from the literature, including by supporting them for use in slurry or gas phase polymerization. The catalyst/activator combinations may also be added to or generated in solution polymerization or bulk polymerization (in the monomer). The metal hydrocarbenyl chain transfer agent (preferably an aluminum vinyl transfer agent) may be added to the catalyst and or activator before, during or after the activation of the catalyst complex or before or during polymerization. Typically, the metal hydrocarbenyl chain transfer agent (preferably the aluminum vinyl-transfer agent) is added to the polymerization reaction separately, such as before, the catalyst/activator pair.

The polymer produced from the polymerization using the catalyst systems described herein preferably contains at least 0.05 allyl chain ends per polymer chain, 0.1 allyl chain ends per polymer chain, at least 0.2 allyl chain ends per polymer chain, at least 0.3 allyl chain ends per polymer chain, at least 0.4 allyl chain ends per polymer chain, at least 0.5 allyl chain ends per polymer chain, at least 0.6 allyl chain ends per polymer chain, at least 0.7 allyl chain ends per polymer chain, at least 0.8 allyl chain ends per polymer chain, at least 0.8 allyl chain ends per polymer chain, at least 1.0 allyl chain ends per polymer chain. Propylene copolymers are particularly preferred products. If the catalyst complex chosen is also capable of incorporating bulky alkene monomers, such as $C_6$ to $C_{20}$ alpha olefins, into the growing polymer chain, then the resulting polymer may contain long chain branches formed by the insertion of an allyl terminated polymer chain formed in situ (also referred to as a "vinyl-terminated macromonomer") into the growing polymer chains. Process conditions including residence time, the ratio of monomer to polymer in the reactor, and the ratio of transfer agent to polymer will affect the amount of long chain branching in the polymer, the average length of branches, and the type of branching observed. A variety of branching types may be formed, which include comb architectures and branch on branch structures similar to those found in low-density polyethylene. The combination of chain growth and vinyl-group insertion may lead to polymer with a branched structure and having one or fewer vinyl unsaturations per polymer molecule. The absence of significant quantities of individual polymer molecules containing greater than one vinyl unsaturation prevents or reduces the formation of unwanted crosslinked polymers. Polymers having long chain branching typically have a g'vis of 0.97 or less, alternately 0.95 or less, alternately 0.90 or less, alternately 0.85 or less, alternately 0.80 or less, alternately 0.75 or less, alternately 0.70 or less, alternately 0.60 or less.

If the catalyst chosen is poor at incorporating comonomers such as $C_2$ to $C_{20}$ alpha olefins, then the polymer obtained is largely linear (little or no long chain branching). Likewise, process conditions including the ratio of transfer agent to polymer will affect the molecular weight of the polymer. Polymers having little or no long chain branching typically have a g'vis of more than 0.97, alternately 0.98 or more.

Alkene polymerizations and co-polymerizations using one or more transfer agents, such as an AVTA, with two or more catalysts are also of potential use. Desirable products that may be accessed with this approach includes polymers that have branch block structures and/or high levels of long-chain branching.

The transfer agent to catalyst complex equivalence ratio can be from about 1:100 to 500,000:1. Preferably, the molar ratio of transfer agent to catalyst complex is greater than one. Alternately, the molar ratio of transfer agent to catalyst complex is greater than 30:1. Preferably, the transfer agent is an aluminum vinyl transfer agent (AVTA) and the AVTA to catalyst complex equivalence ratio can be from about 1:100 to 500,000:1. Preferably the molar ratio of AVTA to catalyst complex is greater than one. More preferred the molar ratio of AVTA to catalyst complex is greater than 30:1.

The AVTA can also be used in combination with other chain transfer agents that are typically used as scavengers, such as trialkylaluminum compounds (where the alkyl groups are selected from $C_1$ to $C_{20}$ alkyl groups, preferably methyl, ethyl, propyl, butyl, pentyl, hexyl, heptyl, octyl, nonyl, decyl, undecyl, dodecyl, or an isomer thereof). Usefully the ATVA can be used in combination with a trialkyl aluminum compound such as tri-n-octylaluminum and tri-isobutylaluminum. The ATVA can also be used in combination with a dialkyl zinc compound, such as diethylzinc, dimethylzinc, or dipropylzinc.

The transfer agent can also be used in combination with oxygen-containing organoaluminums such as bis(diisobutylaluminum)oxide, MMAO-3A, and other alumoxanes. Certain of these oxygen-containing organoaluminums are expected to serve as scavengers while remaining significantly less prone to hydrocarbyl group chain-transfer than typical organoaluminums, such as trimethylaluminum or tri(n-octyl)aluminum.

The production of di-end-functionalized polymers is possible with this technology. One product, prior to exposure to air, from an alkene polymerization performed in the presence of AVTA is the aluminum-capped species $Al(R')_{3-v}$(polymer-CH=CH$_2$)$_v$, where v is 0.1 to 3 (alternately 1 to 3, alternately 1, 2, or 3). The Al-carbon bonds will react with a variety of electrophiles (and other reagents), such as oxygen, halogens, carbon dioxide, and the like. Thus, quenching the reactive polymer mixture with an electrophile prior to exposure to atmosphere would yield a di-end-functionalized product of the general formula: Z-(monomers)$_n$-CH=CH$_2$, where Z is a group from the reaction with the electrophile and n is an integer, such as from 1 to 1,000,000, alternately from 2 to 50,000, alternately from 10 to 25,000. For example, quenching with oxygen yields a polymer functionalized at one end with a hydroxy group and at the other end with a vinyl group. Quenching with bromine yields a polymer functionalized at one end with a Br group and at the other end with a vinyl group.

Functional group terminated polymers can also be produced using functional group transfer agents (FGTA). In this embodiment of the invention, the FGTA is represented by the formula $M^{FGTA}(R')_{3-v}(FG)_v$, with R' and v defined as above, $M^{FGTA}$ a Group 13 element (such as B or Al), and with FG defined as a group containing 1 to 20 carbon atoms and a functional group Z. The choice of FG is such that it is compatible with the catalyst system being used. Preferred Z groups include, but are not limited to, non-vinyl olefinic groups such as vinylidene, vinylene or trisubstitued olefins, cyclics containing unsaturation such as cyclohexene, cyclooctene, vinyl cyclohexene, aromatics, ethers, and metal-capped alkoxides.

In another embodiment of the invention, the polymer products of this invention are of the formula: polymer-(CH$_2$)$_n$ CH=CH$_2$ where n is from 2 to 18, preferably from 6 to 14, more preferably 6, and where "polymer" is the attached polymeryl chain. Polymers of this formula are particularly well suited in making branch polymer combs. The polymer combs can be made by any number of methods. One method would be to use a catalyst system to make the vinyl terminated polymer, and then use a second catalyst system to incorporate the vinyl terminated polymer into a polymer backbone made from the second catalyst. This can be done sequentially in one reactor by first making the vinyl terminated polymer and then adding a second catalyst and, optionally, different monomer feeds in the same reactor. Alternatively, two reactors in series can be used where the first reactor is used to make the vinyl terminated polymer which flows into a second reactor in series having the second catalyst and, optionally, different monomer feeds. The vinyl terminated polymer can be a soft material, as in an ethylene propylene copolymer (such as ethylene propylene copolymer rubber), low density polyethylene, or a polypropylene, or a harder material, as in an isotactic polypropylene, high density polyethylene, or other polyethylene. Typically, if the vinyl terminated polymer is soft, it is useful if the polymer backbone of the comb is hard; if the vinyl terminated polymer is hard, it is useful the polymer backbone of the comb is soft, however any combination of polymer structures and types can be used.

In another embodiment of the invention, the vinyl-terminated polymers (VTPs) of this invention are of formula: polymer-(CH$_2$)$_n$CH=CH$_2$ where n is from 2 to 18, preferably from 6 to 14, more preferably 6, and where "polymer" is the attached polymeryl chain. VTPs of this formula are particularly well suited in making branch block polymers. The branch block polymers can be made by any number of methods. One method involves using the same catalyst that is used to make the VTP, and then changing polymerization conditions (such as, but not limited to, by changing monomer composition and/or type and/or the amount or presence of AVTA) in the same or different reactor (such as two or more reactors in series). In this case, the branch will have a different polymeric composition vs. the polymer backbone created under the different polymerization conditions. Another method would be to use a catalyst system to make the VTP, then use a second catalyst system to incorporate the VTPs into a polymer backbone made from the second catalyst. This can be done sequentially in one reactor by first making the VTP and then adding a second catalyst and, optionally, different monomer feeds in the same reactor. Alternatively, two reactors in series can be used where the first reactor is used to make the VTP which flows into a second reactor in series having the second catalyst and, optionally, different monomer feeds. The branched block polymers can be of any composition, however, typically a combination of soft and hard polymers (relative to one another) are preferred. For example, an iPP VTP could be produced in a reactor, and then ethylene added to the existing propylene feed to make a rubber EP that would have iPP branches. Or an iPP VTP could be produced in a first reactor, and then sent to a second reactor containing ethylene (or additional ethylene for a propylene ethylene copolymer and, optionally, additional propylene monomer (and the same or different catalyst) to make a rubber EP that would have iPP branches (or propylene ethylene copolymer branches).

Useful metal hydrocarbenyl chain transfer agents (preferably the aluminum vinyl transfer agents) are typically present at from 10 or 20 or 50 or 100 equivalents to 600 or 700 or 800 or 1000 equivalents relative to the catalyst complex. Alternately, the metal hydrocarbenyl chain transfer agents are present at a catalyst complex-to-transfer agent molar ratio of from about 1:3000 to 10:1; alternatively 1:2000 to 10:1; alternatively 1:1000 to 10:1; alternatively, 1:500 to 1:1; alternatively 1:300 to 1:1; alternatively 1:200 to 1:1; alternatively 1:100 to 1:1; alternatively 1:50 to 1:1; alternatively 1:10 to 1:1.

In any embodiment of this invention where the aluminum vinyl transfer agent is present, the aluminum vinyl transfer agent is present at a catalyst complex-to-aluminum vinyl transfer agent molar ratio of from about 1:3000 to 10:1; alternatively 1:2000 to 10:1; alternatively 1:1000 to 10:1; alternatively, 1:500 to 1:1; alternatively 1:300 to 1:1; alternatively 1:200 to 1:1; alternatively 1:100 to 1:1; alternatively 1:50 to 1:1; alternatively 1:10 to 1:1, alternately from 1:1000 or more.

Transition Metal Complex

Transition metal complexes useful herein are certain "non-metallocene" olefin polymization catalysts that undergo alkyl group transfer with the AVTA at a rate that is much higher than the rate at which they undergo typical termination processes, such as beta hydride elimination or chain-transfer to monomer. The term "non-metallocene catalyst", also known as "post-metallocene catalyst" describe transition metal complexes that do not feature any pi-coordinated cyclopentadienyl anion donors (or the like) and are useful the polymerization of olefins when combined with common activators.

Particularly useful single site catalyst complexes include pyridyldiamido and quinolinyldiamido complexes represented by the Formulae I and II:

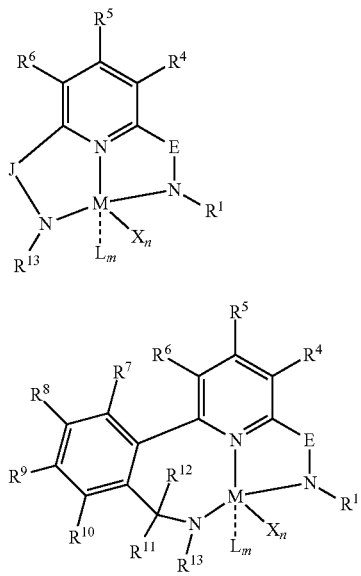

wherein:

M is a Group 3, 4, 5, 6, 7, 8, 9, or 10 metal (preferably M is Zr or Hf);

E is chosen from $C(R^2)$ or $C(R^3)(R^{3'})$;

X is an anionic leaving group (preferably X is methyl, chloride, or dialkylamido);

L is a neutral Lewis base (preferably L is ether, amine, phosphine, or thioether);

$R^1$ and $R^{13}$ are independently selected from the group consisting of hydrocarbyls, substituted hydrocarbyls, and silyl groups (preferably $R^1$ & $R^{13}$ are aryl groups, preferably $R^1$ is 2,6-disubstituted aryl, preferably $R^1$ is 2,6-diisopropylphenyl, preferably $R^{13}$ is 2-substituted aryl, preferably $R^{13}$ is phenyl, preferably $R^1$ is 2,6-disubstituted aryl group and $R^{13}$ is an aryl group lacking substitution in the 2 and 6 positions);

$R^2$ is a group containing 1-10 carbon atoms that is optionally joined with $R^4$ to form an aromatic ring (preferably $R^2$ & $R^4$ are joined, preferably with the joined $R^2R^4$ group being CHCHCH);

$R^3$, $R^{3'}$, $R^4$, $R^5$, $R^6$, $R^7$, $R^8$, $R^9$, $R^{10}$, $R^{11}$, and $R^{12}$ are each independently selected from the group consisting of hydrogen, hydrocarbyls, alkoxy, silyl, amino, aryloxy, substituted hydrocarbyls, halogen, and phosphino (preferably $R^3$ & $R^{3'}$ are hydrogen);

J is a divalent group that forms a three-atom-length bridge between the pyridine ring and the amido nitrogen (preferably J is selected from the following structures);

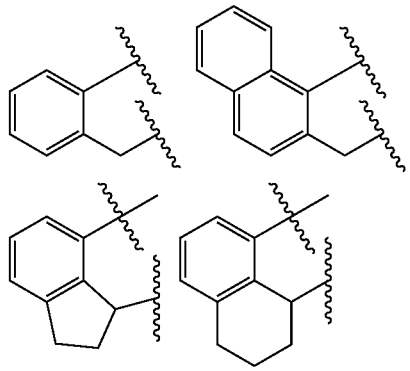

n is 1 or 2;

m is 0, 1, or 2;

two X groups may be joined together to form a dianionic group;

two L groups may be joined together to form a bidentate Lewis base;

an X group may be joined to an L group to form a monoanionic bidentate group; and adjacent groups from the following $R^3$, $R^{3'}$, $R^4$, $R^5$, $R^6$, $R^7$, $R^8$, $R^9$, $R^{10}$, $R^{11}$, and $R^{12}$ may be joined to form a ring (preferably $R^7$ & $R^8$ are joined to form an aromatic ring, preferably $R^7$ & $R^8$ are joined with the joined $R^7R^8$ group being CHCHCHCH, preferably $R^{10}$ & $R^{11}$ are joined to form a five- or six-membered ring, preferably $R^{10}$ & $R^{11}$ are joined with the joined $R^{10}R^{11}$ group being $CH_2CH_2$ or $CH_2CH_2CH_2$).

In a preferred embodiment, $R^4$ and E form a substituted or unsubstituted six-membered aromatic ring.

In yet further embodiments, useful catalyst compounds include those represented by the formula (6):

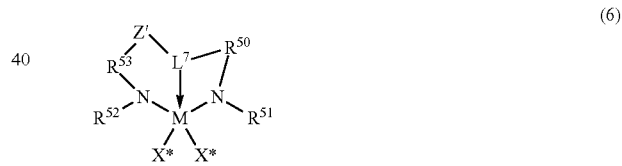

wherein (1) M is a group 4 metal, preferably hafnium; (2) N is nitrogen; (3) $L^7$ is a group that links $R^{50}$ to Z' by a three atom bridge with the central of the three atoms being a group 15 or 16 element that preferably forms a dative bond to M, and is a $C_5$-$C_{20}$ heteroaryl group containing a Lewis base functionality, especially a divalent pyridinyl, substituted pyridinyl, quinolinyl, or substituted quinolinyl group; (4) Z' is a divalent linker group, $(R^{56})_pC—C(R^{57})_q$, where $R^{56}$ and $R^{57}$ are independently selected from the group consisting of hydrogen, hydrocarbyls, substituted hydrocarbyls, and wherein adjacent $R^{56}$ and $R^{57}$ groups may be joined to form an aromatic or saturated, substituted or unsubstituted hydrocarbyl ring, wherein the ring has 5, 6, 7, or 8 ring carbon atoms and where the substituents on the ring can join to form additional rings, and p is 1 or 2 and q is 1 or 2; (5) $R^{50}$ and $R^{53}$ are each, independently, $ER^{54}R^{55}$ with E being carbon, silicon or germanium, and each $R^{54}$ and $R^{55}$ being independently selected from the group consisting of hydrogen, hydrocarbyls, substituted hydrocarbyls, alkoxy, silyl, amino, aryloxy, halogen and phosphino, and $R^{54}$ and $R^{55}$ may be joined to form a saturated heterocyclic ring, or a saturated substituted heterocyclic ring where substitutions on the ring can join to form additional rings; (6) $R^{51}$ and $R^{52}$ are independently selected from the group consisting of hydrocarbyls, substituted hydrocarbyls, silylcarbyls and substituted silylcarbyl groups; and (7) each X* is independently a univalent anionic ligand, or two X*s are joined and bound to the metal atom to form a metallocycle ring, or two X*s are joined to form a chelating ligand, a diene ligand, or an alkylidene ligand.

In yet further embodiments, useful catalyst compounds include pyridyl diamide metal complexes represented by the following Formula (6a):

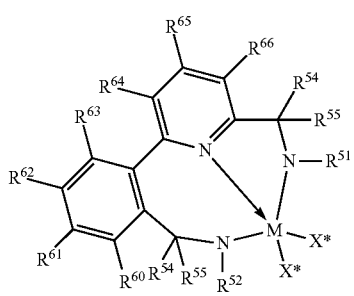

(6a)

wherein M, X*, N, $R^{51}$, $R^{52}$, $R^{54}$, and $R^{55}$ are as previously defined in formula (6); $R^{60}$, $R^{61}$, $R^{62}$, $R^{63}$, $R^{64}$, $R^{65}$, $R^{66}$ are independently selected from the group consisting of hydrogen, hydrocarbyls, substituted hydrocarbyls, alkoxy, aryloxy, halogen, amino, and silyl, and wherein any one or more adjacent $R^{60}$-$R^{66}$ may be joined to form a substituted or unsubstituted hydrocarbyl or heterocyclic ring, wherein the ring has 5, 6, 7, or 8 ring atoms and where substitutions on the ring can join to form additional rings.

In an embodiment of the invention, $R^{60}$ to $R^{66}$ are hydrogen.

In an embodiment of the invention, $R^{62}$ is joined with $R^{63}$ to form a phenyl ring fused to the existing phenyl ring (e.g., a naphthyl group), and $R^{60}$, $R^{61}$, $R^{64}$, $R^{65}$, and $R^{66}$ are independently hydrogen or an alkyl group, preferably hydrogen.

In an embodiment of the invention, each $R^{54}$ and $R^{55}$ are independently hydrogen, an alkyl group or an aryl group or substituted aryl group; preferably one or both $R^{54}$ or $R^{55}$ is hydrogen, or one $R^{54}$ or $R^{55}$ is hydrogen and the other is an aryl group or substituted aryl group. Preferred, but not limiting, aryl groups for $R^{54}$ or $R^{55}$ include phenyl, 2-methylphenyl, 2-ethylphenyl, 2-isopropylphenyl, and naphthyl.

In an embodiment of the invention, $R^{52}$ and $R^{51}$ are independently aryl or substituted aryl; preferably $R^{51}$ is a substituted phenyl group such as, but not limited to 2,6-diisopropylphenyl, 2,6-diethylphenyl, 2,6-dimethylphenyl, mesityl, and the like, and preferably $R^{52}$ is phenyl or a substituted phenyl group such as, but not limited to 2-tolyl, 2-ethylphenyl, 2-propylphenyl, 2-trifluoromethylphenyl, 2-fluorophenyl, mesityl, 2,6-diisopropylphenyl, 2,6-diethylphenyl, 2,6-dimethylphenyl, 3,5-di-tert-butylphenyl, and the like.

In yet further embodiments, useful catalyst compounds include pyridyl diamide metal complexes, such as those represented by the following Formula (6b):

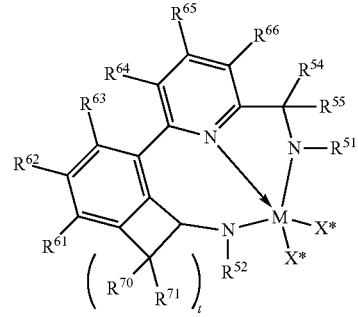

(6b)

wherein M, X*, N, $R^{51}$, $R^{52}$, $R^{54}$, $R^{55}$, $R^{61}$-$R^{66}$ are as previously defined as in formulae (6) and (6a); each $R^{70}$-$R^{71}$ are independently selected from the group consisting of hydrogen, hydrocarbyls, substituted hydrocarbyls, alkoxy, aryloxy, halogen, amino, and silyl, and wherein any one or more adjacent $R^{70}$-$R^{71}$ may be joined to form a substituted or unsubstituted hydrocarbyl or heterocyclic ring, wherein the ring has 5, 6, 7, or 8 ring atoms and where substitutions on the ring can join to form additional rings, and t is 2 or 3 (corresponding to cyclopentyl and cyclohexyl rings, respectively).

In an embodiment of the invention, $R^{61}$-$R^{66}$ are hydrogen.

In an embodiment of the invention, each $R^{70}$ and $R^{71}$ are independently hydrogen, and t is 2 or 3, preferably 2.

In an embodiment of the invention, each $R^{54}$ and $R^{55}$ are independently hydrogen, an alkyl group or an aryl group or substituted aryl group; preferably one or both $R^{54}$ or $R^{55}$ is hydrogen, or one $R^{54}$ or $R^{55}$ is hydrogen and the other is an aryl group or substituted aryl group. Preferred, but not limiting, aryl groups include phenyl and 2-methylphenyl, 2-ethylphenyl, 2-isopropylphenyl and naphthyl.

In an embodiment of the invention, $R^{52}$ and $R^{51}$ are independently aryl or substituted aryl; preferably $R^{51}$ is a substituted phenyl group such as, but not limited to 2,6-diisopropylphenyl, 2,6-diethylphenyl, 2,6-dimethylphenyl, mesityl, and the like, and preferably $R^{52}$ is phenyl or a substituted phenyl group such as, but not limited to 2-tolyl, 2-ethylphenyl, 2-propylphenyl, 2-trifluoromethylphenyl, 2-fluorophenyl, mesityl, 2,6-diisopropylphenyl, 2,6-diethylphenyl, 2,6-dimethylphenyl, 3,5-di-tert-butylphenyl, and the like.

In an embodiment of the invention, $R^{54}$, $R^{55}$, $R^{61}$-$R^{66}$, each $R^{70}$-$R^{71}$ are hydrogen, $R^{52}$ is phenyl, $R^{51}$ is 2,6-diisopropylphenyl and t is 2.

Non-limiting examples of pyridyl diamide catalysts that are useful herein are illustrated below, wherein X is methyl, benzyl, or chloro:

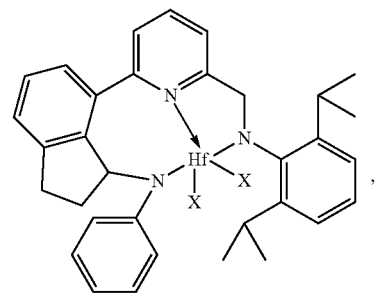

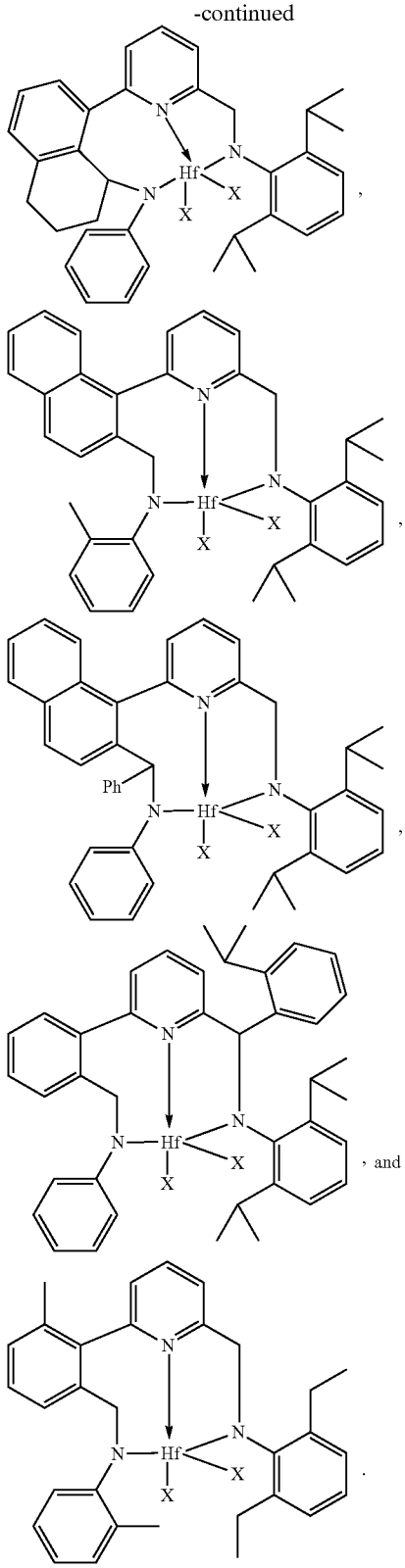

Additional pyridyl diamide transition metal complexes useful herein are described in US 2014/0316089; WO 2012/134614; WO 2012/134615; WO 2012/134613; US 2012/0071616; US 2011/0301310; and US 2010/0022726 and are incorporated by reference.

Transition metal complexes (also referred to as catalyst complexes or pre-catalyst complexes) useful herein include pyridyldiamido transition metal complexes represented by the Formula (A):

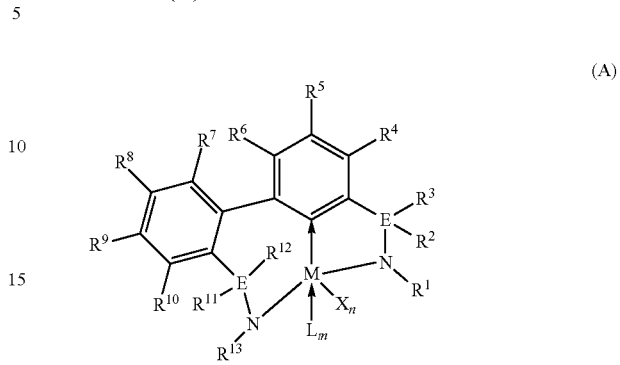

wherein:

M is a Group 3, 4, 5, 6, 7, 8, 9, 10, 11, or 12 metal;

E is selected from carbon, silicon, or germanium, preferably carbon;

X is an anionic leaving group, preferably alkyl, aryl, hydride, alkylsilane, fluoride, chloride, bromide, iodide, triflate, carboxylate, alkylsulfonate;

L is a neutral Lewis base, preferably ether, amine, thioether;

$R^1$ and $R^{13}$ are each independently selected from the group consisting of hydrocarbyls, substituted hydrocarbyls, and silyl groups, preferably aryl;

$R^2$, $R^3$, $R^4$, $R^5$, $R^6$, $R^7$, $R^8$, $R^9$, $R^{10}$, $R^{11}$, and $R^{12}$ are each independently selected from the group consisting of hydrogen, hydrocarbyls, alkoxy, silyl, amino, aryloxy, substituted hydrocarbyls, halogen, and phosphino;

n is 1 or 2;

m is 0, 1, or 2;

two X groups are optionally joined together to form a dianionic group;

two L groups are optionally joined together to form a bidentate Lewis base;

an X group may be joined to an L group to form a monoanionic bidentate group;

$R^7$ and $R^8$ are optionally joined to form a ring, preferably an aromatic ring, a six-membered aromatic ring with the joined $R^7$ and $R^8$ group being —CH=CHCH=CH—; and $R^{10}$ and $R^{11}$ are optionally joined to form a ring, preferably a five-membered ring with the joined $R^{10}$ and $R^{11}$ group being —CH$_2$CH$_2$—, a six-membered ring with the joined $R^{10}$ and $R^{11}$ group being —CH$_2$CH$_2$CH$_2$—.

In a preferred embodiment, $R^4$, $R^5$, and $R^6$ are independently selected from the group consisting of hydrogen, hydrocarbyls, substituted hydrocarbyls, alkoxy, aryloxy, halogen, amino, and silyl, and wherein adjacent R groups ($R^4$ and $R^5$ and/or $R^5$ and $R^6$) may be joined to form a substituted or unsubstituted hydrocarbyl or heterocyclic ring, where the ring has 5, 6, 7, or 8 ring atoms and where substitutions on the ring can join to form additional rings.

In another preferred embodiment, $R^7$, $R^8$, $R^9$, and $R^{10}$ are independently selected from the group consisting of hydrogen, hydrocarbyls, substituted hydrocarbyls, alkoxy, halogen, amino, and silyl, and wherein adjacent R groups ($R^7$ and $R^8$ and/or $R^9$ and $R^{10}$) may be joined to form a saturated, substituted or unsubstituted hydrocarbyl or heterocyclic ring, where the ring has 5, 6, 7, or 8 ring carbon atoms and where substitutions on the ring can join to form additional rings.

In still another preferred embodiment, n+m is not greater than 4.

In yet another preferred embodiment, $R^2$ and $R^3$ are each, independently, selected from the group consisting of hydrogen, hydrocarbyls, and substituted hydrocarbyls, alkoxy, silyl, amino, aryloxy, halogen, and phosphino, $R^2$ and $R^3$ may be joined to form a saturated, substituted or unsubstituted hydrocarbyl ring, where the ring has 4, 5, 6, or 7 ring carbon atoms and where substitutions on the ring can join to form additional rings, or $R^2$ and $R^3$ may be joined to form a saturated heterocyclic ring, or a saturated substituted heterocyclic ring where substitutions on the ring can join to form additional rings.

In still yet another preferred embodiment, $R^{11}$ and $R^{12}$ are each, independently, selected from the group consisting of hydrogen, hydrocarbyls, and substituted hydrocarbyls, alkoxy, silyl, amino, aryloxy, halogen, and phosphino, $R^{11}$ and $R^{12}$ may be joined to form a saturated, substituted or unsubstituted hydrocarbyl ring, where the ring has 4, 5, 6, or 7 ring carbon atoms and where substitutions on the ring can join to form additional rings, or $R^{11}$ and $R^{12}$ may be joined to form a saturated heterocyclic ring, or a saturated substituted heterocyclic ring where substitutions on the ring can join to form additional rings.

In a preferred embodiment, $R^1$ and $R^{13}$ may be independently selected from phenyl groups that are variously substituted with between zero to five substituents that include F, Cl, Br, I, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

Preferred $R^3$-E-$R^2$ groups and preferred $R^{12}$-E-$R^{11}$ groups include $CH_2$, $CMe_2$, $SiMe_2$, $SiEt_2$, $SiPr_2$, $SiBu_2$, $SiPh_2$, $Si(aryl)_2$, $Si(alkyl)_2$, CH(aryl), CH(Ph), CH(alkyl), and CH(2-isopropylphenyl), where alkyl is a $C_1$ to $C_{40}$ alkyl group (preferably $C_1$ to $C_{20}$ alkyl, preferably one or more of methyl, ethyl, propyl, butyl, pentyl, hexyl, heptyl, octyl, nonyl, decyl, undecyl, dodecyl, and isomers thereof), aryl is a $C_5$ to $C_{40}$ aryl group (preferably a $C_6$ to $C_{20}$ aryl group, preferably phenyl or substituted phenyl, preferably phenyl, 2-isopropylphenyl, or 2-tertbutylphenyl).

In a preferred embodiment, each X may be independently selected from halide, alkyl, aryl, alkoxy, amido, hydrido, phenoxy, hydroxy, silyl, allyl, alkenyl, triflate, alkylsulfonate, arylsulfonate, and alkynyl. The selection of the leaving groups depends on the synthesis route adopted for arriving at the complex and may be changed by additional reactions to suit the later activation method in polymerization. For example, alkyl is preferred when using non-coordinating anions such as N,N-dimethylanilinium tetrakis(pentafluorophenyl)-borate or tris(pentafluorophenyl)borane. In another embodiment, two L groups may be linked to form a dianionic leaving group, for example, oxalate.

In another embodiment of the invention, each L is independently selected from the group consisting of ethers, thio-ethers, amines, nitriles, imines, pyridines, and phosphines, preferably ethers.

In any embodiment of the invention described herein, M is preferably a Group 4 metal, preferably Zr or Hf.

In any embodiment of the invention described herein, each E is preferably carbon.

In any embodiment of the invention described herein, the transition metal complex is represented by the formula:

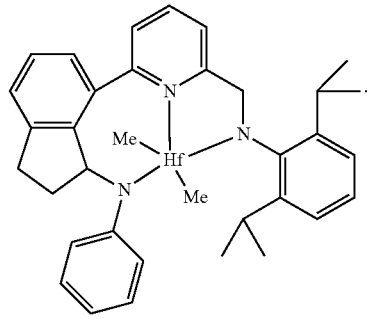

The pyridyl diamine ligands described herein are generally prepared in multiple steps in accordance with the disclosure of U.S. Pat. No. 9,290,519. An important step involves the preparation of a suitable "linker" group(s) containing both an aryl boronic acid (or acid ester) and an amine group. Examples of these include compounds of the general formula: 7-(boronic acid)-2,3-dihydro-1H-inden-1-(amine), 7-(boronic acid ester)-2,3-dihydro-1H-1-(amine), 7-(boronic acid)-1,2,3,4-tetrahydronaphthalen-1-(amine), 7-(boronic acid ester)-1,2,34-tetrahydronaphthalen-1-(amine), which include various boronic acids, boronic acid esters, and amines. The linker groups may be prepared in high yield from arylhalide precursors containing amine functionality by first deprotonation of the amine group with 1.0 molar equivalents of n-BuLi, followed by transmetalation of an arylhalide with t-BuLi and subsequent reaction with a boron-containing reagent. This amine-containing linker is then coupled with a suitable pyridine containing species, such as 6-bromo-2-pyridinecarboxaldehyde. This coupling step typically uses a metal catalyst (e.g., Pd $(PPh_3)_4$) in less than 5 mol % loading. Following this coupling step, the new derivative, which can be described as amine-linker-pyridine-aldehyde, is then reacted with a second amine to produce the imine derivative amine-linker-pyridine-imine in a condensation reaction. This can then be reduced to the pyridyl diamine ligand by reaction with a suitable aryl anion, alkyl anion, or hydride source. This reaction is generally performed in etherial solvents at temperatures between −100° C. and 50° C. when aryllithium or alkyllithium reagents are employed. This reaction is generally performed in methanol at reflux when sodium cyanoborohydride is employed.

The preparation of pyridyl diamide metal complexes from pyridyl diamines may be accomplished using typical protonolysis and methylation reactions. In the protonolysis reaction the pyridyl diamine is reacted with a suitable metal reactant to produce a pyridyldiamide metal complex. A suitable metal reactant will feature a basic leaving group that will accept a proton from the pyridiyl diamine and then generally depart and be removed from the product. Suitable metal reactants include, but are not limited to, $HfBn_4$ (Bn=$CH_2Ph$), $ZrBn_4$, $TiBn_4$, $ZrBn_2Cl_2(OEt_2)$, $HfBn_2Cl_2(OEt_2)_2$, $Zr(NMe_2)_2Cl_2$(dimethoxyethane), $Hf(NMe_2)_2Cl_2$(dimethoxyethane), $Hf(NMe_2)_4$, and $Hf(NEt_2)_4$. Pyridyldiamide metal complexes that contain metal-chloride groups, such as the PDA dichloride complex, can be alkylated by reaction with an appropriate organometallic reagent. Suitable reagents include organolithium and organomagnesium, and Grignard reagents. The alkylations are generally performed in etherial or hydrocarbon solvents or solvent mixtures at temperatures typically ranging from −100° C. to 50° C.

Another route to pyridyl diamide and other complexes of interest as catalysts involves the insertion of an unsaturated molecule into a covalent metal-carbon bond where the covalently bonded group is part of a multidentate ligand structure, such as that described by Boussie et al. in U.S. Pat. No. 6,750,345. The unsaturated molecule will generally have a carbon-X double or triple bond where X is a group 14 or group 15 or group 16 element. Examples of unsaturated molecules include alkenes, alkynes, imines, nitriles, ketones, aldehydes, amides, formamides, carbon dioxide, isocyanates, thioisocyanates, and carbodiimides. Examples showing the insertion reactions involving imines and carbonyls are found in U.S. Pat. No. 7,973,116 and US 2012/0071616.

In a preferred embodiment of the invention, the transition metal complex is not a metallocene. A metallocene catalyst is defined as an organometallic compound with at least one π-bound cyclopentadienyl moiety (or substituted cyclopentadienyl moiety) and more frequently two π-bound cyclopentadienyl moieties or substituted cyclopentadienyl moieties.

Usefully, the single site catalyst compounds useful herein are preferably tridentateligands bound to the transition metal (such as a group 4 metal), preferably tridentate N,N,N ligands bound to a transition metal (such as a Zr, Hf, or Ti).

In a preferred embodiment, the catalyst complexes are represented by the Formula (Ia) or (IIa):

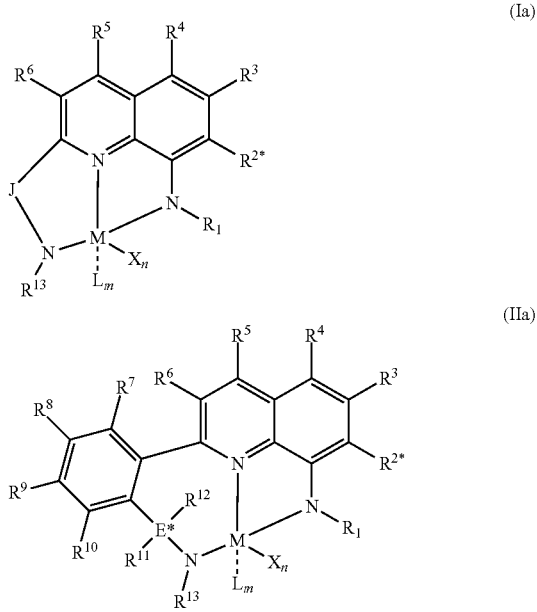

wherein:
M is a Group 3, 4, 5, 6, 7, 8, 9, or 10 metal;
J is a three-atom-length bridge between the quinoline and the amido nitrogen;
E* is selected from carbon, silicon, or germanium;
X is an anionic leaving group;
L is a neutral Lewis base;
$R^1$ and $R^{13}$ are independently selected from the group consisting of hydrocarbyls, substituted hydrocarbyls, and silyl groups;
$R^{2*}$ through $R^{12}$ are independently selected from the group consisting of hydrogen, hydrocarbyls, alkoxy, silyl, amino, aryloxy, substituted hydrocarbyls, halogen, and phosphino;
n is 1 or 2;
m is 0, 1, or 2
n+m is not greater than 4;
any two adjacent R groups (e.g., $R^1$ & $R^2$, $R^2$ & $R^3$, etc.) may be joined to form a substituted or unsubstituted hydrocarbyl or heterocyclic ring, where the ring has 5, 6, 7, or 8 ring atoms and where substitutions on the ring can join to form additional rings;
any two X groups may be joined together to form a dianionic group;
any two L groups may be joined together to form a bidentate Lewis base; and
an X group may be joined to an L group to form a monoanionic bidentate group.

Preferably, in formula Ia and IIa, M is a Group 3, 4, 5, 6, 7, 8, 9, or 10 metal (preferably a group 4 metal);
J is group comprising a three-atom-length bridge between the quinoline and the amido nitrogen, preferably a group containing up to 50 non-hydrogen atoms;
E* is carbon, silicon, or germanium;
X is an anionic leaving group, (such as a hydrocarbyl group or a halogen);
L is a neutral Lewis base;
$R^1$ and $R^{13}$ are independently selected from the group consisting of hydrocarbyls, substituted hydrocarbyls, and silyl groups;
$R^{2*}$, $R^3$, $R^4$, $R^5$, $R^6$, $R^7$, $R^8$, $R^9$, $R^{10}$, $R^{11}$, and $R^{12}$ are independently hydrogen, hydrocarbyl, alkoxy, silyl, amino, aryloxy, substituted hydrocarbyl, halogen, or phosphino;
n is 1 or 2;
m is 0, 1, or 2, where
n+m is not greater than 4;
any two adjacent R groups (e.g., $R^1$ & $R^2$, $R^2$ & $R^3$, etc.) may be joined to form a substituted hydrocarbyl, unsubstituted hydrocarbyl, substituted heterocyclic ring, or unsubstituted heterocyclic ring, where the ring has 5, 6, 7, or 8 ring atoms and where substitutions on the ring can join to form additional rings;
any two X groups may be joined together to form a dianionic group;
any two L groups may be joined together to form a bidentate Lewis base; and
any X group may be joined to an L group to form a monoanionic bidentate group.

Preferably, M is a Group 4 metal, such as zirconium or hafnium.

In a preferred embodiment, J is an aromatic substituted or unsubstituted hydrocarbyl (preferably a hydrocarbyl) having from 3 to 30 non-hydrogen atoms, preferably J is represented by the Formula:

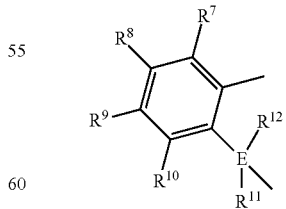

where $R^7$, $R^8$, $R^9$, $R^{10}$, $R^{11}$, $R^{12}$, and E are as defined above, and any two adjacent R groups (e.g., $R^7$ & $R^8$, $R^8$ & $R^9$, $R^9$ & $R^{10}$, $R^{10}$ & $R^{11}$, etc.) may be joined to form a substituted or unsubstituted hydrocarbyl or heterocyclic ring, where the ring has 5, 6, 7, or 8 ring atoms (preferably 5 or 6 atoms), and said ring may be saturated or unsaturated (such as partially unsaturated or aromatic), preferably J is an arylalkyl (such as arylmethyl, etc.) or dihydro-1H-indenyl, or tetrahydronaphthalenyl group.

In embodiments of the invention, J is selected from the following structures:

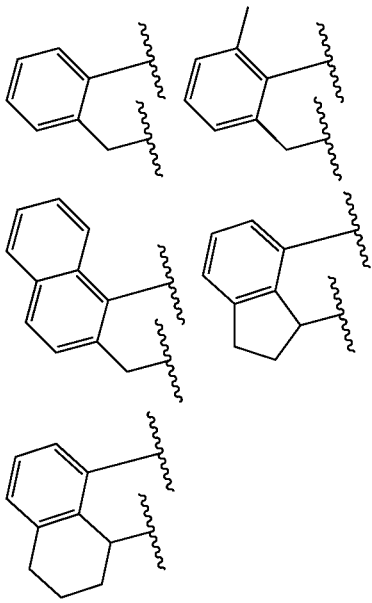

where ⸽ indicates connection to the complex.

In embodiments of the invention, E is carbon.

In embodiments of the invention, X is alkyl (such as alkyl groups having 1 to 10 carbons, such as methyl, ethyl, propyl, butyl, pentyl, hexyl, heptyl, octyl, nonyl, decyl, and isomers thereof), aryl, hydride, alkylsilane, fluoride, chloride, bromide, iodide, triflate, carboxylate, amido (such as $NMe_2$), or alkylsulfonate.

In embodiments of the invention, L is an ether, amine or thioether.

In embodiments of the invention, $R^7$ and $R^8$ are joined to form a six-membered aromatic ring with the joined $R^7R^8$ group being —CH=CHCH=CH—.

In embodiments of the invention, $R^{10}$ and $R^{11}$ are joined to form a five-membered ring with the joined $R^{10}R^{11}$ group being —$CH_2CH_2$—.

In embodiments of the invention, $R^{10}$ and $R^{11}$ are joined to form a six-membered ring with the joined $R^{10}R^{11}$ group being —$CH_2CH_2CH_2$—.

In embodiments of the invention, $R^1$ and $R^{13}$ may be independently selected from phenyl groups that are variously substituted with between zero to five substituents that include F, Cl, Br, I, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

In a preferred embodiment of the invention, the quinolinyldiamido transition metal complex represented by the Formula IIa above where: M is a Group 4 metal (preferably hafnium); E* is selected from carbon, silicon, or germanium (preferably carbon); X is an alkyl, aryl, hydride, alkylsilane, fluoride, chloride, bromide, iodide, triflate, carboxylate, amido, alkoxo, or alkylsulfonate; L is an ether, amine, or thioether; $R^1$ and $R^{13}$ are independently selected from the group consisting of hydrocarbyls, substituted hydrocarbyls, and silyl groups (preferably aryl); $R^{2*}$, $R^3$, $R^4$, $R^5$, $R^6$, $R^7$, $R^8$, $R^9$, $R^{10}$, $R^{11}$, and $R^{12}$ are independently hydrogen, hydrocarbyl, alkoxy, silyl, amino, aryloxy, substituted hydrocarbyls, halogen, and phosphino; n is 1 or 2; m is 0, 1, or 2; n+m is from 1 to 4; and two X groups may be joined together to form a dianionic group; two L groups may be joined together to form a bidentate Lewis base; an X group may be joined to an L group to form a monoanionic bidentate group; $R^7$ and $R^8$ may be joined to form a ring (preferably an aromatic ring, a six-membered aromatic ring with the joined $R^7R^8$ group being —CH=CHCH=CH—); $R^{10}$ and $R^{11}$ may be joined to form a ring (preferably a five-membered ring with the joined $R^{10}R^{11}$ group being —$CH_2CH_2$—, a six-membered ring with the joined $R^{10}R^{11}$ group being —$CH_2CH_2CH_2$—).

In embodiments of Formula Ia and IIa, $R^4$, $R^5$, and $R^6$ are independently selected from the group consisting of hydrogen, hydrocarbyls, substituted hydrocarbyls, alkoxy, aryloxy, halogen, amino, and silyl, and wherein adjacent R groups ($R^4$ & $R^5$ and/or $R^5$ & $R^6$) may be joined to form a substituted hydrocarbyl, unsubstituted hydrocarbyl, unsubstituted heterocyclic ring or substituted heterocyclic ring, where the ring has 5, 6, 7, or 8 ring atoms and where substitutions on the ring can join to form additional rings.

In embodiments of Formula Ia and IIa, $R^7$, $R^8$, $R^9$, and $R^{10}$ are independently selected from the group consisting of hydrogen, hydrocarbyls, substituted hydrocarbyls, alkoxy, halogen, amino, and silyl, and wherein adjacent R groups ($R^7$ and $R^8$, and/or $R^9$ and $R^{10}$) may be joined to form a saturated, substituted hydrocarbyl, unsubstituted hydrocarbyl, unsubstituted heterocyclic ring or substituted heterocyclic ring, where the ring has 5, 6, 7, or 8 ring carbon atoms and where substitutions on the ring can join to form additional rings.

In embodiments of Formula Ia or IIa, $R^{2*}$ and $R^3$ are each, independently, selected from the group consisting of hydrogen, hydrocarbyls, and substituted hydrocarbyls, alkoxy, silyl, amino, aryloxy, halogen, and phosphino, $R^{2*}$ and $R^3$ may be joined to form a saturated, substituted or unsubstituted hydrocarbyl ring, where the ring has 4, 5, 6, or 7 ring carbon atoms and where substitutions on the ring can join to form additional rings, or $R^{2*}$ and $R^3$ may be joined to form a saturated heterocyclic ring, or a saturated substituted heterocyclic ring where substitutions on the ring can join to form additional rings.

In embodiments of Formula Ia or IIa, $R^{11}$ and $R^{12}$ are each, independently, selected from the group consisting of hydrogen, hydrocarbyls, and substituted hydrocarbyls, alkoxy, silyl, amino, aryloxy, halogen, and phosphino, $R^{11}$ and $R^{12}$ may be joined to form a saturated, substituted or unsubstituted hydrocarbyl ring, where the ring has 4, 5, 6, or 7 ring carbon atoms and where substitutions on the ring can join to form additional rings, or $R^{11}$ and $R^{12}$ may be joined to form a saturated heterocyclic ring, or a saturated substituted heterocyclic ring where substitutions on the ring can join to form additional rings.

In embodiments of Formula Ia or IIa, $R^1$ and $R^{13}$ may be independently selected from phenyl groups that are variously substituted with between zero to five substituents that include F, Cl, Br, I, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

In embodiments of Formula IIa, preferred $R^{12}$-E*-$R^{11}$ groups include $CH_2$, $CMe_2$, $SiMe_2$, $SiEt_2$, $SiPr_2$, $SiBu_2$, $SiPh_2$, $Si(aryl)_2$, $Si(alkyl)_2$, CH(aryl), CH(Ph), CH(alkyl), and CH(2-isopropylphenyl), where alkyl is a $C_1$ to $C_{40}$ alkyl group (preferably $C_1$ to $C_{20}$ alkyl, preferably one or more of methyl, ethyl, propyl, butyl, pentyl, hexyl, heptyl, octyl, nonyl, decyl, undecyl, dodecyl, and isomers thereof), aryl is a $C_5$ to $C_{40}$ aryl group (preferably a $C_6$ to $C_{20}$ aryl group, preferably phenyl or substituted phenyl, preferably phenyl, 2-isopropylphenyl, or 2-tertbutylphenyl).

Preferably, the R groups above and other R groups mentioned hereafter, contain from 1 to 30, preferably from 2 to 20 carbon atoms, especially from 6 to 20 carbon atoms.

Preferably, M is Ti, Zr, or Hf, and E is carbon, with Zr or Hf based complexes being especially preferred.

In any embodiment of Formula IIa, described herein, E* is carbon and $R^{12}$ and $R^{11}$ are independently selected from phenyl groups that are substituted with 0, 1, 2, 3, 4, or 5 substituents selected from the group consisting of F, Cl, Br, I, $CF_3$, $NO_2$, alkoxy, dialkylamino, hydrocarbyl, and substituted hydrocarbyl groups with from one to ten carbons.

In any embodiment described herein of Formula IIa, $R^{11}$ and $R^{12}$ are independently selected from hydrogen, methyl, ethyl, phenyl, isopropyl, isobutyl, and trimethylsilyl.

In any embodiment described herein of Formula IIa, $R^7$, $R^8$, $R^9$, and $R^{10}$ are independently selected from hydrogen, methyl, ethyl, propyl, isopropyl, phenyl, cyclohexyl, fluoro, chloro, methoxy, ethoxy, phenoxy, and trimethylsilyl.

In any embodiment described herein of Formula Ia or IIa, $R^{2*}$, $R^3$, $R^4$, $R^5$, and $R^6$ are independently selected from the group consisting of hydrogen, hydrocarbyls, alkoxy, silyl, amino, substituted hydrocarbyls, and halogen.

In any embodiment described herein of Formula Ia or IIa, each L is independently selected from $Et_2O$, MeOtBu, $Et_3N$, $PhNMe_2$, $MePh_2N$, tetrahydrofuran, and dimethylsulfide.

In any embodiment described herein of Formula I or II, each X is independently selected from methyl, benzyl, trimethylsilyl, neopentyl, ethyl, propyl, butyl, phenyl, hydrido, chloro, fluoro, bromo, iodo, dimethylamido, diethylamido, dipropylamido, and diisopropylamido.

In any embodiment described herein of Formula Ia or IIa, $R^1$ is 2,6-diisopropylphenyl, 2,4,6-triisopropylphenyl, 2,6-diisopropyl-4-methylphenyl, 2,6-diethylphenyl, 2-ethyl-6-isopropylphenyl, 2,6-bis(3-pentyl)phenyl, 2,6-dicyclopentylphenyl, or 2,6-dicyclohexylphenyl.

In any embodiment described herein of Formula I or II, $R^{13}$ is phenyl, 2-methylphenyl, 2-ethylphenyl, 2-propylphenyl, 2,6-dimethylphenyl, 2-isopropylphenyl, 4-methylphenyl, 3,5-dimethylphenyl, 3,5-di-tert-butylphenyl, 4-fluorophenyl, 3-methylphenyl, 4-dimethylaminophenyl, or 2-phenylphenyl.

In any embodiment described herein of Formula IIa, wherein J is dihydro-1H-indenyl and $R^1$ is 2,6-dialkylphenyl or 2,4,6-trialkylphenyl.

In any embodiment described herein of Formula Ia or IIa, $R^1$ is 2,6-diisopropylphenyl and $R^{13}$ is a hydrocarbyl group containing 1, 2, 3, 4, 5, 6, or 7 carbon atoms.

For information on how to synthesize such complexes please see U.S. Ser. No. 62/357,033, filed Jun. 30, 2016.

Activators

The catalyst systems typically comprise a transition metal complex as described above and an activator such as alumoxane or a non-coordinating anion. Activation may be performed using alumoxane solution including methyl alumoxane, referred to as MAO, as well as modified MAO, referred to herein as MMAO, containing some higher alkyl groups to improve the solubility. Particularly useful MAO can be purchased from Albemarle, typically in a 10 wt % solution in toluene. The catalyst system employed in the present invention may use an activator selected from alumoxanes, such as methyl alumoxane, modified methyl alumoxane, ethyl alumoxane, iso-butyl alumoxane, and the like.

When an alumoxane or modified alumoxane is used, the complex-to-activator molar ratio is from about 1:3000 to 10:1; alternatively 1:2000 to 10:1; alternatively 1:1000 to 10:1; alternatively, 1:500 to 1:1; alternatively 1:300 to 1:1; alternatively 1:200 to 1:1; alternatively 1:100 to 1:1; alternatively 1:50 to 1:1; alternatively 1:10 to 1:1. When the activator is an alumoxane (modified or unmodified), some embodiments select the maximum amount of activator at a 5000-fold molar excess over the catalyst precursor (per metal catalytic site). The preferred minimum activator-to-complex ratio is 1:1 molar ratio.

Activation may also be performed using non-coordinating anions, referred to as NCA's, of the type described in EP 277 003 A1 and EP 277 004 A1. NCA may be added in the form of an ion pair using, for example, [DMAH]+ [NCA]– in which the N,N-dimethylanilinium (DMAH) cation reacts with a basic leaving group on the transition metal complex to form a transition metal complex cation and [NCA]–. The cation in the precursor may, alternatively, be trityl. Alternatively, the transition metal complex may be reacted with a neutral NCA precursor, such as $B(C_6F_5)_3$, which abstracts an anionic group from the complex to form an activated species. Useful activators include N,N-dimethylanilinium tetrakis (pentafluorophenyl)borate (i.e., $[PhNMe_2H]B(C_6F_5)_4$) and N,N-dimethylanilinium tetrakis (heptafluoronaphthyl)borate, where Ph is phenyl, and Me is methyl.

Additionally, preferred activators useful herein include those described in U.S. Pat. No. 7,247,687 at column 169, line 50 to column 174, line 43, particularly column 172, line 24 to column 173, line 53.

In an embodiment of the invention described herein, the non-coordinating anion activator is represented by the following Formula (1):

$$(Z)_d^+(A^{d-}) \quad (1)$$

wherein Z is (L-H) or a reducible Lewis acid; L is a neutral Lewis base; H is hydrogen and (L-H)+ is a Bronsted acid; $A^{d-}$ is a non-coordinating anion having the charge d–; and d is an integer from 1 to 3.

When Z is (L-H) such that the cation component is (L-H)d+, the cation component may include Bronsted acids such as protonated Lewis bases capable of protonating a moiety, such as an alkyl or aryl, from the catalyst precursor, resulting in a cationic transition metal species, or the activating cation (L-H)d+ is a Bronsted acid, capable of donating a proton to the catalyst precursor resulting in a transition metal cation, including ammoniums, oxoniums, phosphoniums, silyliums, and mixtures thereof, or ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid, it may be represented by the formula: $(Ar_3C^+)$, where Ar is aryl or aryl substituted with a heteroatom, or a $C_1$ to $C_{40}$ hydrocarbyl, the reducible Lewis acid may be represented by the formula: $(Ph_3C^+)$, where Ph is phenyl or phenyl substituted with a heteroatom, and/or a $C_1$ to $C_{40}$ hydrocarbyl. In an embodiment, the reducible Lewis acid is triphenyl carbenium.

Embodiments of the anion component Ad⁻ include those having the formula [Mk+Qn]d⁻ wherein k is 1, 2, or 3; n is 1, 2, 3, 4, 5, or 6, or 3, 4, 5, or 6; n−k=d; M is an element selected from Group 13 of the Periodic Table of the Elements, or boron or aluminum, and Q is independently a hydride, bridged or unbridged dialkylamido, halide, alkoxide, aryloxide, hydrocarbyl radicals, said Q having up to 20 carbon atoms with the proviso that in not more than one occurrence is Q a halide, and two Q groups may form a ring structure. Each Q may be a fluorinated hydrocarbyl radical having 1 to 20 carbon atoms, or each Q is a fluorinated aryl radical, or each Q is a pentafluoryl aryl radical. Examples of suitable Ad− components also include diboron compounds as disclosed in U.S. Pat. No. 5,447,895, which is fully incorporated herein by reference.

In an embodiment in any of the NCA's represented by Formula 1 described above, the anion component Ad− is represented by the formula [M*k*+Q*n*]d*− wherein k* is 1, 2, or 3; n* is 1, 2, 3, 4, 5, or 6 (or 1, 2, 3, or 4); n*−k*=d*; M* is boron; and Q* is independently selected from hydride, bridged or unbridged dialkylamido, halogen, alkoxide, aryloxide, hydrocarbyl radicals, said Q* having up to 20 carbon atoms with the proviso that in not more than 1 occurrence is Q* a halogen.

This invention also relates to a method to polymerize olefins comprising contacting olefins (such as propylene) with a catalyst complex as described above and an NCA activator represented by the Formula (2):

$$R_nM^{**}(ArNHal)_{4-n} \quad (2)$$

where R is a monoanionic ligand; M** is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA comprising an anion of Formula 2 also comprises a suitable cation that is essentially non-interfering with the ionic catalyst complexes formed with the transition metal compounds, or the cation is $Z_d^+$ as described above.

In an embodiment in any of the NCA's comprising an anion represented by Formula 2 described above, R is selected from the group consisting of $C_1$ to $C_{30}$ hydrocarbyl radicals. In an embodiment, $C_1$ to $C_{30}$ hydrocarbyl radicals may be substituted with one or more $C_1$ to $C_{20}$ hydrocarbyl radicals, halide, hydrocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means $C_4$ to $C_{20}$ hydrocarbyl radicals; —SRa, —NRa₂, and —PRa₂, where each Ra is independently a monovalent $C_4$ to $C_{20}$ hydrocarbyl radical comprising a molecular volume greater than or equal to the molecular volume of an isopropyl substitution or a $C_4$ to $C_{20}$ hydrocarbyl substituted organometalloid having a molecular volume greater than or equal to the molecular volume of an isopropyl substitution.

In an embodiment in any of the NCA's comprising an anion represented by Formula 2 described above, the NCA also comprises cation comprising a reducible Lewis acid represented by the formula: $(Ar_3C^+)$, where Ar is aryl or aryl substituted with a heteroatom, and/or a $C_1$ to $C_{40}$ hydrocarbyl, or the reducible Lewis acid represented by the formula: $(Ph_3C^+)$, where Ph is phenyl or phenyl substituted with one or more heteroatoms, and/or $C_1$ to $C_{40}$ hydrocarbyls.

In an embodiment in any of the NCA's comprising an anion represented by Formula 2 described above, the NCA may also comprise a cation represented by the formula, (L-H)d⁺, wherein L is a neutral Lewis base; H is hydrogen; (L-H) is a Bronsted acid; and d is 1, 2, or 3, or (L-H)d⁺ is a Bronsted acid selected from ammoniums, oxoniums, phosphoniums, silyliums, and mixtures thereof.

Further examples of useful activators include those disclosed in U.S. Pat. Nos. 7,297,653 and 7,799,879, which are fully incorporated by reference herein.

In an embodiment, an activator useful herein comprises a salt of a cationic oxidizing agent and a noncoordinating, compatible anion represented by the Formula (3):

$$(OX^{e+})_d(A^{d-})_e \quad (3)$$

wherein $OX^{e+}$ is a cationic oxidizing agent having a charge of e+; e is 1, 2, or 3; d is 1, 2, or 3; and $A^{d-}$ is a non-coordinating anion having the charge of d− (as further described above). Examples of cationic oxidizing agents include: ferrocenium, hydrocarbyl-substituted ferrocenium, $Ag^+$, or $Pb^{+2}$. Suitable embodiments of $A^{d-}$ include tetrakis(pentafluorophenyl)borate.

Activators useful in catalyst systems herein include: trimethylammonium tetrakis(perfluoronaphthyl)borate, N,N-dimethylanilinium tetrakis(perfluoronaphthyl)borate, N,N-diethylanilinium tetrakis(perfluoronaphthyl)borate, triphenylcarbenium tetrakis(perfluoronaphthyl)borate, trimethylammonium tetrakis(perfluorobiphenyl)borate, N,N-dimethylanilinium tetrakis(perfluorobiphenyl)borate, triphenylcarbenium tetrakis(perfluorobiphenyl)borate, and the types disclosed in U.S. Pat. No. 7,297,653, which is fully incorporated by reference herein.

Suitable activators also include: N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Ph₃C+][B(C₆F₅)₄−], [Me₃NH+][B(C₆F₅)₄−]; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In an embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In an embodiment, two NCA activators may be used in the polymerization and the molar ratio of the first NCA activator to the second NCA activator can be any ratio. In an embodiment, the molar ratio of the first NCA activator to the second NCA activator is 0.01:1 to 10,000:1, or 0.1:1 to 1000:1, or 1:1 to 100:1.

In an embodiment of the invention, the NCA activator-to-catalyst ratio is a 1:1 molar ratio, or 0.1:1 to 100:1, or 0.5:1 to 200:1, or 1:1 to 500:1 or 1:1 to 1000:1. In an embodiment, the NCA activator-to-catalyst ratio is 0.5:1 to 10:1, or 1:1 to 5:1.

In an embodiment, the catalyst compounds can be combined with combinations of alumoxanes and NCA's (see for example, U.S. Pat. Nos. 5,153,157; 5,453,410; EP 0 573 120 B1; WO 94/07928; and WO 95/14044 which discuss the use of an alumoxane in combination with an ionizing activator, all of which are incorporated by reference herein).

In a preferred embodiment of the invention, when an NCA (such as an ionic or neutral stoichiometric activator) is used, the complex-to-activator molar ratio is typically from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2.

Alternately, a co-activator or chain transfer agent, such as a group 1, 2, or 13 organometallic species (e.g., an alkyl aluminum compound such as tri-n-octyl aluminum), may also be used in the catalyst system herein. The complex-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1; 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

Metal Hydrocarbenyl Transfer Agents (Aluminum Vinyl Transfer Agents)

The catalyst systems described herein further comprise a metal hydrocarbenyl transfer agent (which is any group 13 metal agent that contains at least one transferrable group that has an allyl chain end), preferably an aluminum vinyl-transfer agent, also referred to as an AVTA, (which is any aluminum agent that contains at least one transferrable group that has an allyl chain end). An allyl chain end is represented by the formula $H_2C=CH-CH_2-$. "Allylic vinyl group," "allyl chain end," "vinyl chain end," "vinyl termination," "allylic vinyl group," "terminal vinyl group," and "vinyl terminated" are used interchangeably herein and refer to an allyl chain end. An allyl chain end is not a vinylidene chain end or a vinylene chain end. The number of allyl chain ends, vinylidene chain ends, vinylene chain ends, and other unsaturated chain ends is determined using $^1H$ NMR at 120° C. using deuterated tetrachloroethane as the solvent on an at least 250 MHz NMR spectrometer.

Useful transferable groups containing an allyl chain end are represented by the formula $CH_2=CH-CH_2-R*$, where R* represents a hydrocarbyl group or a substituted hydrocarbyl group, such as a $C_1$ to $C_{20}$ alkyl, preferably methyl, ethyl, propyl, butyl, pentyl, hexyl, heptyl, octyl, nonyl, decyl, undecyl, dodecyl, or an isomer thereof.

In the catalyst system described herein, the catalyst undergoes alkyl group transfer with the transfer agent, which enables the formation of polymer chains containing one or more allyl chain ends.

Useful transferable groups containing an allyl chain end also include those represented by the formula $CH_2=CH-CH_2-R$, where R represents a hydrocarbeneyl group or a substituted hydrocarbeneyl group, such as a $C_1$ to $C_{20}$ alkylene, preferably methylene ($CH_2$), ethylene [$(CH_2)_2$], propandiyl [$(CH_2)_2$], butandiyl [$(CH_2)_4$], pentandiyl [$(CH_2)_5$], hexandiyl [$(CH_2)_6$], heptandiyl [$(CH_2)_7$], octandiyl [$(CH_2)_8$], nonandiyl [$(CH_2)_9$], decandiyl [$(CH_2)_{10}$], undecandiyl [$(CH_{20})_{11}$], dodecandiyl [$(CH_2)_{12}$], or an isomer thereof. Useful transferable groups are preferably non-substituted linear hydrocarbeneyl groups. Preferably, at least one R** is a $C_4$-$C_{20}$ hydrocarbeneyl group.

The term "hydrocarbenyl" refers to a hydrocarb-di-yl divalent group, such as a C, to $C_{20}$ alkylene (i.e., methylene ($CH_2$), ethylene [$(CH_2)_2$], propandiyl [$(CH_2)_3$], butandiyl [$(CH_2)_4$], pentandiyl [$(CH_2)_5$], hexandiyl [$(CH_2)_6$], heptandiyl [$(CH_2)_7$], octandiyl [$(CH_2)_8$], nonandiyl [$(CH_2)_9$], decandiyl [$(CH_2)_{10}$], undecandiyl [$(CH_2)_{11}$], dodecandiyl [$(CH_2)_{12}$], and isomers thereof).

AVTA's are alkenylaluminum reagents capable of causing group exchange between the transition metal of the catalyst system ($M^{TM}$) and the metal of the AVTA ($M^{AVTA}$). The reverse reaction may also occur such that the polymeryl chain is transferred back to the transition metal of the catalyst system. This reaction scheme is illustrated below:

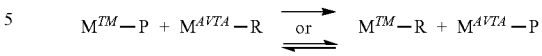

wherein $M^{TM}$ is an active transition metal catalyst site and P is the polymeryl chain, $M^{AVTA}$ is the metal of the AVTA, and R is a transferable group containing an allyl chain end, such as a hydrocarbyl group containing an allyl chain end, also called a hydrocarbenyl or alkenyl group.

Catalyst systems of this invention preferably have high rates of olefin propagation and negligible or no chain termination via beta hydride elimination, beta methyl elimination, or chain transfer to monomer relative to the rate of chain transfer to the AVTA or other chain transfer agent, such as an aluminum alkyl, if present. Pyridyldiamido catalyst complexes (see U.S. Pat. Nos. 7,973,116; 8,394,902; 8,674,040; 8,710,163; 9,102,773; US 2014/0256893; US 2014/0316089; and US 2015/0141601) activated with non-coordinating activators such as dimethyanilinium tetrakis(perfluorophenyl)borate and/or dimethyanilinium tetrakis(perfluoronaphthyl)borate are particularly useful in the catalyst systems of this invention. Compound 3, described above is particularly preferred.

In any embodiment of the invention described herein, the catalyst system comprises an aluminum vinyl transfer agent, which is typically represented by the formula (I):

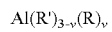

where R is a hydrocarbenyl group containing 4 to 20 carbon atoms having an allyl chain end, R' is a hydrocarbyl group containing 1 to 30 carbon atoms, and v is 0.1 to 3, alternately 1 to 3, alternately 1.1 to less than 3, alternately v is 0.5 to 2.9, 1.1 to 2.9, alternately 1.5 to 2.7, alternately 1.5 to 2.5, alternately 1.8 to 2.2. The compounds represented by the formula $Al(R')_{3-v}(R)_v$ are typically a neutral species, but anionic formulations may be envisioned, such as those represented by formula (II): $[Al(R')_{4-w}(R)_w]^-$, where w is 0.1 to 4, R is a hydrocarbyl group containing 4 to 20 carbon atoms having an allyl chain end, and R' is a hydrocarbyl group containing 1 to 30 carbon atoms.

In any embodiment of any formula for a metal hydrocarbenyl chain transfer agent described herein, each R' is independently chosen from $C_1$ to $C_{30}$ hydrocarbyl groups (such as a $C_1$ to $C_{20}$ alkyl groups, preferably methyl, ethyl, propyl, butyl, pentyl, hexyl, heptyl, octyl, nonyl, decyl, undecyl, dodecyl, or an isomer thereof), and R is represented by the formula:

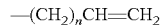

where n is an integer from 2 to 18, preferably 6 to 18, preferably 6 to 12, preferably 6. In any embodiment of the invention described herein, particularly useful AVTAs include, but are not limited to, tri(but-3-en-1-yl)aluminum, tri(pent-4-en-1-yl)aluminum, tri(oct-7-en-1-yl)aluminum, tri(non-8-en-1-yl)aluminum, tri(dec-9-en-1-yl)aluminum, dimethyl(oct-7-en-1-yl)aluminum, diethyl(oct-7-en-1-yl) aluminum, dibutyl(oct-7-en-1-yl)aluminum, diisobutyl(oct-7-en-1-yl)aluminum, diisobutyl(non-8-en-1-yl)aluminum, diisobutyl(dec-9-en-1-yl)aluminum, diisobutyl(dodec-11-en-1-yl)aluminum, isobutyl-di(oct-7-en-1-yl)-aluminum, isobutyl-di(dec-9-en-1-yl)-aluminum, isobutyl-di(non-8-en-1-yl)-aluminum, isobutyl-di(hept-6-en-1-yl)-aluminum and the like. Mixtures of one or more AVTAs may also be used. In some embodiments of the invention, isobutyl-di(oct-7- en-1-yl)-aluminum, isobutyl-di(dec-9-en-1-yl)-aluminum, isobutyl-di(non-8-en-1-yl)-aluminum, isobutyl-di(hept-6-en-1-yl)-aluminum are preferred.

Useful aluminum vinyl transfer agents include organoaluminum compound reaction products between aluminum reagent (AlR$^{a3}$) and an alkyl diene. Suitable alkyl dienes include those that have two "alpha olefins," as described above, at two termini of the carbon chain. The alkyl diene can be a straight chain or branched alkyl chain and substituted or unsubstituted. Exemplary alkyl dienes include but are not limited to, for example, 1,3-butadiene, 1,4-pentadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, 1,14-pentadecadiene, 1,15-hexadecadiene, 1,16-heptadecadiene, 1,17-octadecadiene, 1,18-nonadecadiene, 1,19-eicosadiene, 1,20-heneicosadiene, etc. Exemplary aluminum reagents include triisobutylaluminum, diisobutylaluminumhydride, isobutylaluminumdihydride and aluminum hydride (AlH$_3$).

In any embodiment of the invention described herein, R" is butenyl, pentenyl, heptenyl, or octenyl. In some embodiments R" is preferably octenyl.

In any embodiment of the invention described herein, R' is methyl, ethyl, propyl, isobutyl, or butyl. In any embodiment of the invention described herein, R' is isobutyl.

In any embodiment of the invention described herein, v is about 2, or v is 2.

In any embodiment of the invention described herein, v is about 1, or v is 1, preferably from about 1 to about 2.

In any embodiment of the invention described herein, v is an integer or a non-integer, preferably v is from 1.1 to 2.9, from about 1.5 to about 2.7, e.g., from about 1.6 to about 2.4, from about 1.7 to about 2.4, from about 1.8 to about 2.2, from about 1.9 to about 2.1 and all ranges there between.

In preferred embodiments of the invention described herein, R' is isobutyl and each R" is octenyl, preferably R' is isobutyl, each R" is octenyl, and v is from 1.1 to 2.9, from about 1.5 to about 2.7, e.g., from about 1.6 to about 2.4, from about 1.7 to about 2.4, from about 1.8 to about 2.2, from about 1.9 to about 2.1.

The amount of v (the aluminum alkenyl) is described using the formulas: (3−v)+v=3, and Al(R')$_{3-v}$(R")$_v$ where R" is a hydrocarbenyl group containing 4 to 20 carbon atoms having an allyl chain end, R' is a hydrocarbyl group containing 1 to 30 carbon atoms, and v is 0.1 to 3 (preferably 1.1 to 3). This formulation represents the observed average of organoaluminum species (as determined by $^1$H NMR) present in a mixture, which may include any of Al(R')$_3$, Al(R')$_2$(R"), Al(R')(R")$_2$, and Al(R")$_3$. $^1$H NMR spectroscopic studies are performed at room temperature using a Bruker 400 MHz NMR. Data is collected using samples prepared by dissolving 10-20 mg the compound in 1 mL of C$_6$D$_6$. Samples are then loaded into 5 mm NMR tubes for data collection. Data is recorded using a maximum pulse width of 45°, 8 seconds between pulses and signal averaging either 8 or 16 transients. The spectra are normalized to protonated tetrachloroethane in the C$_6$D$_6$. The chemical shifts (6) are reported as relative to the residual protium in the deuterated solvent at 7.15 ppm.

In still another aspect, the aluminum vinyl-transfer agent has less than 50 wt % dimer present, based upon the weight of the AVTA, preferably less than 40 wt %, preferably less than 30 wt %, preferably less than 20 wt %, preferably less than 15 wt %, preferably less than 10 wt %, preferably less than 5 wt %, preferably less than 2 wt %, preferably less than 1 wt %, preferably 0 wt % dimer. Alternately dimer is present at from 0.1 to 50 wt %, alternately 1 to 20 wt %, alternately at from 2 to 10 wt %. Dimer is the dimeric product of the alkyl diene used in the preparation of the AVTA. The dimer can be formed under certain reaction conditions, and is formed from the insertion of a molecule of diene into the Al—R bond of the AVTA, followed by beta-hydride elimination. For example, if the alkyl diene used is 1,7-octadiene, the dimer is 7-methylenepentadeca-1,14-diene. Similarly, if the alkyl diene is 1,9-decadiene, the dimer is 9-methylenenonadeca-1,18-diene.

Useful compounds can be prepared by combining an aluminum reagent (such as alkyl aluminum) having at least one secondary alkyl moiety (such as triisobutylaluminum) and/or at least one hydride, such as a dialkylaluminum hydride, a monoalkylaluminum dihydride or aluminum trihydride (aluminum hydride, AlH$_3$) with an alkyl diene and heating to a temperature that causes release of an alkylene byproduct. The use of solvent(s) is not required. However, non-polar solvents can be employed, such as, as hexane, pentane, toluene, benzene, xylenes, and the like, or combinations thereof.

In an embodiment of the invention, the AVTA is free of coordinating polar solvents such as tetrahydrofuran and diethylether.

After the reaction is complete, solvent if, present can be removed and the product can be used directly without further purification.

The AVTA to catalyst complex equivalence ratio can be from about 1:100 to 500,000:1. More preferably, the molar ratio of AVTA to catalyst complex is greater than 5, alternately greater than 10, alternately greater than 15, alternately greater than 20, alternately greater than 25, alternately greater than 30.

The metal hydrocarbenyl chain transfer agent may be represented by the formula: E[Al(R')$_{2-v}$(R)$_v$]$_2$ wherein E is a group 16 element (such as O or S, preferably O); each R', independently, is a C$_1$ to C$_{30}$ hydrocarbyl group (such as a C$_1$ to C$_{20}$ alkyl group, preferably methyl, ethyl, propyl, butyl, pentyl, hexyl, heptyl, octyl, nonyl, decyl, undecyl, dodecyl, or an isomer thereof); each R", independently, is a C$_4$ to C$_{20}$ hydrocarbenyl group having an allyl chain end (such as a C$_1$ to C$_{20}$ alkenyl group, preferably methenyl, ethenyl, propenyl, butenyl, pentenyl, heptenyl, octenyl, nonenyl, decenyl, undecenyl, dodecenyl, or an isomer thereof); v is from 0.01 to 3 (such as 1 or 2).

In another embodiment of the invention, the metal hydrocarbenyl chain transfer agent is an alumoxane formed from the hydrolysis of the AVTA. Alternatively, the alumoxane can be formed from the hydrolysis of the AVTA in combination with other aluminum alkyl(s). The alumoxane component is an oligomeric compound which is not well characterized, but can be represented by the general formula (R—Al—O)$_m$ which is a cyclic compound, or may be R'(R—Al—O)$_m$-AlR'$_2$ which is a linear compound where R' is as defined above and at least one R' is the same as R (as defined above), and m is from about 4 to 25, with a range of 13 to 25 being preferred. Most preferably all R' are R. An alumoxane is generally a mixture of both the linear and cyclic compounds.

Supports

The complexes described herein may be supported (with or without an activator and with or without a transfer agent) by any method effective to support other coordination catalyst systems, effectively meaning that the catalyst so prepared can be used for polymerizing olefin(s) in a heterogeneous process. The catalyst precursor, activator, optional transfer agent, co-activator if needed, suitable solvent, and support may be added in any order or simultaneously.

Typically, the complex, activator, and optional transfer agent may be combined in solvent to form a solution. Then the support is added, and the mixture is stirred for 1 minute to 10 hours. The total solution volume may be greater than the pore volume of the support, but some embodiments limit the total solution volume below that needed to form a gel or slurry (about 90% to 400%, preferably about 100% to 200% of the pore volume). After stirring, the residual solvent is removed under vacuum, typically at ambient temperature and over 10-16 hours. But greater or lesser times and temperatures are possible.

The complex may also be supported absent the activator, and in that case, the activator (and co-activator if needed) is added to a polymerization process' liquid phase. Additionally, two or more different complexes may be placed on the same support. Likewise, two or more activators or an activator and co-activator may be placed on the same support. Likewise the transfer agent may be added to the polymerization reaction separately from the supported catalyst complex and/or activator.

Suitable solid particle supports are typically comprised of polymeric or refractory oxide materials, each being preferably porous. Preferably, any support material that has an average particle size greater than 10 μm is suitable for use in this invention. Various embodiments select a porous support material, such as for example, talc, inorganic oxides, inorganic chlorides, for example magnesium chloride and resinous support materials such as polystyrene polyolefin or polymeric compounds or any other organic support material and the like. Some embodiments select inorganic oxide materials as the support material including Group-2, -3, -4, -5, -13, or -14 metal or metalloid oxides. Some embodiments select the catalyst support materials to include silica, alumina, silica-alumina, and their mixtures. Other inorganic oxides may serve either alone or in combination with the silica, alumina, or silica-alumina. These are magnesia, titania, zirconia, and the like. The support can optionally double as the activator component; however, an additional activator may also be used.

The support material may be pre-treated by any number of methods. For example, inorganic oxides may be calcined, chemically treated with dehydroxylating agents such as aluminum alkyls and the like, or both.

As stated above, polymeric carriers will also be suitable in accordance with the invention, see, for example, the descriptions in WO 95/15815 and U.S. Pat. No. 5,427,991. The methods disclosed may be used with the catalyst complexes, activators or catalyst systems of this invention to adsorb or absorb them on the polymeric supports, particularly if made up of porous particles, or may be chemically bound through functional groups bound to or in the polymer chains.

Useful supports typically have a surface area of from 10-700 m$^2$/g, a pore volume of 0.1-4.0 cc/g and an average particle size of 10-500 μm. Some embodiments select a surface area of 50-500 m2/g, a pore volume of 0.5-3.5 cc/g, or an average particle size of 20-200 μm. Other embodiments select a surface area of 100-400 m2/g, a pore volume of 0.8-3.0 cc/g, and an average particle size of 30-100 μm. Useful supports typically have a pore size of 10-1000 Angstroms, alternatively 50-500 Angstroms, or 75-350 Angstroms.

The catalyst complexes described herein are generally deposited on the support at a loading level of 10-100 micromoles of complex per gram of solid support; alternately 20-80 micromoles of complex per gram of solid support; or 40-60 micromoles of complex per gram of support. However, greater or lesser values may be used provided that the total amount of solid complex does not exceed the support's pore volume.

Polymerization

Invention catalyst complexes are useful in polymerizing unsaturated monomers conventionally known to undergo coordination-catalyzed polymerization such as solution, slurry, gas-phase, and high-pressure polymerization. Typically, one or more of the complexes described herein, one or more activators, one or more transfer agents (such as an aluminum vinyl transfer agent) and one or more monomers are contacted to produce polymer. The complexes may be supported and, as such, will be particularly useful in the known, fixed-bed, moving-bed, fluid-bed, slurry, gas phase, solution, or bulk operating modes conducted in single, series, or parallel reactors.

One or more reactors in series or in parallel may be used in the present invention.

The complexes, activator, transfer agent, and, when required, co-activator, may be delivered as a solution or slurry, either separately to the reactor, activated in-line just prior to the reactor, or pre-activated and pumped as an activated solution or slurry to the reactor. Polymerizations are carried out in either single reactor operation, in which monomer, comonomers, catalyst/activator/co-activator, optional scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to the first reaction and another component to other reactors. In one preferred embodiment, the complex is activated in the reactor in the presence of olefin and transfer agent.

In a particularly preferred embodiment, the polymerization process is a continuous process.

Polymerization process used herein typically comprises contacting one or more alkene monomers with the complexes, activators and transfer agents described herein. For purpose of this invention alkenes are defined to include multi-alkenes (such as dialkenes) and alkenes having just one double bond. Polymerization may be homogeneous (solution or bulk polymerization) or heterogeneous (slurry—in a liquid diluent, or gas phase—in a gaseous diluent). In the case of heterogeneous slurry or gas phase polymerization, the complex and activator may be supported. Silica is useful as a support herein. Chain transfer agents (such as hydrogen or diethyl zinc) may be used in the practice of this invention.

The present polymerization processes may be conducted under conditions preferably including a temperature of about 30° C. to about 200° C., preferably from 60° C. to 195° C., preferably from 75° C. to 190° C. The process may be conducted at a pressure of from 0.05 to 1500 MPa. In a preferred embodiment, the pressure is between 1.7 MPa and 30 MPa, or in another embodiment, especially under supercritical conditions, the pressure is between 15 MPa and 1500 MPa.

If branching (such a $g'_{vis}$ of less than 0.95) is desired in the polymer product, then, among other things, one may increase the moles of metal hydrocarbenyl chain transfer agent added to the reactor relative to the amount of polymer produced (such as grams of polymer/mols of AVTA being less than 500,000; 400,000 or less; 200,000 or less; 100,000 or less; 50,000 or less; 25,000 or less; 10,000 or less), and/or increase the temperature of the polymerization reaction (such as above 80° C.), and/or increase the solids content in the polymerization reaction mass (such as 10 weight % or more, based on the weight of the components entering the reactor), and/or increase the residence time of the polymerization (such as 10 minutes or more). Likewise, if a more linear polymer is desired (such as a $g'_{vis}$ of more than 0.95), then, among other things, one may reduce the moles of metal hydrocarbenyl chain transfer agent added to the reactor relative to the amount of polymer produced (such as grams of polymer/mols of AVTA being 500,000 or more), and/or reduce the temperature of the polymerization reaction (such as 80° C. or less), and/or reduce the solids content in the polymerization reaction mass such as 10 volume % or less), and/or reduce the residence time of the polymerization (such as 10 minutes or less). One of ordinary skill in the art will readily appreciate that 1, 2, 3 or 4 of the above conditions may be varied above or below the suggested conditions above to obtain a desired result. For example a lower catalyst/AVTA molar ratio can be used if the catalyst activity is higher.

Monomers

Monomers useful herein include olefins having from 2 to 40 carbon atoms, alternately 2 to 12 carbon atoms (preferably ethylene, propylene, butylene, pentene, hexene, heptene, octene, nonene, decene, and dodecene) and, optionally, also polyenes (such as dienes). Particularly preferred monomers include propylene, and mixtures of ethylene and or $C_4$ to $C_{10}$ alpha olefins, such as propylene-ethylene, propylene-hexene, propylene-octene, and the like.

The catalyst systems described herein are also particularly effective for the polymerization of propylene, either alone or in combination with at least one other olefinically unsaturated monomer, such as ethylene and/or a $C_4$ to $C_{20}$ α-olefin, and particularly ethylene and or a $C_4$ to $C_{12}$ α-olefin.

The catalyst systems described herein are also particularly effective for the polymerization of ethylene and propylene, either alone or in combination with at least one other olefinically unsaturated monomer, such as a $C_4$ to $C_{20}$ diene, and particularly a $C_3$ to $C_{12}$ diene.

Examples of preferred α-olefins include ethylene, propylene, butene-1, pentene-1, hexene-1, heptene-1, octene-1, nonene-1, decene-1, dodecene-1, 4-methylpentene-1, 3-methylpentene-1, 3, 5, 5-trimethylhexene-1, and 5-ethylnonene-1.

In some embodiments, the monomer mixture comprises one or more dienes at up to 10 wt %, such as from 0.00001 to 1.0 wt %, for example from 0.002 to 0.5 wt %, such as from 0.003 to 0.2 wt %, based upon the monomer mixture. Non-limiting examples of useful dienes include: 5-ethylidene-2-norbornene, 1,4-hexadiene, 1,5-heptadiene, 6-methyl-1,6-heptadiene, 1,6-octadiene, 7-methyl-1,7-octadiene, 1,8-decadiene, and 9-methyl-1,9-decadiene.

Where olefins are used that give rise to short chain branching, such as propylene, the catalyst systems may, under appropriate conditions, generate stereoregular polymers or polymers having stereoregular sequences in the polymer chains.

In a preferred embodiment, the catalyst systems described herein are used in any polymerization process described above to produce propylene copolymers, particularly propylene-ethylene copolymers and propylene-ethylene-diene monomer copolymers.

Scavengers

In some embodiments, when using the complexes described herein, particularly when they are immobilized on a support, the catalyst system will additionally comprise one or more scavenging compounds. Here, the term scavenging compound means a compound that removes polar impurities from the reaction environment. These impurities adversely affect catalyst activity and stability. Typically, the scavenging compound will be an organometallic compound such as the Group-13 organometallic compounds of U.S. Pat. Nos. 5,153,157; 5,241,025; WO 1991/09882; WO 1994/03506; WO 1993/14132; and that of WO 1995/07941. Exemplary compounds include triethyl aluminum, triethyl borane, tri-iso-butyl aluminum, methyl alumoxane, iso-butyl alumoxane, tri-n-octyl aluminum, bis(diisobutylaluminum)oxide, modified methylalumoxane. (Useful modified methylalumoxane include cocatalyst type 3A (commercially available from Akzo Chemicals, Inc. under the trade name Modified Methylalumoxane type 3A) and those described in U.S. Pat. No. 5,041,584). Those scavenging compounds having bulky or $C_6$-$C_{20}$ linear hydrocarbyl substituents connected to the metal or metalloid center usually minimize adverse interaction with the active catalyst. Examples include triethylaluminum, but more preferably, bulky compounds such as tri-iso-butyl aluminum, tri-iso-prenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, $[Me_2HNPh]^+[B(pfp)_4]^-$ or $B(pfp)_3$ (perfluorophenyl=pfp=$C_6F_5$).

In embodiments, the transfer agent, such as the aluminum vinyl transfer agent, may also function as a scavenger.

In a preferred embodiment, two or more catalyst complexes as described herein are combined with a chain transfer agent, such as diethyl zinc or tri-n-octylaluminum, in the same reactor with monomer. Alternately, one or more complexes are combined with another catalyst (such as a metallocene) and a chain transfer agent, such as diethyl zinc and/or tri-n-octylaluminum, in the same reactor with monomer.

Polymer Products

While the molecular weight of the polymers produced herein is influenced by reactor conditions including temperature, monomer concentration and pressure, the presence of chain terminating agents and the like, the homopolymer and copolymer products produced by the present process may have an Mw of about 50,000 to about 2,000,000 g/mol, alternately of about 70,000 to about 600,000 g/mol, or alternately of about 100,000 to about 500,000 g/mol, as determined by Gel Permeation Chromatography. Preferred polymers produced herein are copolymers of at least 30 wt % propylene. In a preferred embodiment, the comonomer(s) are present at up to 70 mol %, preferably from 1 to 65 mol %, preferably 5 to 60 mol %.

The polymers produced by the process of the invention can be used in a wide variety of products and end-use applications. The propylene polymers produced can be include isotactic polypropylene, atactic polypropylene and random, block or impact copolymers.

The polymers of embodiments of the invention may have an $M_n$ (number-average molecular weight) value of 12,500 g/mol or more, typically from 12,500 to 1,000,000, or between from 700 to 300,000 g/mol. Additionally, copolymer of embodiments of the invention will comprise a molecular weight distribution (Mw/Mn) in the range of ≥1, or ≥1.5 to ≤4 or ≤3, preferably from greater than 1 to 4, alternatively from 1.5 to 3.5, alternatively from 2 to 3.

Typically, polymer produced herein has an Mw of 50,000 up to 2,000,000 g/mol and a $g'_{vis}$ of 0.97 or less, or 0.95 or less, or 0.90 or less, or 0.85 or less.

Preferably, the polymer produced herein is gel-free. Presence of gel can be detected by dissolving the material in xylene at xylene's boiling temperature (140° C.) and measuring the amount of gel present (See ASTM D 5492, except that 140° C. is used rather than 20° C.). Gel-free product should be dissolved in the xylene. In one embodiment, the branched modifier has 5 wt % or less (preferably 4 wt % or less, preferably 3 wt % or less, preferably 2 wt % or less, preferably 1 wt % or less, preferably 0 wt %) of xylene insoluble material.

In particularly useful embodiments of the invention, branched propylene-ethylene copolymers and or branched propylene-ethylene-diene monomer copolymers are produced herein.

This invention further relates to novel branched propylene based copolymers comprising from about 99 to 30 wt % propylene, from 1 to 70 wt % ethylene, from 0 to 20 wt % diene monomer, and a remnant of a metal hydrocarbenyl chain transfer agent, wherein said branched propylene based copolymer: a) has a $g'_{vis}$ of less than 0.97; b) is essentially gel free (such as 5 wt % or less of xylene insoluble material); c) has a Mw of 50,000 g/mol or more; and d) has a Mw/Mn of less than 4.0.

This invention relates to branched propylene based polymer modifiers comprising from about 99 to 30 wt % propylene, from 1 to 70 wt % ethylene, from 0 to 20 wt % diene monomer, and a remnant of the metal hydrocarbenyl chain transfer agent, wherein said branched propylene based polymer modifier preferably has a $g'_{vis}$ of less than 0.90 (preferably less than 0.85) and a complex viscosity of at least 5000 Pa·s measured at 0.1 rad/sec and a temperature of 190° C.

This invention further relates to novel branched propylene based copolymers comprising from about 99 to 30 wt % propylene (preferably from 90 to 35 wt % propylene), from 1 to 70 wt % ethylene (preferably from 5 to 65 wt % ethylene), from 0 to 20 wt % diene monomer (preferably from 0.1 to 15 wt % diene, alternatively from 0.5 to 10 wt % diene), and a remnant of the metal hydrocarbenyl chain transfer agent (preferably from 0.001 to 10 mol %, alternatively from 0.01 to 5 mol %, alternatively 0.01 to 2 mol %, alternatively 0.01 to 1 mol %), wherein said branched propylene based copolymer: a) has a $g'_{vis}$ of less than 0.97 (preferably 0.95 or less, alternatively 0.92 or less, alternatively 0.90 or less, alternatively, 0.88 or less, alternatively 0.85 or less, alternatively 0.80 or less, alternatively 0.70 or less, alternatively 0.65 or less); b) is essentially gel free (such as 5 wt % or less of xylene insoluble material, alternatively 4 wt % or less, alternatively 3 wt % or less, alternatively 2 wt % or less, alternatively 1 wt % or less, alternatively 0 wt %); c) has a Mw of 50,000 g/mol or more (preferably 60,000 or more, alternatively 80,000 or more, alternatively 100,000 or more, alternatively 120,000 or more, alternatively 150,000 or more); and d) has a Mw/Mn of less than 4.0 (preferably 3.5 or less, alternatively 3.0 or less, alternatively 2.5 or less, alternatively 2.2 or less, alternatively from 2.0 to 3.4).

This invention also relates to novel branched propylene based polymer modifiers comprising from about 99 to 30 wt % propylene (preferably from 90 to 35 wt % propylene), from 1 to 70 wt % ethylene (preferably from 5 to 65 wt % ethylene), from 0 to 20 wt % diene monomer (preferably from 0.1 to 15 wt % diene, alternatively from 0.5 to 10 wt % diene), and a remnant of the metal hydrocarbenyl chain transfer agent (preferably from 0.001 to 10 mol %, alternatively from 0.01 to 5 mol %, alternatively 0.01 to 2 mol %, alternatively 0.01 to 1 mol %), wherein said branched propylene based polymer modifier has a $g'_{vis}$ of less than 0.90 (preferably 0.95 or less, alternatively 0.92 or less, alternatively 0.90 or less, alternatively, 0.88 or less, alternatively 0.85 or less, alternatively 0.80 or less, alternatively 0.70 or less, alternatively 0.65 or less); and a complex viscosity of at least 500 Pa·s (preferably from 1000 to 150,000 Pa·s, preferably from 5,000 to 125,000 Pa·s, preferably from 10,000 to 100,000 Pa·s) measured at 0.1 rad/sec and a temperature of 190° C.

This invention further relates to novel branched ethylene-propylene copolymers comprising from about 99 to 75 wt % propylene (preferably from 95 to 80 wt % propylene, alternatively from 90 to 85 wt % propylene), from 1 to 25 wt % ethylene (preferably from 5 to 20 wt % ethylene, alternatively 10 to 5 wt % ethylene), and a remnant of a metal hydrocarbenyl chain transfer agent (preferably from 0.001 to 10 mol %, alternatively from 0.01 to 5 mol %, alternatively 0.01 to 2 mol %, alternatively 0.01 to 1 mol %), wherein said branched ethylene-propylene copolymer preferably: a) has a $g'_{vis}$ of less than 0.97 (preferably 0.95 or less, alternatively 0.92 or less, alternatively 0.90 or less, alternatively, 0.88 or less, alternatively 0.85 or less, alternatively 0.80 or less, alternatively 0.70 or less, alternatively 0.65 or less); b) is essentially gel free (such as 5 wt % or less of xylene insoluble material, alternatively 4 wt % or less, alternatively 3 wt % or less, alternatively 2 wt % or less, alternatively 1 wt % or less, alternatively 0 wt %); c) has a Mw of 50,000 g/mol or more (preferably 60,000 or more, alternatively 80,000 or more, alternatively 100,000 or more, alternatively 120,000 or more, alternatively 150,000 or more, alternatively 200,000 or more, alternatively 250,000 or more); and d) has a Mw/Mn of less than 4.0 (preferably 3.5 or less, alternatively 3.0 or less, alternatively 2.5 or less, alternatively from 2.0 to 4.0, alternatively from 2.5 to 3.5, alternatively from 2.5 to 3.0).

This invention further relates to novel branched ethylene-propylene copolymers comprising from about 99 to 75 wt % propylene (preferably from 95 to 80 wt % propylene, alternatively from 90 to 85 wt % propylene), from 1 to 25 wt % ethylene (preferably from 5 to 20 wt % ethylene, alternatively 10 to 5 wt % ethylene), and a remnant of the metal hydrocarbenyl chain transfer agent (preferably from 0.001 to 10 mol %, alternatively from 0.01 to 5 mol %, alternatively 0.01 to 2 mol %, alternatively 0.01 to 1 mol %), wherein said branched propylene based polymer modifier preferably has a $g'_{vis}$ of less than 0.90 (preferably 0.95 or less, alternatively 0.92 or less, alternatively 0.90 or less, alternatively, 0.88 or less, alternatively 0.85 or less, alternatively 0.80 or less, alternatively 0.70 or less, alternatively 0.65 or less); and a complex viscosity of at least 500 Pa·s (preferably from 1000 to 150,000 Pa·s, preferably from 5,000 to 125,000 Pa·s, preferably from 10,000 to 100,000 Pa·s) measured at 0.1 rad/sec and a temperature of 190° C.

This invention further relates to novel branched ethylene-propylene copolymers comprising from about 70 to 25 wt % propylene (preferably from 60 to 30 wt % propylene, alternatively form 50 to 35 wt % propylene, alternatively from 45 to 35 wt % propylene, alternatively from 40 to 35 wt % propylene), from 30 to 75 wt % ethylene (preferably from 40 to 70 wt % ethylene, alternatively from 50 to 65 wt % ethylene, alternatively from 55 to 65 wt % ethylene, alternatively from 60 to 65 wt % ethylene), and a remnant of a metal hydrocarbenyl chain transfer agent (preferably from 0.001 to 10 mol %, alternatively from 0.01 to 5 mol %, alternatively 0.01 to 2 mol %, alternatively 0.01 to 1 mol %), wherein said branched ethylene-propylene copolymer preferably: a) has a $g'_{vis}$ of less than 0.97 (preferably 0.95 or less, alternatively 0.92 or less, alternatively 0.90 or less, alternatively, 0.88 or less, alternatively 0.85 or less, alternatively 0.80 or less, alternatively 0.70 or less, alternatively 0.65 or less); b) is essentially gel free (such as 5 wt % or less of xylene insoluble material, alternatively 4 wt % or less, alternatively 3 wt % or less, alternatively 2 wt % or less, alternatively 1 wt % or less, alternatively 0 wt %); c) has a Mw of 50,000 g/mol or more (preferably 60,000 or more, alternatively 80,000, or more alternatively 100,000 or more, alternatively 120,000 or more, alternatively 150,000 or more, alternatively 200,000 or more, alternatively 250,000 or more); and d) has a Mw/Mn of less than 4.0 (preferably 3.5 or less, alternatively 3.0 or less, alternatively 2.5 or less, alternatively from 2.0 to 4.0, alternatively from 2.5 to 3.5, alternatively from 2.5 to 3.0).

This invention further relates to novel branched ethylene-propylene copolymers comprising from about 70 to 25 wt % propylene (preferably from 60 to 30 wt % propylene, alternatively from 50 to 35 wt % propylene, alternatively from 45 to 35 wt % propylene, alternatively from 40 to 35 wt % propylene), from 30 to 75 wt % ethylene (preferably from 40 to 70 wt % ethylene, alternatively from 50 to 65 wt % ethylene, alternatively from 55 to 65 wt % ethylene, alternatively from 60 to 65 wt % ethylene), and a remnant of the metal hydrocarbenyl chain transfer agent (preferably from 0.001 to 10 mol %, alternatively from 0.01 to 5 mol %, alternatively 0.01 to 2 mol %, alternatively 0.01 to 1 mol %), wherein said branched propylene based polymer modifier preferably has a $g'_{vis}$ of less than 0.90 (preferably 0.95 or less, alternatively 0.92 or less, alternatively 0.90 or less, alternatively, 0.88 or less, alternatively 0.85 or less, alternatively 0.80 or less, alternatively 0.70 or less, alternatively 0.65 or less); and a complex viscosity of at least 500 Pa·s (preferably from 1000 to 150,000 Pa·s, preferably from 5,000 to 125,000 Pa·s, preferably from 10,000 to 100,000 Pa·s) measured at 0.1 rad/sec and a temperature of 190° C.

This invention further relates to novel branched ethylene-propylene-diene copolymers comprising from about 70 to 30 wt % propylene (preferably from 60 to 35 wt % propylene, alternatively from 55 to 40 wt % propylene, alternatively from 55 to 45 wt % propylene), from 30 to 70 wt % ethylene (preferably from 40 to 65 wt % ethylene, alternatively from 45 to 60 wt % ethylene, alternatively from 45 to 55 wt % ethylene), from 1 to 20 wt % diene monomer (preferably from 1 to 15 wt % diene, alternatively from 2 to 10 wt % diene, alternatively from 4 to 10 wt % diene), and a remnant of a metal hydrocarbenyl chain transfer agent (preferably from 0.001 to 10 mol %, alternatively from 0.01 to 5 mol %, alternatively 0.01 to 2 mol %, alternatively 0.01 to 1 mol %), wherein said branched propylene based copolymer preferably: a) has a $g'_{vis}$ of less than 0.97 (preferably 0.95 or less, alternatively 0.92 or less, alternatively 0.90 or less, alternatively, 0.88 or less, alternatively 0.85 or less, alternatively 0.80 or less, alternatively 0.70 or less, alternatively 0.65 or less); b) is essentially gel free (such as 5 wt % or less of xylene insoluble material, alternatively 4 wt % or less, alternatively 3 wt % or less, alternatively 2 wt % or less, alternatively 1 wt % or less, alternatively 0 wt %); c) has a Mw of 50,000 g/mol or more (preferably 60,000 or more, alternatively 80,000 or more alternatively 100,000 or more, alternatively 120,000 or more, alternatively 150,000 or more, alternatively 200,000 or more, alternatively 250,000 or more); and d) has a Mw/Mn of less than 4.0 (preferably 3.5 or less, alternatively 3.0 or less, alternatively 2.5 or less, alternatively from 2.0 to 4.0, alternatively from 2.5 to 3.5, alternatively from 2.5 to 3.0).

This invention further relates to novel branched ethylene-propylene-diene copolymers comprising from about 70 to 30 wt % propylene (preferably from 60 to 35 wt % propylene, alternatively from 55 to 40 wt % propylene, alternatively from 55 to 45 wt % propylene), from 30 to 70 wt % ethylene (preferably from 40 to 65 wt % ethylene, alternatively from 45 to 60 wt % ethylene, alternatively from 45 to 55 wt % ethylene), from 1 to 20 wt % diene monomer (preferably from 1 to 15 wt % diene, alternatively from 2 to 10 wt % diene, alternatively from 4 to 10 wt % diene), and a remnant of the metal hydrocarbenyl chain transfer agent (preferably from 0.001 to 10 mol %, alternatively from 0.01 to 5 mol %, alternatively 0.01 to 2 mol %, alternatively 0.01 to 1 mol %), wherein said branched propylene based polymer modifier preferably has a $g'_{vis}$ of less than 0.90 (preferably 0.95 or less, alternatively 0.92 or less, alternatively 0.90 or less, alternatively, 0.88 or less, alternatively 0.85 or less, alternatively 0.80 or less, alternatively 0.70 or less, alternatively 0.65 or less); and a complex viscosity of at least 500 Pa·s (preferably from 1000 to 150,000 Pa·s, preferably from 5,000 to 125,000 Pa·s, preferably from 10,000 to 100,000 Pa·s) measured at 0.1 rad/sec and a temperature of 190° C.

End Uses

The polymers of this invention may be used alone or may be blended and/or coextruded with any other polymer. Non-limiting examples of other polymers include linear low density polyethylenes, elastomers, plastomers, high pressure low density polyethylene, high density polyethylenes, isotactic polypropylene, ethylene propylene copolymers and the like.

Articles made using polymers produced herein may include, for example, molded articles (such as containers and bottles, e.g., household containers, industrial chemical containers, personal care bottles, medical containers, fuel tanks, and storageware, toys, sheets, pipes, tubing) films, non-wovens, and the like. It should be appreciated that the list of applications above is merely exemplary, and is not intended to be limiting.

In particular, polymers produced by the process of the invention and blends thereof are useful in such forming operations as film, sheet, and fiber extrusion and co-extrusion as well as blow molding, injection molding, rotomolding. Films include blown or cast films formed by coextrusion or by lamination useful as shrink film, cling film, stretch film, sealing film or oriented films.

EXPERIMENTAL

Aluminum Vinyl Transfer Agent

All manipulations were performed under an inert atmosphere using glove box techniques unless otherwise stated. Benzene-$d_6$ (Cambridge Isotopes) (Sigma Aldrich) was degassed and dried over 3 Å molecular sieves prior to use. $CDCl_3$ (Deutero GmbH) was used as received.

Diisobutylaluminum hydride (DIBAL-H) was purchased from Akzo Nobel Surface Chemistry LLC and used as received. 1,7-octadiene and 1,9-decadiene were purchased from Sigma Aldrich and purified by the following procedure prior to use. The diene was purged under nitrogen for 30 minutes and then this was stored over 3 Å molecular sieves for overnight. Further this was stirred with NaK (sodium-potassium alloy) for overnight and then filtered through basic alumina column prior to use.

Example 1: Preparation of diisobutyl(oct-7-en-1-yl) aluminum, $^iBu_2Al(Oct=)$ (AVTA1)

A neat 1,7-octadiene (16.53 g, 150 mmol) was added drop wise to diisobutylaluminum hydride (3.56 g, 25 mmol) at room temperature over a period of 5 minutes. The reaction mixture was either stirred at 45° C. for overnight. The excess 1,7-octadiene from the reaction mixture was removed under the flow of dry nitrogen at room temperature. The residual 1,7-octadiene was then removed in vacuo for 30 minutes to obtain a colorless viscous oil of diisobutyl(oct-7-en-1-yl) aluminum, $iBu_2Al(Oct=)$ (6.055 g, 96%). The product formation was confirmed by $^1H$ NMR spectroscopy and based on the relative integration the molecular formula was assigned as $(C_4H_9)_{2.09}Al(C_8H_{15})_{0.91}$, $^1H$ NMR (400 MHz, benzene-$d_6$): δ=5.78 (m, 1H, =CH), 5.01 (m, 2H, =CH$_2$), 1.95 (m, 4H, —CH$_2$), 1.54 (m, 2H, $^i$Bu-CH), 1.34 (m, 6H, —CH$_2$), 1.04 (d, 12H, $^i$Bu-CH$_3$), 0.49 (t, 2H, Al—CH$_2$), 0.27 (d, 4H, $^i$Bu-CH$_2$) ppm.

Example 2: Preparation of Isobutyldi(oct-7-en-1-yl)aluminum, $^iBuAl(Oct=)_2$ (AVTA2)

Example 2A

A neat 1,7-octadiene (22.91 g, 207.9 mmol) was added drop wise to diisobutylaluminum hydride (2.61 g, 18.4 mmol) at room temperature over 5 minutes. The resulting mixture was stirred under reflux at 110° C. for 60 minutes and then continuously stirring at 70° C. for overnight. The excess 1,7-octadiene from the reaction mixture was removed under the flow of dry nitrogen at room temperature. The residual 1,7-octadiene was then removed in vacuum to obtain a colorless viscous oil of isobutyldi(oct-7-en-1-yl) aluminum, $iBuAl(Oct=)_2$ (5.53 g, 97%). The product formation was confirmed by $^1H$ NMR and based on the relative integration the molecular formula of was assigned as $(C_4H_9)_{0.95}Al(C_8H_{15})_{2.05}$. $^1H$ NMR (400 MHz, benzene-$d_6$): δ=5.81 (m, 2H, =CH), 5.05 (m, 4H, =CH$_2$), 2.03 (m, 8H, —CH$_2$), 1.59 (m, 1H, $^i$Bu-CH), 1.38 (m, 12H, —CH$_2$), 1.09 (d, 6H, $^i$Bu-CH$_3$), 0.51 (t, 4H, Al—CH$_2$), 0.31 (d, 2H, $^i$Bu-CH$_2$) ppm.

Example 2B

A neat 1,7-octadiene (34.86 g, 316.3 mmol) was added drop wise to diisobutylaluminum hydride(3.98 g, 27.99 mmol) at room temperature over 5 minutes. The resulting mixture was stirred under reflux at 110° C. for 60 minutes and then continuously stirring at 70° C. for overnight. The excess 1,7-octadiene from the reaction mixture was removed under the flow of dry nitrogen at room temperature. The residual 1,7-octadiene was then removed in vacuum to obtain a colorless viscous oil of isobutyldi(oct-7-en-1-yl) aluminum, $iBuAl(Oct=)_2$ (8.041 g, 94%). The product formation was confirmed by $^1H$ NMR and based on the relative integration the molecular formula of was assigned as $(C_4H_9)_{1.04}Al(C_8H_{15})_{1.96}$.

For AVTA2, 0.446 g of Example 2A and 7.756 g of Example 2B were blended together to make AVTA2.

Example 3: Preparation of Isobutyldi(oct-7-en-1-yl)aluminum, $^iBuAl(Oct=)_2$ (AVTA3)

1,7-Octadiene (250 mL, 1.69 mol) was loaded into a round-bottomed flask. Diisobutylaluminum hydride (27.4 mL, 0.153 mol) was added dropwise over 20 minutes. The mixture was then placed into a metal block maintained at 117° C. After about 20 minutes the mixture reached 107° C. and this temperature was maintained for 125 minutes. The mixture was then cooled to ambient temperature and the volatiles were removed under a stream of nitrogen to afford a nearly colorless oil. The oil was placed under reduced pressure (ca. 60 mTorr) and warmed to 50° C. for 30 minutes to remove any trace 1,7-octadiene. The yield was 54.0 g. H-NMR spectroscopic data indicated that the product had the average formula of $Al(iBu)_{0.9}(octenyl)_{2.1}$ with a small amount (ca. 0.2 molar equivalents) of vinylidene containing byproduct, that may be formed by the insertion of 1,7-octadiene into an Al-octenyl bond followed by beta hydride elimination.

Example 4: Preparation of Isobutyldi(dec-9-en-1-yl)aluminum, $^iBuAl(Dec=)_2$ (AVTA4)

1,9-Decadiene (500 mL, 2.71 mol) was loaded into a round-bottomed flask. Diisobutylaluminum hydride (30.2 mL, 0.170 mol) was added dropwise over 15 minutes. The mixture was then placed in a metal block maintained at 110° C. After 30 minutes the solution had stabilized at a temperature of 104° C. The mixture was kept at this temperature for an additional 135 minutes at which time H-NMR spectroscopic data indicated that the reaction had progressed to the desired amount. The mixture was cooled to ambient temperature. The excess 1,9-decadiene was removed by vacuum distillation at 44° C./120 mTorr over a 2.5 hours. The product was further distilled at 50° C./120 mTorr for an additional hour to ensure complete removal of all 1,9-decadiene. The isolated product was a clear colorless oil. The yield was 70.9 g. H-NMR spectroscopic data indicated an average formula of $Al(iBu)_{0.9}(decenyl)_{2.1}$, with a small amount (ca. 0.2 molar equivalents) of vinylidene containing byproduct, that may be formed by the insertion of 1,9-decadiene into an Al-octenyl bond followed by beta hydride elimination.

Activator and Catalyst Complexes

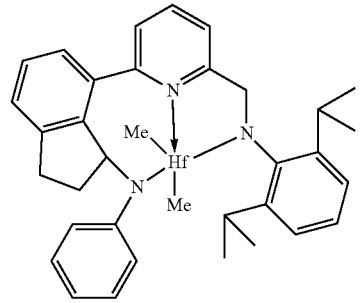

Complex 1

Complex 1 was prepared as described in U.S. Pat. No. 9,290,519. The activator used was dimethylanilinium tetrakis(pentafluorophenyl)borane (available from Albemarle Corp. or Boulder Scientific).

Polymerization

For the data reported in Table 1, polymerizations were carried out in a continuous stirred tank reactor system. A 1-liter Autoclave reactor was equipped with a stirrer, a pressure controller, and a water cooling/steam heating element with a temperature controller. The reactor was operated in liquid fill condition at a reactor pressure in excess of the bubbling point pressure of the reactant mixture, keeping the reactants in liquid phase. Isohexane and propylene were pumped into the reactors by Pulsa feed pumps. All flow rates of solvent and liquid monomers were controlled using Coriolis mass flow controller (Quantim series from Brooks). Ethylene flowed as a gas under its own pressure through a Brooks flow controller. Ethylene and propylene feeds were combined into one stream and then mixed with a pre-chilled isohexane stream that had been cooled to at least 0° C. The mixture was then fed to the reactor through a single line. Solutions of tri-n-octyl aluminum (TNOA) or AVTA was added to the combined solvent and monomer stream just before they entered the reactor. Catalyst solution was fed to the reactor using an ISCO syringe pump through a separated line. Isohexane (used as solvent), and monomers (e.g., ethylene and propylene) were purified over beds of alumina and molecular sieves. Toluene for preparing catalyst solutions was purified by the same technique.

The 100 mg of Complex 1 was activated with N,N-dimethylanilinium tetrakis(pentafluorophenyl)borate at a molar ratio of about 1:1 in 900 ml of toluene to form an active catalyst solution. The solution of tri-n-octyl aluminum (25 wt % in hexane, Sigma Aldrich) was further diluted in isohexane at a concentration of $2.75 \times 10^{-6}$ mol/liter. AVTA was diluted in toluene at the concentration of $3.98 \times 10^{-5}$ mol/liter.

The polymer produced in the reactor exited through a back pressure control valve that reduced the pressure to atmospheric. This caused the unconverted monomers in the solution to flash into a vapor phase which was vented from the top of a vapor liquid separator. The liquid phase, comprising mainly polymer and solvent, was collected for polymer recovery. The collected samples were first air-dried in a hood to evaporate most of the solvent, and then dried in a vacuum oven at a temperature of about 90° C. for about 12 hours. The vacuum oven dried samples were weighed to obtain yields.

The detailed polymerization process conditions and some characteristic properties are listed in Table 1. The catalyst feed rates may also be adjusted according to the level of impurities in the system to reach the targeted conversions listed. All the reactions were carried out at a pressure of about 2.4 MPa/g unless otherwise mentioned. For comparison, TNOA solution was used in Examples C1 and C2 instead of AVTA. AVTA1 and AVTA2 were prepared as described in Examples 1 and 2, respectively.

TABLE 1

Ethylene-propylene co-polymerization runs using AVTA1, AVTA2 or TNOA

| Example # | C1 | EP-1 | EP-2 | C2 | EP-3 | EP-4 | EP-5 |
|---|---|---|---|---|---|---|---|
| Polymerization temperature (° C.) | 120 | 120 | 120 | 120 | 120 | 120 | 120 |
| Ethylene feed rate (g/min) | 4.52 | 4.52 | 4.52 | 4.52 | 4.52 | 4.52 | 4.52 |
| Propylene feed rate (g/min) | 6 | 6 | 6 | 6 | 6 | 6 | 6 |
| Isohexane feed rate (g/min) | 55.2 | 55.2 | 55.2 | 56.7 | 54 | 54 | 54 |
| Catalyst feed rate (mol/min) | $2.3 \times 10^{-7}$ | $2.3 \times 10^{-7}$ | $2.3 \times 10^{-7}$ | $2.3 \times 10^{-7}$ | $2.3 \times 10^{-7}$ | $2.3 \times 10^{-7}$ | $3.1 \times 10^{-7}$ |
| Scavenger | TNOA | AVTA1 | AVTA1 | TNOA | AVTA2 | AVTA2 | AVTA2 |
| Scavenger rate (mol/min) | $7.4 \times 10^{-06}$ | $8 \times 10^{-5}$ | 0.00012 | $7.4 \times 10^{-06}$ | $6 \times 10^{-5}$ | 0.00012 | 0.00012 |
| Conversion (%) | 75.2% | 67.1% | 56.2% | 76.0% | 65.6% | 57.3% | 69.2% |
| MFR (@230° C. g/10 min) | 0.44 | 1.48 | 2.65 | 0.172 | 0.976 | 5.77 | 13.48 |
| ML (mu) | 57.7 | 24 | 15.3 | 77 | 23.4 | 10.7 | 7.7 |
| MLRA (mu-sec) | 73.7 | 30.7 | 15.5 | 181.3 | 102.8 | 41.9 | 19 |
| Mn_DRI (g/mol) | 96,978 | 56,898 | 39,944 | 106,773 | 50,055 | 28,151 | 27,932 |
| Mw_DRI (g/mol) | 245,849 | 138,759 | 119,214 | 278,111 | 130,268 | 80,034 | 77,570 |
| Mz_DRI (g/mol) | 547,111 | 250,185 | 230,664 | 524,924 | 280,281 | 192,962 | 180,749 |
| MWD | 2.54 | 2.44 | 2.98 | 2.6 | 2.6 | 2.84 | 2.78 |
| Mn_LS (g/mol) | 110,311 | 68,550 | 54,693 | 124,715 | 56,912 | 35,202 | 33,107 |
| Mw_LS (g/mol) | 208,406 | 131,615 | 119,455 | 266,390 | 123,924 | 80,987 | 76,407 |
| Mz_LS (g/mol) | 308,565 | 227,558 | 255,769 | 447,346 | 236,411 | 200,636 | 174,741 |
| $g'_{vis}$ | 0.961 | 0.95 | 0.933 | 1.016 | 0.92 | 0.907 | 0.89 |
| Ethylene (wt %) | 55.04 | 59.45 | 64.9 | 55.4 | 60.02 | 65.79 | 60.76 |
| Vinyls/1000C | 0.03 | 0.05 | 0.07 | | | | |
| vinyl % | 21.4 | 31.2 | 53.8 | | | | |

For data reported in Table 2 and 3, all examples were produced using a solution process in a 1.0-liter continuous stirred-tank reactor (autoclave reactor). The autoclave reactor was equipped with a stirrer, a water-cooling/steam-heating element with a temperature controller, and a pressure controller. Solvents and monomers were purified by passing through purification columns packed with molecular sieves. Isohexane (solvent) was passed through four columns in series whereas ethylene, propylene, and toluene were each purified by passing through two columns in series. Purification columns are regenerated periodically (~twice/year) or whenever there is evidence of low catalyst activity. ENB was purified in a glove box by passing through a bed of basic alumina under a steady nitrogen gas purge. Aluminum Vinyl Transfer Agent (AVTA) solution was diluted to a concentration of $3.38 \times 10^{-6}$ mol/ml using isohexane. AVTA3 was prepared as described in Example 3.

Isohexane and AVTA solutions were fed using Pulsa pumps and their flow rate was controlled using a pump calibration curve. Purified propylene, and ENB were also fed using Pulsa pumps but their flow rate was controlled using mass-flow controllers. The feed rate of purified ethylene was also regulated using a mass flow controller.

Ethylene and propylene combined into a single line before entering a manifold upstream of the reactor. Isohexane, AVTA solution, and ethylene norbornene (ENB) solution lines also combined in a single line before entering the same manifold. The resulting two lines merged further downstream and the combined mixture of monomers and solvent was fed into the reactor using a single tube.

Catalyst used in these examples was Complex 1 activated used was N,N-dimethylanilinium tetrakis(pentafluorophenyl)borate. Catalyst solution was prepared daily and used on the same day. The solution was prepared by dissolving 80 mg of Complex 1 and 90.7 mg of N,N-dimethylanilinium tetrakis(pentafluorophenyl)borate in 900 ml toluene (catalyst concentration=$1.233 \times 10^{-07}$ mol/ml, pre-catalyst/activator (molar ratio)=0.98). This solution was pumped into the reactor through a designated dip-tube at a desired rate using an Isco pump.

Composition was controlled by adjusting the feed ratio of the monomers. Two studies were made with both EP and EPDM polymers. In the first study, the effect of AVTA feed rate on polymer molecular weight was examined by keeping all other feed rates constant and observing the effect of AVTA feed-rate on polymer MFR (or ML). In the second study, the effect of reactor residence time on the molecular weight of polymer was examined by holding all monomer and AVTA feed rates constant and observing the effect of isohexane (diluent) flow-rate on polymer MFR (or ML).

Irganox 1076 was added to the polymer samples as they were collected from the reactor. The polymer samples were then placed on a boiling-water steam table in a hood to evaporate a large fraction of the solvent and unreacted monomers, and then, dried in a vacuum oven at a temperature of about 90° C. for about 12 hours. The vacuum oven dried samples were weighed to obtain yields. The ethylene and ENB content of the polymer was determined by FTIR. The monomer conversions were calculated using the polymer yield, composition and the amount of monomers fed into the reactor. Catalyst activity (also referred as to catalyst productivity) was calculated based the yield and the feed rate of catalyst. All the reactions were carried out at a gauge pressure of about 2.2 MPa. Melt flow rate (MFR) measurements were made as a proxy for molecular weight for the EP copolymers whereas; Mooney measurements were made to gauge the molecular weight and long-chain branching of the EPDM terpolymers.

TABLE 2

Ethylene-propylene co-polymerization runs using AVTA3

| Example # | EP-6 | EP-7 | EP-8 | EP-9 | EP-10 | EP-11 |
|---|---|---|---|---|---|---|
| Reactor Temp (° C.) | 85 | 85 | 85 | 85 | 85 | 85 |
| Reactor Pressure (psig) | 320 | 320 | 320 | 320 | 320 | 320 |
| Ethylene Feed (g/min) | 0.8 | 0.8 | 0.8 | 0.8 | 0.8 | 0.8 |
| Propylene Feed (g/min) | 14 | 14 | 14 | 14 | 14 | 14 |
| Catalyst Feed (mol/min) | $1.356 \times 10^{-6}$ | $1.356 \times 10^{-6}$ | $1.356 \times 10^{-6}$ | $1.356 \times 10^{-6}$ | $1.356 \times 10^{-6}$ | $1.356 \times 10^{-6}$ |
| Activator Feed (mol/min) | $1.384 \times 10^{-6}$ | $1.384 \times 10^{-6}$ | $1.384 \times 10^{-6}$ | $1.384 \times 10^{-6}$ | $1.384 \times 10^{-6}$ | $1.384 \times 10^{-6}$ |
| AVTA3 feed (mol/min) | $3.38 \times 10^{-5}$ | $2.03 \times 10^{-5}$ | $1.35 \times 10^{-5}$ | $3.38 \times 10^{-5}$ | $3.38 \times 10^{-5}$ | $3.38 \times 10^{-5}$ |
| Isohexane feed (g/min) | 64.7 | 62.1 | 60.8 | 65.3 | 45 | 23.9 |
| Yield (g/min) | 2.7 | 3.6 | 3.8 | 3.3 | 4.4 | 3.9 |
| Catalyst efficiency (g polymer/g cat) | 27102 | 36614 | 38557 | 34057 | 45000 | 39886 |
| C2 (wt %) -FTIR | 21.4 | 16.6 | 12.9 | 17.9 | 13.2 | 12.5 |
| MFR (@230° C., g/10 min) | 16.74 | 1.9 | 0.65 | 15 | 6.67 | 2.92 |

TABLE 3

Ethylene-propylene-ethylidenenorbornene co-polymerization runs using AVTA3

| Example # | EPDM-1 | EPDM-2 | EPDM-3 | EPDM-4 | EPDM-5 | EPDM-6 |
|---|---|---|---|---|---|---|
| Reactor Temp (° C.) | 100 | 100 | 100 | 100 | 100 | 100 |
| Reactor Pressure (psig) | 320 | 320 | 320 | 320 | 320 | 320 |
| Ethylene Feed (g/min) | 1.8 | 1.8 | 1.8 | 2.2 | 2.2 | 2.2 |
| Propylene Feed (g/min) | 7 | 7 | 7 | 7 | 7 | 7 |
| ENB Feed (g/min) | 0.4 | 0.4 | 0.4 | 0.49 | 0.49 | 0.49 |
| Catalyst Feed (mol/min) | $2.446 \times 10^{-6}$ | $2.446 \times 10^{-6}$ | $2.446 \times 10^{-6}$ | $2.446 \times 10^{-6}$ | $2.446 \times 10^{-6}$ | $2.446 \times 10^{-6}$ |
| Activator Feed (mol/min) | $2.516 \times 10^{-6}$ | $2.516 \times 10^{-6}$ | $2.516 \times 10^{-6}$ | $2.516 \times 10^{-6}$ | $2.516 \times 10^{-6}$ | $2.516 \times 10^{-6}$ |
| AVTA feed (mol/min) | $3.38 \times 10^{-5}$ | $2.03 \times 10^{-5}$ | $1.35 \times 10^{-5}$ | $3.38 \times 10^{-5}$ | $3.38 \times 10^{-5}$ | $3.38 \times 10^{-5}$ |

TABLE 3-continued

Ethylene-propylene-ethylidenenorbornene co-polymerization runs using AVTA3

| Example # | EPDM-1 | EPDM-2 | EPDM-3 | EPDM-4 | EPDM-5 | EPDM-6 |
|---|---|---|---|---|---|---|
| Isohexane feed (g/min) | 64.7 | 62.1 | 60.8 | 65.3 | 45 | 23.9 |
| Yield (g/min) | 2.2 | 2.3 | 2.3 | 1.9 | 2.5 | 3.8 |
| Catalyst efficiency (g polymer/g cat) | 12113 | 13144 | 12825 | 10418 | 14108 | 21600 |
| C2 (wt %) uncorrected-FTIR | 56.2 | 52.8 | 53.4 | 59.2 | 52.3 | 58.4 |
| ENB (wt %)- FTIR | 4.9 | 4.9 | 4.9 | 5.3 | 5.5 | 5.4 |
| Irganox 1076 (ppm)-FTIR | 208 | 1065 | 1129 | 772 | 666 | 233 |
| ML(mu) | 17.6 | 42.1 | 79.8 | 14 | 23.8 | 43.7 |
| MLRA (mu-sec) | 50.4 | 156.5 | 351.5 | 38.7 | 85.8 | 263.1 |
| cMLRA (mu-sec) | 446 | 394 | 353 | 476 | 492 | 628 |

Test Methods

Mooney Large Viscosity (ML) and Mooney Relaxation Area (MLRA):

ML and MLRA are measured using a Mooney viscometer according to ASTM D-1646, modified as detailed in the following description. First, an oven-dried polymer sample for Mooney testing is prepared by being pressed into a flat sheet using a hot press at 150° C. for 3 minutes, to remove any water, solvent, and unreacted monomers from the sample. After 3 minutes, if there are any visible bubbles/voids, the sheet is folded and pressed again between the hot plates of the hot press for an additional 3 minutes. Once the sample is cooled, about 25 g is used for Mooney testing. For Mooney testing, the sample is placed on either side of the rotor. The cavity is filled by pneumatically lowering the upper platen. The upper and lower platens are electrically heated and controlled at 125° C. The torque to turn the rotor at 2 rpm is measured by a torque transducer. Mooney viscometer is operated at an average shear rate of 2 $s^{-1}$. The sample is pre-heated for 1 minute after the platens are closed. The motor is then started and the torque is recorded for a period of 4 minutes. The results are reported as ML (1+4) 125° C., where M is the Mooney viscosity number, L denotes large rotor, 1 is the pre-heating time in minutes, 4 is the sample run time in minutes after the motor starts, and 125° C. is the test temperature.

The torque limit of the Mooney viscometer is about 100 Mooney units. Mooney viscosity values greater than about 100 Mooney unit cannot generally be measured under these conditions. In this event, a non-standard rotor design is employed with a change in Mooney scale that allows the same instrumentation on the Mooney viscometer to be used for more viscous polymers. This rotor that is both smaller in diameter and thinner than the standard Mooney Large (ML) rotor is termed MST—Mooney Small Thin. Typically when the MST rotor is employed, the test is also run at different time and temperature. The pre-heat time is changed from the standard 1 minute to 5 minutes and the test is run at 200° C. instead of the standard 125° C. Thus, the value will be reported as MST (5+4), 200° C. Note that the run time of 4 minutes at the end of which the Mooney reading is taken remains the same as the standard conditions. According to EP 1 519 967, one MST point is approximately 5 ML points when MST is measured at (5+4@200° C.) and ML is measured at (1+4@ 125° C.). The MST rotor should be prepared as follows:

1. The rotor should have a diameter of 30.48+/−0.03 mm and a thickness of 2.8+/−0.03 mm (tops of serrations) and a shaft of 11 mm or less in diameter.
2. The rotor should have a serrated face and edge, with square grooves of 0.8 mm width and depth of 0.25-0.38 mm cut on 1.6 mm centers. The serrations will consist of two sets of grooves at right angles to each other (form a square crosshatch).
3. The rotor shall be positioned in the center of the die cavity such that the centerline of the rotor disk coincides with the centerline of the die cavity to within a tolerance of +/−0.25 mm. A spacer or a shim may be used to raise the shaft to the midpoint.
4. The wear point (cone shaped protuberance located at the center of the top face of the rotor) shall be machined off flat with the face of the rotor.

The MLRA data is obtained from the Mooney viscosity measurement when the rubber relaxes after the rotor is stopped. The MLRA is the integrated area under the Mooney torque-relaxation time curve from 1 to 100 seconds. The MLRA is a measure of chain relaxation in molten polymer and can be regarded as a stored energy term which suggests that, after the removal of an applied strain, the longer or branched polymer chains can store more energy and require longer time to relax. Therefore, the MLRA value of a bimodal rubber (the presence of a discrete polymeric fraction with very high molecular weight and distinct composition) or a long chain branched rubber are larger than a broad or a narrow molecular weight rubber when compared at the same Mooney viscosity values.

Mooney Relaxation Area is dependent on the Mooney viscosity of the polymer, and increases with increasing Mooney viscosity. In order to remove the dependence on polymer Mooney Viscosity, a corrected MLRA (cMLRA) parameter is used, where the MLRA of the polymer is normalized to a reference of 80 Mooney viscosity. The formula for cMLRA is provided below $$cMLRA = MLRA\left(\frac{80}{ML}\right)^{1.44}$$

where MLRA and ML are the Mooney Relaxation Area and Mooney viscosity of the polymer sample measured at 125° C. Alternatively, the ratio MLRA/ML may be used to encompass both the MLRA and ML data, in view of MLRA's dependence upon ML. This ratio has the dimension of time. A higher MLRA/ML number signifies a higher degree of melt elasticity for materials with similar value of ML. Long chain branching will slow down the relaxation of the polymer chain, hence increasing the value of MLRA/ML.

Unsaturated Chain Ends:

The number of vinyl chain ends, vinylidene chain ends and vinylene chain ends is determined using $^1$H NMR using 1,1,2,2-tetrachloroethane-d$_2$ as the solvent on an at least 400 MHz NMR spectrometer. Proton NMR data is collected at 120° C. in a 5 mm probe using a Varian spectrometer with a $^1$H frequency of at least 400 MHz. Data was recorded using a maximum pulse width of 45°, 5 seconds between pulses and signal averaging 120 transients. Spectral signals were integrated and the number of unsaturation types per 1000 carbons was calculated by multiplying the different groups by 1000 and dividing the result by the total number of carbons.

The chain end unsaturations are measured as follows. The vinyl resonances of interest are between from 5.0 to 5.1 ppm (VRA), the vinylidene resonances between from 4.65 to 4.85 ppm (VDRA), the vinylene resonances from 5.31 to 5.55 ppm (VYRA), the trisubstituted unsaturated species from 5.11 to 5.30 ppm (TSRA) and the aliphatic region of interest between from 0 to 2.1 ppm (IA).

The number of vinyl groups/1000 Carbons is determined from the formula: (VRA*500)/((IA+VRA+VYRA+VDRA)/2)+TSRA). Likewise, the number of vinylidene groups/1000 Carbons is determined from the formula: (VDRA*500)/((IA+VRA+VYRA+VDRA)/2)+TSRA), the number of vinylene groups/1000 Carbons from the formula (VYRA*500)/((IA+VRA+VYRA+VDRA)/2) 25+TSRA) and the number of trisubstituted groups from the formula (TSRA*1000)/((IA+VRA+VYRA+VDRA)/2)+TSRA).
VRA, VDRA, VYRA, TSRA and IA are the integrated normalized signal intensities in the chemical shift regions defined above. Vinyl chain ends are reported as a molar percentage of the total number of moles of unsaturated polymer end-groups (that is, the sum of vinyl chain ends, vinylidene chain ends, vinylene chain ends, and trisubstituted olefinic chain ends).

When the polymer contains a diene such as ENB, the calculation of number of vinyl chain ends should be modified. For instance, when a polymer contains ENB, vinyl chain ends are reported as a molar percentage of the total number of moles of the sum of vinyl chain ends, vinylidene chain ends, and vinylene chain ends. That is, trisubstituted olefinic chain ends are excluded when calculating the molar percentage. This is because of the overlap with the exocyclic olefinic region of ENB. Similar types of corrections are required when other dienes are used as monomers, as will be recognized by one of ordinary skill in the art with the benefit of this disclosure. For instance, it is known that when 1,5-octadiene is used a diene monomer, a polymer chain incorporating such dienes would include unreacted unsaturations in the form of vinylenes, so the vinylene groups would need to be excluded in the calculation of number of vinyl groups. Similar exclusions for other diene monomers, when present, will be apparent based upon the unreacted unsaturation type that such other diene monomers bring to the polymer chain. Where no diene monomers are present, the vinyl chain end calculation may include the sum of all of the above types of groups (vinyl, vinylidene, vinylene, and trisubstituted groups).

Molecular Weight:

Molecular weights (number average molecular weight (Mn), weight average molecular weight (Mw), and z-average molecular weight (Mz)) are determined using a Polymer Laboratories Model 220 high temperature GPC-SEC (gel permeation/size exclusion chromatograph) equipped with on-line differential refractive index (DRI), light scattering (LS), and viscometer (VIS) detectors. It uses three Polymer Laboratories PLgel 10 m Mixed-B columns for separation using a flow rate of 0.54 ml/min and a nominal injection volume of 300 microliter. The detectors and columns were contained in an oven maintained at 135° C. The stream emerging from the SEC columns was directed into the miniDAWN optical flow cell and then into the DRI detector. The DRI detector was an integral part of the Polymer Laboratories SEC. The viscometer was inside the SEC oven, positioned after the DRI detector. The details of these detectors as well as their calibrations have been described by, for example, T. Sun et al., in Macromolecules, Volume 34, Number 19, pp. 6812-6820, (2001), incorporated herein by reference.

Solvent for the SEC experiment was prepared by dissolving 6 grams of butylated hydroxy toluene (BHT) as an antioxidant in 4 liters of Aldrich reagent grade 1, 2, 4-trichlorobenzene (TCB). The TCB mixture was then filtered through a 0.7 micrometer glass pre-filter and subsequently through a 0.1 micrometer Teflon filter. The TCB was then degassed with an online degasser before entering the SEC. Polymer solutions were prepared by placing dry polymer in a glass container, adding the desired amount of BHT stabilized TCB, then heating the mixture at 160° C. with continuous agitation for about 2 hours. All quantities were measured gravimetrically. The TCB densities used to express the polymer concentration in mass/volume units are 1.463 g/mL at 22° C. and 1.324 g/mL at 135° C. The injection concentration was from 1.0 to 2.0 mg/mL, with lower concentrations being used for higher molecular weight samples. Prior to running each sample the DRI detector and the injector were purged. Flow rate in the apparatus was then increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI with a series of mono-dispersed polystyrene standards with molecular weight ranging from 600 to 10M, and (dn/dc) is the refractive index increment for the system. The refractive index, n=1.500 for TCB at 145° C. and λ=690 nm. For purposes of this invention and the claims thereto (dn/dc) =0.1048 for ethylene-propylene copolymers, and (dn/dc) =0.01048-0.0016ENB for EPDM, where ENB is the ENB content in wt % in the ethylene-propylene-diene terpolymer. Where other non-conjugated polyenes are used instead of (or in addition to) ENB, the ENB is taken as weight percent of total non-conjugated polyenes. The value (dn/dc) is otherwise taken as 0.1 for other polymers and copolymers. Units of parameters used throughout this description of the SEC method are: concentration is expressed in g/cm$^3$, molecular weight is expressed in g/mol, and intrinsic viscosity is expressed in dL/g.

The light scattering (LS) detector was a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The molecular weight, M, at each point in the chromatogram was determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the DRI analysis, $A_2$ is the second virial coefficient (for purposes of this invention, $A_2$=0.0015 for ethylene homopolymer and $A_2$=0.0015-0.00001EE for ethylene-propylene copolymers, where EE is the ethylene content in weight percent in the ethylene-propylene copolymer. $P(\theta)$ is the form factor for a mono-disperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and X=690 nm. For purposes of this application, where DRI and LS measurements conflict, LS measurements should be used for Mw and Mz, while DRI measurements should be used for Mn.

Branching Index ($g'_{vis}$):

A high temperature viscometer from Viscotek Corporation was used to determine specific viscosity. The viscometer has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer was calculated from their outputs. The intrinsic viscosity, $[\eta]$, at each point in the chromatogram was calculated from the following equation:

$$\eta_s = c[\eta] + 0.3(c[\eta])^2$$

where c is concentration and was determined from the DRI output.

The branching index (g'vis) is defined as the ratio of the intrinsic viscosity of the branched polymer to the intrinsic viscosity of a linear polymer of equal molecular weight and same composition, and was calculated using the output of the SEC-DRI-LS-VIS method as follows. The average intrinsic viscosity, $[\eta]_{avg}$, of the sample was calculated by:

$$[\eta]_{avg} = \frac{\sum c_i [\eta]_i}{\sum c_i}$$

where the summations are over the chromatographic slices, i, between the integration limits.

The branching index $g'_{vis}$ is defined as:

$$g'_{vis} = \frac{[\eta]_{avg}}{k M_v^\alpha}.$$

The intrinsic viscosity of the linear polymer of equal molecular weight and same composition is calculated using Mark-Houwink equation, where the K and a are determined based on the composition of linear ethylene/propylene copolymer and linear ethylene-propylene-diene terpolymers using a standard calibration procedure. $M_w$ is the viscosity-average molecular weight based on molecular weights determined by LS analysis. See Macromolecules, 2001, 34, pp. 6812-6820 and Macromolecules, 2005, 38, pp. 7181-7183, regarding selecting a linear standard having similar molecular weight and comonomer content, and determining k coefficients and a exponents.

Comonomer Content:

(such as for ethylene, butene, hexene, and octene) content is determined using FTIR according the ASTM D3900 and is not corrected for diene content. ENB content is determined using FTIR according to ASTM D6047. The content of other dienes is obtained using $C^{13}$ NMR.

13C NMR: The $^{13}$C solution NMR was performed on a 10 mm broadband probe using a field of at least 400 MHz in tetrachloroethane-d2 solvent at 120° C. with a flip angle of 90° and full NOE with decoupling. Sample preparation (polymer dissolution) was performed at 140° C. where 0.20 grams of polymer was dissolved in an appropriate amount of solvent to give a final polymer solution volume of 3 ml. Chemical shifts were referenced by setting the ethylene backbone (—$CH_2$—)n (where n>6) signal to 29.98 ppm. Carbon NMR spectroscopy was used to measure the composition of the reactor products as submitted.

Chemical shift assignments for the ethylene-propylene copolymer are described by Randall in 'A Review Of High Resolution Liquid $^{13}$Carbon Nuclear Magnetic Resonance Characterization of Ethylene-Based Polymers,' Polymer Reviews, 29:2, pp. 201-317 (1989). The copolymer content (mole and weight %) is also calculated based on the method established by Randall in this paper. Calculations for $r_1 r_2$ were based on the equation $r_1 r_2 = 4*[EE]*[PP]/[EP]^2$; where [EE], [EP], [PP] are the diad molar concentrations; E is ethylene, P is propylene.

The values for the methylene sequence distribution and number average sequence lengths were determined based on the method established by James C. Randall, "Methylene sequence distributions and average sequence lengths in ethylene-propylene copolymers," *Macromolecules*, 1978, 11, 33-36.

MFR

The "melt flow rate" (MFR) is measured in accordance with ASTM D 1238 at 230° C. and 2.16 kg load.

Complex viscosity is determined as described in the Experimental section of U.S. Pat. No. 9,458,310. Also see M. Van Gurp, J. Palmen, Rheol. Bull., 1998, 67, 5-8. The dependence of complex viscosity as a function of frequency can also be determined from rheological measurements at 190° C. The following ratio:

$$[\eta^*(0.1\ rad/s) - \eta^*(100\ rad/s)] / \eta^*(0.1\ rad/s)$$

was used to measure the degree of shear thinning of the polymeric materials of the embodiments herein, where $\eta^*(0.1\ rad/s)$ and $\eta^*(100\ rad/s)$ are the complex viscosities at frequencies of 0.1 and 100 rds, respectively, measured at 190° C. The higher this ratio, the higher is the degree of shear thinning.

The transient uniaxial extensional viscosity was measured using a SER-2-A Testing Platform available from Xpansion Instruments LLC, Tallmadge, Ohio, USA. The SER Testing Platform was used on a Rheometrics ARES-LS (RSA3) strain-controlled rotational rheometer available from TA Instruments Inc., New Castle, Del., USA. The SER Testing Platform is described in U.S. Pat. Nos. 6,578,413 and 6,691,569, which are incorporated herein for reference. A general description of transient uniaxial extensional viscosity measurements is provided, for example, in "Strain hardening of various polyolefins in uniaxial elongational flow", The Society of Rheology, Inc., J. Rheol. 47(3), 619-630 (2003) and "Measuring the transient extensional rheology of polyethylene melts using the SER universal testing platform", The Society of Rheology, Inc., J. Rheol. 49(3), 585-606 (2005), incorporated herein for reference. Strain hardening occurs when a polymer is subjected to uniaxial extension and the transient extensional viscosity increases more than what is predicted from linear viscoelastic theory. Strain hardening is observed as abrupt upswing of the extensional viscosity in the transient extensional viscosity vs. time plot. A strain hardening ratio (SHR) is used to characterize the upswing in extensional viscosity and is defined as the ratio of the maximum transient extensional viscosity over three times the value of the transient zero-shear-rate viscosity at the same strain. Strain hardening is present in the material when the ratio is greater than 1.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

What is claimed is:

1. A process to produce branched propylene copolymers comprising:

1) contacting monomer comprising propylene, ethylene and optional diene with a catalyst system comprising an activator, a metal hydrocarbenyl chain transfer agent, and one or more catalyst complexes represented by the Formula I and II;

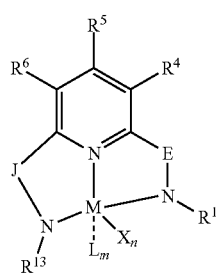

(I)

-continued

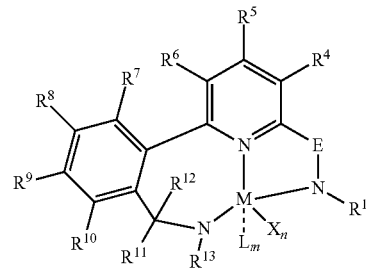

(II)

wherein:
M is a Group 3, 4, 5, 6, 7, 8, 9, or 10 metal;
E is chosen from $C(R^2)$ or $C(R^3)(R^{3'})$;
X is an anionic leaving group;
L is a neutral Lewis base;
$R^1$ and $R^{13}$ are independently selected from the group consisting of hydrocarbyls, substituted hydrocarbyls, and silyl groups;
$R^2$ is a group containing 1-10 carbon atoms that is optionally joined with $R^4$ to form an aromatic ring;
$R^3$, $R^{3'}$, $R^4$, $R^5$, $R^6$, $R^7$, $R^8$, $R^9$, $R^{10}$, $R^{11}$, and $R^{12}$ are each independently selected from the group consisting of hydrogen, hydrocarbyls, alkoxy, silyl, amino, aryloxy, substituted hydrocarbyls, halogen, and phosphino;
J is a divalent group that forms a three-atom-length bridge between the pyridine ring and the amido nitrogen;
n is 1 or 2;
m is 0, 1, or 2;
two X groups optionally join together to form a dianionic group;
two L groups optionally join together to form a bidentate Lewis base;
an X group optionally join to an L group to form a monoanionic bidentate group;
adjacent groups from the following $R^3$, $R^{3'}$, $R^4$, $R^5$, $R^6$, $R^7$, $R^8$, $R^9$, $R^{10}$, $R^{11}$, and $R^{12}$ may be joined to form a ring;
where the metal hydrocarbenyl chain transfer agent is one or more aluminum vinyl transfer agents, AVTA, represented by formula:

$$Al(R')_{3-v}(R'')_v$$

wherein each R', independently, is a $C_1$-$C_{30}$ hydrocarbyl group; each R", independently, is a $C_4$-$C_{20}$ hydrocarbenyl group having an end-vinyl group; and v is from 0.1 to 3; and 2) obtaining branched propylene copolymers comprising from about 99 to 30 wt % propylene, from 1 to 70 wt % ethylene, from 0 to 20 wt % diene monomer, and a remnant of the metal hydrocarbenyl chain transfer agent, wherein said branched propylene copolymer: a) has a $g'_{vis}$ of less than 0.97; b) is essentially gel free (such as 5 wt % or less of xylene insoluble material); c) has an Mw of 50,000 g/mol or more; and d) has a Mw/Mn of less than 4.0.

2. A process to produce branched propylene copolymers comprising:

1) contacting monomer comprising propylene, ethylene and optional diene with a catalyst system comprising an activator, a metal hydrocarbenyl chain transfer agent, and one or more catalyst complexes represented by the Formula (6):

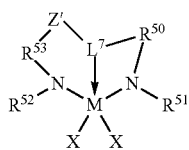
(6)

wherein (1) M is a group 4 metal, preferably hafnium; (2) N is nitrogen; (3) $L^7$ is a group that links $R^{50}$ to Z' by a three atom bridge with the central of the three atoms being a group 15 or 16 element that preferably forms a dative bond to M, and is a $C_5$-$C_{20}$ heteroaryl group containing a Lewis base functionality, especially a divalent pyridinyl, substituted pyridinyl, quinolinyl, or substituted quinolinyl group; (4) Z' is a divalent linker group, $(R^{56})_pC—C(R^{57})_q$, where $R^{56}$ and $R^{57}$ are independently selected from the group consisting of hydrogen, hydrocarbyls, substituted hydrocarbyls, and wherein adjacent $R^{56}$ and $R^{57}$ groups may be joined to form an aromatic or saturated, substituted or unsubstituted hydrocarbyl ring, wherein the ring has 5, 6, 7, or 8 ring carbon atoms and where the substituents on the ring can join to form additional rings, and p is 1 or 2 and q is 1 or 2; (5) $R^{50}$ and $R^{53}$ are each, independently, $ER^{54}R^{55}$ with E being carbon, silicon or germanium, and each $R^{54}$ and $R^{55}$ being independently selected from the group consisting of hydrogen, hydrocarbyls, substituted hydrocarbyls, alkoxy, silyl, amino, aryloxy, halogen and phosphino, and $R^{54}$ and $R^{55}$ may be joined to form a saturated heterocyclic ring, or a saturated substituted heterocyclic ring where substitutions on the ring can join to form additional rings; (6) $R^{51}$ and $R^{52}$ are independently selected from the group consisting of hydrocarbyls, substituted hydrocarbyls, silylcarbyls and substituted silylcarbyl groups; and (7) each X is independently a univalent anionic ligand, or two Xs are joined and bound to the metal atom to form a metallocycle ring, or two Xs are joined to form a chelating ligand, a diene ligand, or an alkylidene ligand;

where the metal hydrocarbenyl chain transfer agent is one or more aluminum vinyl transfer agents, AVTA, represented by formula:

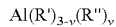

wherein each R', independently, is a $C_1$-$C_{30}$ hydrocarbyl group; each R", independently, is a $C_4$-$C_{20}$ hydrocarbenyl group having an end-vinyl group; and v is from 0.1 to 3; and 2) obtaining propylene copolymers comprising from about 99 to 30 wt % propylene, from 1 to 70 wt % ethylene, from 0 to 20 wt % diene monomer, and a remnant of the metal hydrocarbenyl chain transfer agent, wherein said branched propylene copolymer: a) has a $g'_{vis}$ of less than 0.97; b) is essentially gel free; c) has an Mw of 50,000 g/mol or more; and d) has a Mw/Mn of less than 4.0.

3. The process of claim 1, wherein the catalyst complex is represented by the formula:

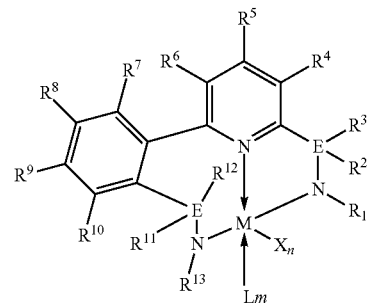
(I)

wherein:
M is a Group 3, 4, 5, 6, 7, 8, 9, 10, 11, or 12 metal;
E is selected from carbon, silicon, or germanium;
X is an anionic group;
L is a neutral Lewis base;
$R^1$ and $R^{13}$ are each independently selected from the group consisting of hydrocarbyls, substituted hydrocarbyls, and silyl groups;
$R^2$ through $R^{12}$ are each independently selected from the group consisting of hydrogen, hydrocarbyls, alkoxy, silyl, amino, aryloxy, substituted hydrocarbyls, halogen, and phosphino;
n is 1 or 2;
m is 0, 1, or 2;
two X groups may be joined together to form a dianionic group;
two L groups may be joined together to form a bidentate Lewis base;
an X group may be joined to an L group to form a monoanionic bidentate group;
$R^7$ and $R^8$ may be joined to form a ring; and
$R^{10}$ and $R^{11}$ may be joined to form a ring.

4. The process of claim 1, wherein the catalyst complex is represented by the Formula (Ia) or (IIa):

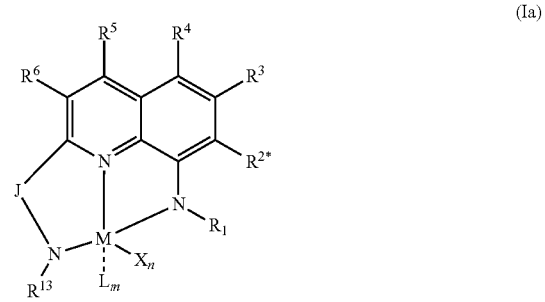
(Ia)

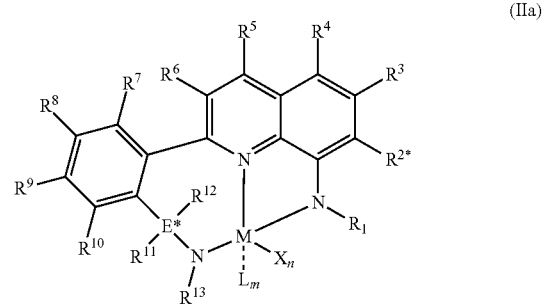
(IIa)

wherein:
M is a Group 3, 4, 5, 6, 7, 8, 9, or 10 metal;
J is a three-atom-length bridge between the quinoline and the amido nitrogen;
E* is selected from carbon, silicon, or germanium;
X is an anionic leaving group;
L is a neutral Lewis base;
$R^1$ and $R^{13}$ are independently selected from the group consisting of hydrocarbyls, substituted hydrocarbyls, and silyl groups;
$R^{2*}$ through $R^{12}$ are independently selected from the group consisting of hydrogen, hydrocarbyls, alkoxy, silyl, amino, aryloxy, substituted hydrocarbyls, halogen, and phosphino;
n is 1 or 2;
m is 0, 1, or 2
n+m is not greater than 4;
any two adjacent R groups (e.g., $R^1$ & $R^2$, $R^2$ & $R^3$, etc.) may be joined to form a substituted or unsubstituted hydrocarbyl or heterocyclic ring, where the ring has 5, 6, 7, or 8 ring atoms and where substitutions on the ring can join to form additional rings;
any two X groups may be joined together to form a dianionic group;
any two L groups may be joined together to form a bidentate Lewis base; and
an X group may be joined to an L group to form a monoanionic bidentate group.

5. The process of claim 1, wherein M is Ti, Zr, or Hf.
6. The process of claim 1, wherein E is carbon.
7. A process to produce propylene copolymers comprising:
1) contacting monomer comprising propylene, ethylene and optional diene with a catalyst system comprising an activator, a metal hydrocarbenyl chain transfer agent, and one or more catalyst complexes represented by the Formula:

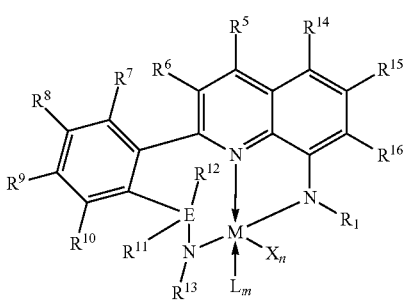

wherein:
M is a Group 3, 4, 5, 6, 7, 8, 9, 10, 11, or 12 metal;
E is selected from carbon, silicon, or germanium;
X is an anionic group;
L is a neutral Lewis base;
$R^1$ and $R^{13}$ are each independently selected from the group consisting of hydrocarbyls, substituted hydrocarbyls, and silyl groups;
$R^5$ through $R^{12}$ and $R^{14}$ through $R^{16}$ are each independently selected from the group consisting of hydrogen, hydrocarbyls, alkoxy, silyl, amino, aryloxy, substituted hydrocarbyls, halogen, and phosphino;
n is 1 or 2;
m is 0, 1, or 2;

two X groups may be joined together to form a dianionic group;
two L groups may be joined together to form a bidentate Lewis base;
an X group may be joined to an L group to form a monoanionic bidentate group;
$R^7$ and $R^8$ may be joined to form a ring;
$R^{10}$ and $R^{11}$ may be joined to form a ring;
where the metal hydrocarbenyl chain transfer agent is one or more aluminum vinyl transfer agents, AVTA, represented by formula:

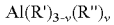
$Al(R')_{3-v}(R'')_v$ wherein each R', independently, is a $C_1$-$C_{30}$ hydrocarbyl group; each R'', independently, is a $C_4$-$C_{20}$ hydrocarbenyl group having an end-vinyl group; and v is from 0.1 to 3; and
2) obtaining propylene copolymers comprising from about 99 to 30 wt % propylene, from 1 to 70 wt % ethylene, from 0 to 20 wt % diene monomer, and a remnant of the metal hydrocarbenyl chain transfer agent, wherein said branched propylene copolymer: a) has a $g'_{vis}$ of less than 0.97; b) is essentially gel free; c) has an Mw of 50,000 g/mol or more; and d) has a Mw/Mn of less than 4.0.

8. The process of claim 1, wherein the activator comprises an alumoxane and or a non-coordinating anion, preferably the activator comprises one or more of: trimethylammonium tetrakis(perfluoronaphthyl)borate, N,N-dimethylanilinium tetrakis(perfluoronaphthyl)borate, N,N-diethylanilinium tetrakis(perfluoronaphthyl)borate, triphenylcarbenium tetrakis(perfluoronaphthyl)borate, trimethylammonium tetrakis(perfluorobiphenyl)borate, N,N-dimethylanilinium tetrakis(perfluorobiphenyl)borate, triphenylcarbenium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3, 5-bis(trifluoromethyl)phenyl)borate, triphenylcarbenium tetrakis(perfluorophenyl)borate, $[Ph_3C^+][B(C_6F_5)_4^-]$, $[Me_3NH^+][B(C_6F_5)_4^-]$, 1-(4-(tris(pentafluorophenyl)borate)-2,3,5,6-tetrafluorophenyl)pyrrolidinium, tetrakis(pentafluorophenyl)borate, 4-(tris(pentafluorophenyl)borate)-2, 3,5,6-tetrafluoropyridine, triphenylcarbenium tetraphenylborate, and triphenylcarbenium tetrakis-(2,3,4,6-tetrafluorophenyl)borate.

9. The process of claim 1, wherein v is from 0.1 to 3.
10. The process of claim 1, wherein R'' is butenyl, pentenyl, heptenyl, or octenyl and or wherein R' is methyl, ethyl, propyl, isobutyl, or butyl.
11. The process of claim 1, wherein the aluminum vinyl transfer agent comprises one or more of tri(but-3-en-1-yl)aluminum, tri(pent-4-en-1-yl)aluminum, tri(oct-7-en-1-yl)aluminum, tri(non-8-en-1-yl)aluminum, tri(dec-9-en-1-yl)aluminum, dimethyl(oct-7-en-1-yl)aluminum, diethyl(oct-7-en-1-yl)aluminum, dibutyl(oct-7-en-1-yl)aluminum, diisobutyl(oct-7-en-1-yl)aluminum, diisobutyl(non-8-en-1-yl)aluminum, diisobutyl(dec-9-en-1-yl)aluminum, diisobutyl(dodec-11-en-1-yl)aluminum, methyl-di(oct-7-en-1-yl)aluminum, ethyl-di(oct-7-en-1-yl)aluminum, butyl-di(oct-7-en-1-yl)aluminum, isobutyl-di(oct-7-en-1-yl)aluminum, isobutyl-di(non-8-en-1-yl)aluminum, isobutyl-di(dec-9-en-1-yl)aluminum, and isobutyl-di(dodec-11-en-1-yl)aluminum.
12. The process of claim 1, wherein v=2.
13. The process of claim 1, wherein the monomer comprises ethylene or propylene.

14. The process of claim 1, wherein the monomers comprise ethylene, propylene, and an alkyl diene.

15. The process of claim 1, wherein the catalyst complex is supported.

16. A propylene copolymer comprising from about 99 to 30 wt % propylene, from 1 to 70 wt % ethylene, from 0 to 20 wt % diene monomer, and a remnant of a metal hydrocarbenyl chain transfer agent wherein the metal hydrocarbenyl chain transfer agent is represented by formula:

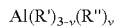

wherein each R', independently, is a $C_1$-$C_{30}$ hydrocarbyl group; each R", independently, is a $C_4$-$C_{20}$ hydrocarbenyl group having an end-vinyl group; and v is from 0.1 to 3;

wherein said branched propylene copolymer: a) has a $g'_{vis}$ of less than 0.97; b) is essentially gel free (such as 5 wt % or less of xylene insoluble material); c) has an Mw of 50,000 g/mol or more; and d) has a Mw/Mn of less than 4.0.

17. The copolymer of claim 16, wherein said branched propylene polymer modifier has a $g'_{vis}$ of less than 0.90, alternately less than 0.85.

18. The copolymer of claim 16, wherein said branched propylene polymer modifier has a complex viscosity of at least 500 Pa·s measured at 0.1 rad/sec and a temperature of 190° C., alternately at least 5000 Pa·s.

19. The copolymer of claim 16, wherein the copolymer comprises from 0.1 to 15 wt % diene and 0.001 to 10 mol % of the remnant of the metal hydrocarbenyl chain transfer agent.

20. The copolymer of claim 16, wherein the diene is one or more of 5-ethylidene-2-norbornene, 1,4-hexadiene, 1,5-heptadiene, 6-methyl-1,6-heptadiene, 1,6-octadiene, 7-methyl-1,7-octadiene, 1,8-decadiene, and 9-methyl-1,9-decadiene.

21. The copolymer of claim 16, wherein the diene is ethylidene norbornene.

22. The copolymer of claim 16, wherein the copolymer comprises ethylene, propylene and ethylidene norbornene.

* * * * *